United States Patent
Matsumura et al.

(10) Patent No.: US 7,739,320 B2
(45) Date of Patent: Jun. 15, 2010

(54) WAVEFORM EQUALIZER, WAVEFORM EQUALIZATION METHOD, AND INTEGRATED CIRCUIT

(75) Inventors: Yoshinobu Matsumura, Osaka (JP); Naoya Tokunaga, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1411 days.

(21) Appl. No.: 11/130,604

(22) Filed: May 17, 2005

(65) Prior Publication Data

US 2005/0265439 A1 Dec. 1, 2005

(30) Foreign Application Priority Data

| May 19, 2004 | (JP) | ............................. 2004-148658 |
| May 21, 2004 | (JP) | ............................. 2004-151540 |
| Nov. 9, 2004 | (JP) | ............................. 2004-324811 |

(51) Int. Cl.
*G06F 17/10* (2006.01)
(52) U.S. Cl. ...................... 708/322; 708/323
(58) Field of Classification Search ................ 708/322, 708/323; 375/232
See application file for complete search history.

(56) References Cited

U.S. PATENT DOCUMENTS

| 6,907,064 | B1 * | 6/2005 | Tokunaga et al. | ............ 375/232 |
| 7,333,605 | B1 * | 2/2008 | Zhang et al. | ............ 379/406.08 |
| 2002/0054634 | A1 * | 5/2002 | Martin et al. | ................ 375/232 |
| 2004/0013187 | A1 * | 1/2004 | Tokunaga | .................... 375/229 |
| 2005/0232347 | A1 * | 10/2005 | Chang | ........................ 375/232 |

FOREIGN PATENT DOCUMENTS

| JP | 11-313013 | 11/1999 |
| JP | 2000-295149 | 10/2000 |

* cited by examiner

*Primary Examiner*—Chuong D Ngo

(57) ABSTRACT

A waveform equalizer includes a filter unit, an error estimation unit, a tap coefficient storage unit, and an update amount calculation unit which includes an intermediate calculation unit and an update amount setting unit. Coefficient update amount $\Delta C_i(n)$ for an ith tap is calculated according to an equation $$\Delta C_i(n) = \alpha_i(n) \times \mu \times e(n) \times x^*(n-i)$$

with the multiplication by $\alpha_i(n)$ being performed by the update amount setting unit. Here, $0 < \alpha_i(n) \leq 1$, and $\alpha_i(n)$ is a function $f(C_i(n-1))$ which monotonically increases with $C_i(n-1)$.

12 Claims, 46 Drawing Sheets

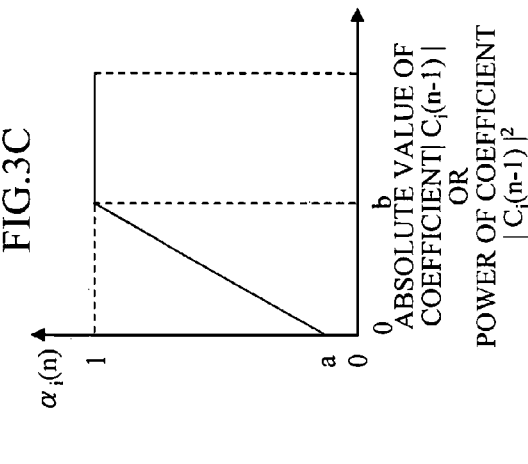
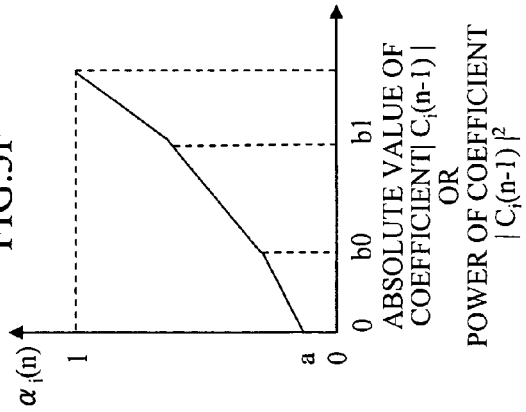
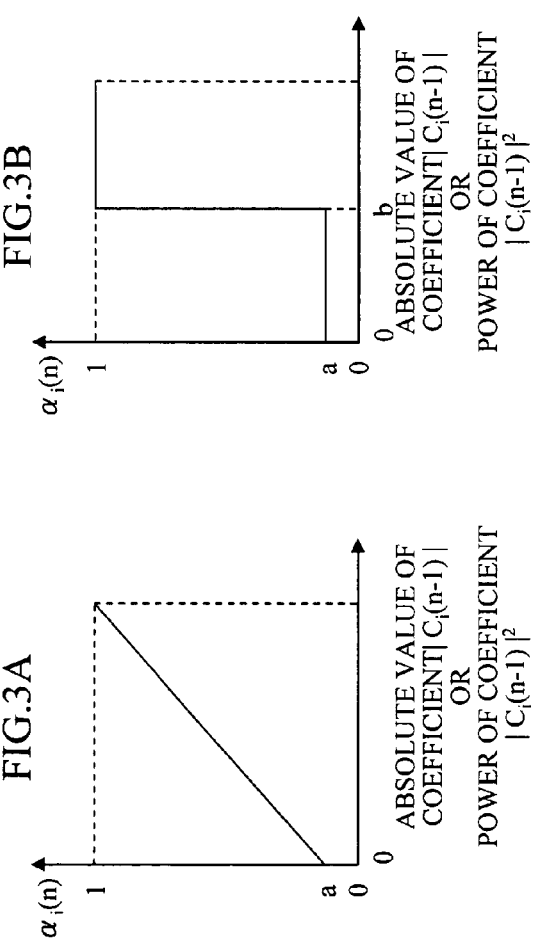
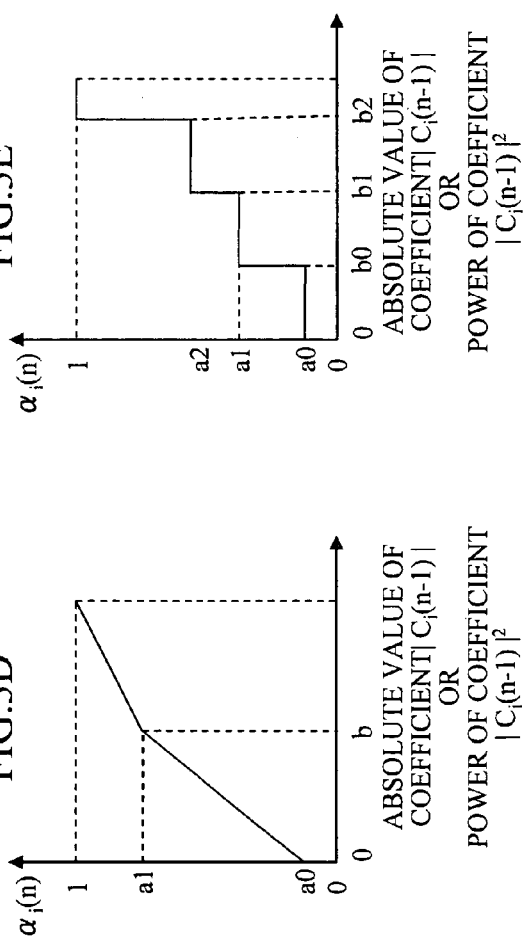

RECEIVED SIGNAL WITHOUT DISTORTION

RECEIVED SIGNAL 1

RECEIVED SIGNAL 2

TAP COEFFICIENTS AFTER CONVERGENCE WHEN STEP SIZE $\mu$ IS SMALL

TAP COEFFICIENTS AFTER CONVERGENCE WHEN STEP SIZE $\mu$ IS LARGE

TAP COEFFICIENTS OUTPUT FROM TAP COEFFICIENT FIXING UNIT WHEN INVENTION OF PATENT DOCUMENT 1 IS APPLIED TO FIG. 6A

TAP COEFFICIENTS OUTPUT FROM TAP COEFFICIENT FIXING UNIT WHEN INVENTION OF PATENT DOCUMENT 1 IS APPLIED TO FIG. 6B

FIG.27

| | CONVENTIONAL EXAMPLE | | SECOND EMBODIMENT |
|---|---|---|---|
| | STEP SIZE $\mu\_0$ | STEP SIZE $7\mu\_0$ | SELECTION FROM $\mu\_0$ AND $7\mu\_0$ |
| MARGINAL C/N PERFORMANCE (AWGN ONLY) | 14.9dB | 15.3dB | 14.9dB |
| MARGINAL D/U PERFORMANCE (DELAY OF 0.1 $\mu$s AND DOPPLER FREQUENCY OF 1Hz) | 0.6dB | 0dB | 0dB |

FIG.33

| | DELAY(μs) | D/U(dB) | PHASE(°) |
|---|---|---|---|
| DOMINANT WAVE | 0 | 0 | 0 |
| MULTIPATH INTERFERENCE WAVE 1 | -1.8 | 20 | -172 |
| MULTIPATH INTERFERENCE WAVE 2 | 0.15 | 14 | -100 |
| MULTIPATH INTERFERENCE WAVE 3 | 1.8 | 10 | -28 |
| MULTIPATH INTERFERENCE WAVE 4 | 5.7 | 20 | 44 |
| MULTIPATH INTERFERENCE WAVE 5 | 18 | 18 | 116 |

FIG.40

| RECEIVED SIGNAL VARIATION DETECTION RESULT | MULTIPATH INTERFERENCE DETECTION RESULT | |
|---|---|---|
| | PRESENT | ABSENT |
| DYNAMIC | LARGE STEP SIZE | SMALL STEP SIZE |
| STATIC | SMALL STEP SIZE | SMALL STEP SIZE |

FIG.42

| | CONVENTIONAL EXAMPLE | | SEVENTH EMBODIMENT |
| --- | --- | --- | --- |
| | STEP SIZE $\mu\_0$ | STEP SIZE $7\mu\_0$ | SELECTION FROM $\mu\_0$ AND $7\mu\_0$ |
| MARGINAL C/N PERFORMANCE (AWGN ONLY) | 14.9dB | 15.3dB | 14.9dB |
| MARGINAL D/U PERFORMANCE (DYNAMIC) (DELAY OF 0.1 $\mu$s, DOPPLER FREQUENCY OF 1Hz) | 0.6dB | 0dB | 0dB |
| MARGINAL D/U PERFORMANCE (STATIC) (DELAY OF 0.1 $\mu$s, PHASE OF 180°) | 0dB | 0.1dB | 0dB |

WAVEFORM EQUALIZER, WAVEFORM EQUALIZATION METHOD, AND INTEGRATED CIRCUIT

This application is based on applications Nos. 2004-148658, 2004-151540, and 2004-324811 filed in Japan, the contents of which are hereby incorporated by reference.

BACKGROUND OF THE INVENTION

1. Field of the Invention

The present invention relates to a waveform equalizer that is used in digital wireless communication such as digital broadcasting, for reducing channel distortion of a digital signal.

2. Related Art

Initially, digital broadcasting has predominantly been carried out in satellite broadcasting. In recent years, however, a tide of digitization is spreading to terrestrial broadcasting too. Waveform equalization for removing channel distortion of a digital signal is indispensable in digital terrestrial broadcasting. A conventional waveform equalizer used in digital terrestrial broadcasting is described below, taking an example of DTV (digital television) that uses an 8 VSB (8-level vestigial sideband) modulation mode adopted in the United States.

FIG. 7 shows a DTV signal format employed in the U.S. This DTV signal format is composed of a region containing a data signal 380 of data such as video and audio, a region containing a field sync signal 370, and a region containing a segment synch signal 360. FIG. 8 shows a format of the field sync signal 370. As illustrated, the field sync signal 370 includes a PN511 signal 371, three PN63 signals 372, and a control signal 373. Note here that field sync signal #2 differs from field sync signal #1 only in that the value of the middle PN63 signal 372 is inverted. In FIG. 8, the values shown on the left side (+7, +5, +3, +1, −1, −3, −5, −7) are the eight levels used in the 8 VSB modulation mode. In this DTV signal format, one frame consists of two fields, and each field consists of 313 segments and 832 symbols.

The PN511 signal 371 is a pseudo-noise signal consisting of 511 symbols. The PN63 signals 372 are each a pseudo-noise signal consisting of 63 symbols. The control signal 373 consists of 128 symbols. Thus, the field sync signal 370 contains 828 symbols in total. Since generation methods and other details of the signals such as PN511 and PN63 are not the main features of the present invention, their explanation has been omitted here. For details on these signals, see Section 5.5.2 Data Field Sync in "ATSC Standard: Digital Television Standard (A/53), Revision C" (Advanced Television Systems Committee: www.atsc.org).

The following gives a brief description of a DTV receiver which receives a DTV signal modulated in the 8 VSB modulation mode. FIG. 9 is a simplified block diagram of the DTV receiver. A tuner 302 receives a broadcast wave carrying the DTV signal via an antenna 301, and selects a reception channel and adjusts a gain in signal level. The tuner 302 then outputs the DTV signal to a demodulator 303. The demodulator 303 demodulates the DTV signal. A decoder 304 decodes the demodulated signal according to MPEG-2 (Moving Picture Experts Group—2) or the like. A display unit 305 outputs video and audio obtained as a result of the decoding.

The demodulator 303 is explained in more detail below. The demodulator 303 includes an AD converter 311, a sync detector 314, a waveform equalizer 312, an AGC (automatic gain control) 315, an AFC (automatic frequency control) 316, and an error corrector 313.

The AD converter 311 converts the DTV signal modulated in the 8 VSB modulation mode into digital form, and outputs it to the AGC 315 and the AFC 316. The AGC 315 outputs a level adjustment signal to the tuner 302 to keep the output of the tuner 302 at a constant level. The AFC 316 converts the DTV signal to baseband, and outputs the resulting DTV signal to the sync detector 314 and the waveform equalizer 312. The sync detector 314 detects a segment sync signal 360 and a field sync signal 370 from the DTV signal, and supplies a timing signal to the waveform equalizer 312 based on the detected signals. The waveform equalizer 312 performs waveform equalization on the DTV signal in accordance with the timing signal to remove distortion, and outputs the resulting DTV signal to the error corrector 313. The error corrector 313 performs error correction on the DTV signal, and outputs the resulting DTV signal to the decoder 304. The DTV signal converted to a digital signal by the AD converter 311 contains distortion components caused by negative effects of the transmission channel. The waveform equalizer 312 serves to remove such distortion components from the DTV signal.

As described above, a waveform equalizer is used in a receiver of digital wireless communication, for removing channel distortion caused by multipath interference or the like from a received signal. FIG. 4 is a block diagram showing a general construction of such a waveform equalizer. In the drawing, a filter unit 1 is a digital filter which yields output signal y(n) by removing channel distortion from input signal x(n) using tap coefficients $C_0(n)$ to $C_{k-1}(n)$ output from a tap coefficient storage unit 12. To update the tap coefficients in the waveform equalizer, a sequential update algorithm such as LMS (least mean square) or CMA (constant modulus algorithm) is employed. An error estimation unit 2 outputs e(n) which represents an error estimated to be contained in output signal y(n), using an error evaluation function specified by the algorithm. Equations 1 and 2 respectively define e(n) according to the LMS and CMA algorithms:

$$e(n)=y(n)-\hat{y}(n) \quad \text{(equation 1)}$$

$$e(n)=y(n)\times(|y(n)|^2-R) \quad \text{(equation 2)}$$

FIGS. 5A to 5C show a relationship between y(n) and $\hat{y}(n)$, which can be observed in binary amplitude modulation. In detail, FIG. 5A shows two signal points of a received signal having no distortion, as +1 and −1. Meanwhile, if a received signal has distortion and that distortion has not been completely removed in output signal y(n), a signal point closest to y(n) is selected from the signal points shown in FIG. 5A, as $\hat{y}(n)$. Which is to say, +1 is selected as $\hat{y}(n)$ in the case of an output signal corresponding to received signal 1 in FIG. 5B, and −1 is selected as $\hat{y}(n)$ in the case of an output signal corresponding to received signal 2 in FIG. 5C. The LMS algorithm derives e(n) from this $\hat{y}(n)$.

An update amount calculation unit 10 calculates a coefficient update amount $\Delta C_i(n)$ for an ith tap, according to equation 3:

$$\Delta C_i(n)=\mu \times e(n) \times x^*(n-i) \quad \text{(equation 3)}$$

where $x^*(n-i)$ is a complex conjugate of x(n−i), and μ is a constant which represents a step size that determines a speed of coefficient updates. The step size can also be called a coefficient update correction quantity.

The tap coefficient storage unit 12 solves equation 4 using tap coefficient $C_i(n-1)$ of the ith tap stored therein and coefficient update amount $\Delta C_i(n)$ output from the update amount calculation unit 10:

$$C_i(n)=C_i(n-1)-\Delta C_i(n) \quad \text{(equation 4)}$$

to obtain new tap coefficient $C_i(n)$ of the ith tap.

This tap coefficient update operation is performed for all taps i (i=0 to k−1), as a result of which the tap coefficient update operation at iteration n is complete. Such an iteration is repeated to gradually carry out waveform equalization, in order to remove channel distortion from input signal x(n).

In such a sequential update algorithm, step size $\mu$ is an important factor that affects a convergence speed of waveform equalization and a residual error after convergence. In general, when step size $\mu$ is larger, the convergence is faster, but the residual error increases. On the other hand, when step size $\mu$ is smaller, the residual error decreases, but the convergence is slower.

A problem encountered by the conventional waveform equalizer is explained in detail below, with reference to FIG. 6. As mentioned earlier, step size $\mu$ is a key determinant of the convergence speed of waveform equalization and the residual error after convergence in the conventional waveform equalizer. When step size $\mu$ is small (FIG. 6A), unnecessary tap coefficients are not generated and therefore the residual error is small. However, the convergence speed is low, as a large number of iterations are needed to reach this state. When step size $\mu$ is large (FIG. 6B), the number of iterations decreases and so the convergence speed is high. However, unnecessary tap coefficients such as i=−1 and i=3 are generated, which causes an increase in residual error. This raises a demand for a waveform equalizer that achieves both a high convergence speed and a small residual error.

To solve the problem of the above conventional waveform equalizer, Japanese Patent Application Publication H11-313013 (hereafter "patent document 1") proposes a waveform equalizer in which a tap coefficient fixing unit for fixing tap coefficients of low power taps to 0 is provided between a tap coefficient storage unit and a filter unit.

According to this technique, the tap coefficient fixing unit uniformly fixes tap coefficients which are smaller than a predetermined threshold value, to 0. This causes not only unnecessary tap coefficients but also small tap coefficients necessary for removing small multipath effects, to be changed to 0. As a result, the small multipath effects remain without being removed, and the residual error even increases.

Which is to say, when step size $\mu$ is small (FIG. 6C), the problem of slow convergence seen in FIG. 6A remains unsolved. When step size $\mu$ is large (FIG. 6D), unnecessary tap coefficients are not generated, which may contribute to a higher convergence speed and a smaller residual error. However, there is also a possibility that the residual error may increase rather than decrease, since a small tap coefficient such as i=1 that is necessary for removing multipath is fixed to 0.

Also, Japanese Patent Application Publication No. 2000-295149 (pp. 4-5, FIG. 1) (hereafter "patent document 2") proposes a waveform equalizer which controls coefficient update amounts depending on whether the convergence speed needs to be increased, in order to solve the problem of the conventional waveform equalizer. This waveform equalizer includes a residual distortion variation monitor means for monitoring an amount of change of distortion contained in a signal after waveform equalization with respect to time. The coefficient update amounts are controlled based on the output of this residual distortion variation monitor means.

FIG. 28 shows a construction of the waveform equalizer disclosed in patent document 2. As shown in the drawing, this waveform equalizer is roughly made up of an input terminal 201, a transversal filter 202, a distortion detector 203, a coefficient update unit 204, a distortion variation detector 205, and an output terminal 206.

It should be noted here that the distortion detector 203 corresponds to the error estimation unit 2 in FIG. 4, and the coefficient update unit 204 corresponds to the tap coefficient storage unit 12 and the update amount calculation unit 10.

A received signal input at the input terminal 201 is fed to the transversal filter 202 and the coefficient update unit 204. The distortion detector 203 receives an output signal of the transversal filter 202, and detects channel distortion in the output signal. This detection of channel distortion by the distortion detector 203 can be conducted using any of the following two methods. One method calculates a difference between the output signal of the transversal filter 202 and a known signal inserted in a transmitted signal, as an amount of distortion. The other method calculates a difference between the output signal of the transversal filter 202 and one of the signed signal points of a transmitted signal, e.g. the eight levels (+7, +5, +3, +1, −1, −3, −5, −7) in 8 VSB modulation, that is closest to the output signal, as an amount of distortion. The distortion amount calculated by the distortion detector 203 is output to the coefficient update unit 204 and the distortion variation detector 205. The coefficient update unit 204 calculates-update amounts of coefficients of the transversal filter 202 from the distortion amount received from the distortion detector 203, the input signal received from the input terminal 201, and a step size, and updates the coefficients using the update amounts. This operation is repeated to remove distortion and thereby accomplish waveform equalization. In the meantime, the distortion variation detector 205 detects a temporal change in distortion amount received from the distortion detector 203, and outputs a detection result to the coefficient update unit 204. If the output of the distortion variation detector 205 is large, the coefficient update unit 204 increases the step size to accelerate waveform equalization. If the output of the distortion variation detector 205 is small, on the other hand, the coefficient update unit 204 decreases the step size to stabilize waveform equalization.

Thus, the step size in the coefficient update unit 204 is changed depending on the output of the distortion variation detector 205. By doing so, the coefficient update amounts are decreased to stabilize waveform equalization if the amount of distortion is stable without much varying with time, and increased to accelerate waveform equalization if the amount of distortion varies with time as in the case of fading and the like.

However, this waveform equalizer has the following problems. When the distortion detector 203 uses an algorithm such as CMA which detects different distortion amounts for different signed signal points even if deviations from the signed signal points are equal (see FIG. 29), the deviation variation detector 205 wrongly detects a variation in distortion amount even when a dynamic ghost, which causes the distortion amount to vary at high speed, is actually not present.

Also, noise components like AWGN (additive white Gaussian noise) remain in the output of the transversal filter 202. This causes a temporal variation in detected distortion, which may result in incorrect control of coefficient update amounts.

Furthermore, given that the step size is controlled according to the temporal variation of distortion contained in the output of waveform equalization, there is a possibility that the operation may slip into an endless loop. Which is to say, when the received signal contains dynamic multipath interference, a temporal change in distortion is detected and the step size is increased, as a result of which the temporal change in distortion diminishes. In response, the step size is decreased, which in turn initiates a temporal change in distortion.

Although a receiver for receiving an 8 VSB DTV signal has been described here for ease of explanation, the problems stated above are not limited to such, as they are commonly seen in receivers of U.S. cable digital broadcasting, wireless LAN or ADSL, and other digital wireless communication.

SUMMARY OF THE INVENTION

In view of the above, it is a first object of the present invention to provide a waveform equalizer that achieves both a higher convergence speed and a smaller residual error without failing to remove small multipath effects.

It is a second object of the present invention to provide a waveform equalizer capable of controlling a step size according to a received signal.

The first object can be achieved by a waveform equalizer including: a filter unit operable to perform waveform equalization on an input signal $x(n)$ to generate an output signal $y(n)$ in an nth iteration; an error estimation unit operable to estimate a waveform equalization error $e(n)$ in the output signal $y(n)$, and output the waveform equalization error $e(n)$; an update amount calculation unit operable to calculate a coefficient update amount $\Delta C_i(n)$ for an ith tap in the filter unit, using the waveform equalization error $e(n)$, an input signal $x(n-i)$ in an $(n-i)$th iteration, and a tap coefficient $C_i(n-1)$ of the ith tap; and a tap coefficient storage unit operable to calculate a new tap coefficient $C_i(n)$ of the ith tap using the tap coefficient $C_i(n-1)$ of the ith tap and the coefficient update amount $\Delta C_i(n)$, and store the new tap coefficient $C_i(n)$ therein.

According to this construction, the update amount calculation unit calculates the coefficient update amount $\Delta C_i(n)$ for the ith tap, using the tap coefficient $C_i(n-1)$ in addition to the waveform equalization error $e(n)$ and the input signal $x(n-i)$. By such adjusting $\Delta C_i(n)$ according to $C_i(n-1)$, both an increase in convergence speed and a reduction in residual error can be attained.

Here, the update amount calculation unit may calculate the coefficient update amount $\Delta C_i(n)$ according to an equation $$\Delta C_i(n) = \alpha_i(n) \times \mu \times e(n) \times x^*(n-i)$$

where $\mu$ is a constant, $x^*(n-i)$ is a complex conjugate of the input signal $x(n-i)$, and $\alpha_i(n)$ is a function of $C_i(n-1)$.

According to this construction, the conventional coefficient update amount is multiplied by $\alpha_i(n) = f(C_i(n-1))$. By such adjusting $\Delta C_i(n)$ according to $C_i(n-1)$, both an increase in convergence speed and a reduction in residual error can be attained.

Here, $\alpha_i(n)$ may monotonically increase with a magnitude of $C_i(n-1)$ in a range of $0 < \alpha_i(n) \leq 1$.

According to this construction, a small $\alpha_i(n)$ is assigned to a tap having a relatively small tap coefficient. This has the same effect as decreasing the step size $\mu$, so that the residual error can be reduced. The use of $\alpha_i(n)$ enables the waveform equalizer to employ a large step size $\mu$, with it being possible to deliver both a higher convergence speed and a smaller residual error.

Here, the magnitude of $C_i(n-1)$ may be $|C_i(n-1)|$, wherein $\alpha_i(n) = a$ if $|C_i(n-1)| < b$, $\alpha_i(n) = 1$ if $|C_i(n-1)| \geq b$, where $a < 1$.

Also, the second object can be achieved by the waveform equalizer which further includes at least one detection unit out of: a multipath interference detection unit operable to judge whether a received signal contains multipath interference; and a received signal variation detection unit operable to judge whether the received signal contains dynamic multipath interference or static multipath interference, wherein the constant $\mu$ is controlled according to a judgment result of the at least one detection unit.

According to this construction, the step size $\mu$ is changed according to the received signal. In detail, if multipath interference exists or if the received signal contains dynamic multipath interference, the step size $\mu$ is increased to accelerate waveform equalization. If multipath interference does not exist or if the received signal contains static multipath interference, the step size $\mu$ is decreased to reduce a residual error.

Here, the multipath interference detection unit may include: a computation unit operable to perform a computation using at least one of first to Nth largest values out of absolute values of correlation values calculated from the received signal and a known signal inserted in a transmitted signal; and a comparison unit operable to compare a computation result of the computation unit with a threshold value, wherein the multipath interference detection unit judges whether the received signal contains multipath interference, based on a comparison result of the comparison unit.

According to this construction, the absolute value of the correlation value calculated from the received signal and the known signal inserted in the transmitted signal is compared with the threshold value, with it being possible to accurately judge the presence or absence of multipath interference.

Here, the received signal variation detection unit may include: m statistic computation units each operable to compute a statistic for a different one of m values taken from first to Nth largest values out of absolute values of correlation values, the correlation values being calculated from the received signal and a known signal inserted in a transmitted signal, m being a natural number such that $m \leq N$; and m comparison units operable to compare statistics computed for the m values with predetermined threshold values respectively, wherein the received signal variation detection unit judges whether the received signal contains dynamic multipath interference or static multipath interference, based on comparison results of the m comparison units.

According to this construction, the dynamic or static nature of multipath interference contained in the received signal can be judged accurately.

Here, the function of $C_i(n-1)$ used as $\alpha_i(n)$ may differ according to the constant $\mu$.

According to this construction, an optimal function can be used as $\alpha_i(n)$ depending on the step size $\mu$.

The present invention described above is applicable to waveform equalizers in digital broadcast receivers. The present invention is also applicable to waveform equalizers in other wireless receivers such as wireless LAN receivers. The present invention is further applicable to waveform equalizers in wired communication receivers.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIGS. 3A to 3F show specific examples of $\alpha_i(n)$ in the first embodiment;

FIG. 27 shows effects achieved by the second embodiment;

FIG. 33 shows a composite multipath interference wave of a channel from which the first correlation values shown in FIGS. 25 and 32 derive;

FIG. 40 shows criteria used by a judgment unit shown in FIG. 39;

FIG. 42 shows effects achieved by the seventh embodiment;

DESCRIPTION OF THE PREFERRED EMBODIMENTS

Figure 1:
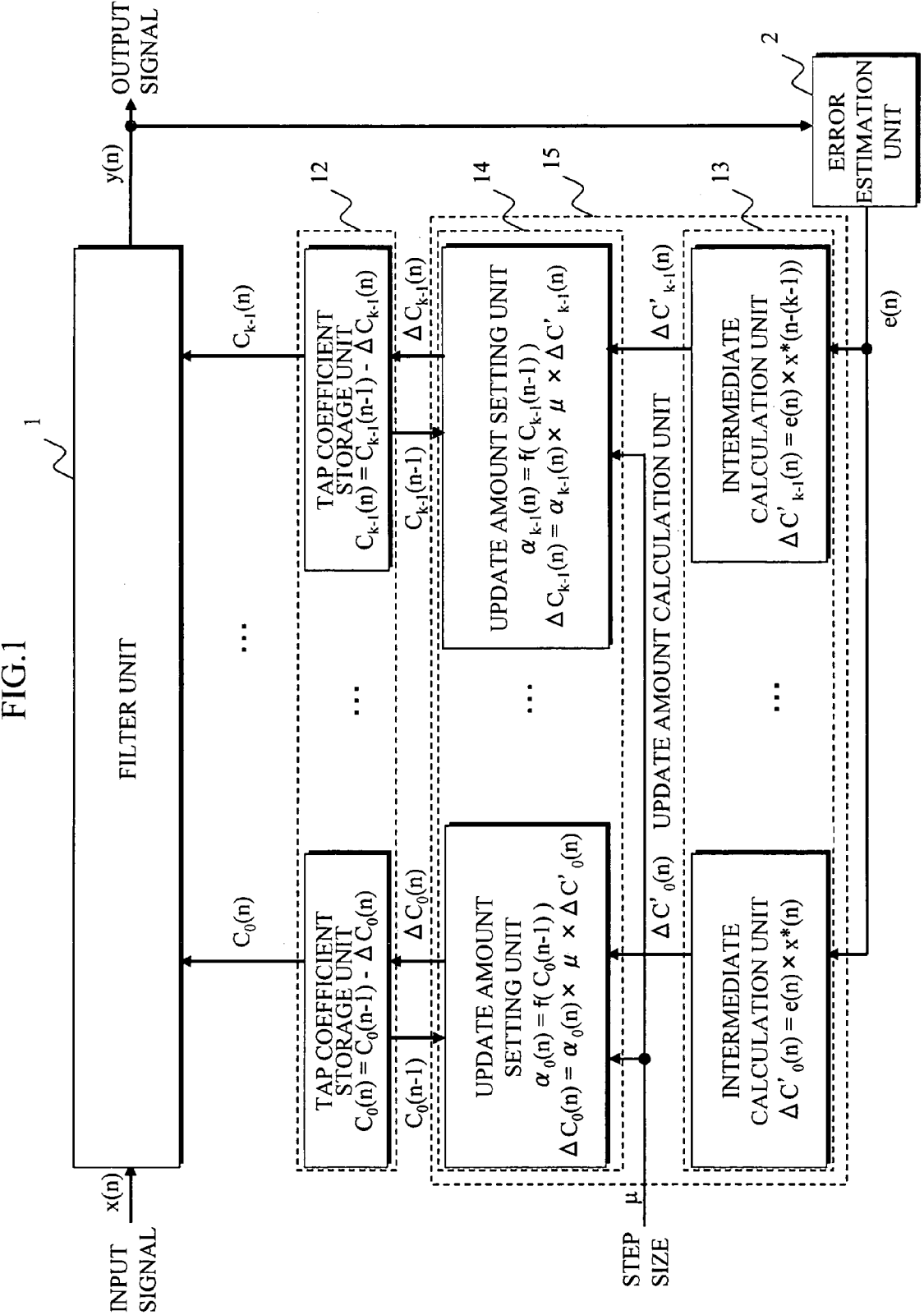
FIG. 1 is a block diagram of a waveform equalizer according to a first embodiment of the present invention.

The following describes embodiments of the present invention by referring to the drawings.

First Embodiment

Figure 9:
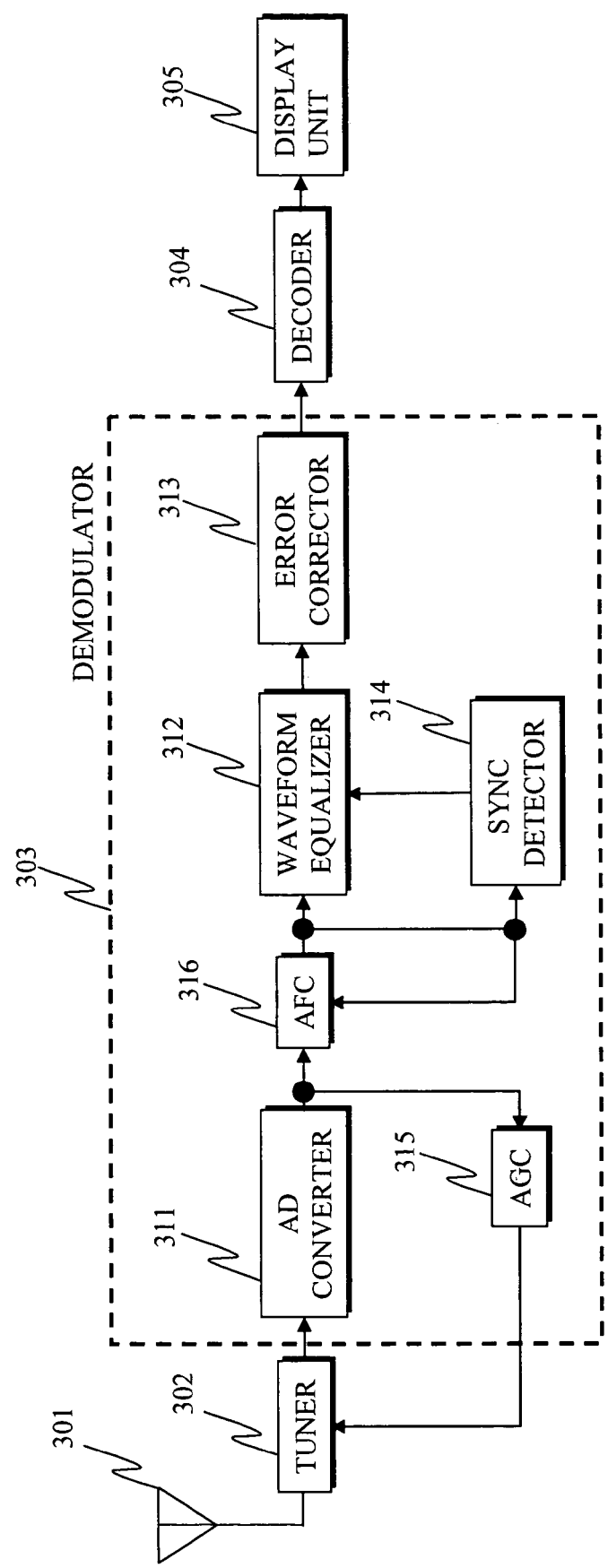
FIG. 9 is a simplified block diagram of a receiver.

FIG. 1 is a block diagram of a waveform equalizer according to a first embodiment of the present invention. In FIG. 1, construction elements which are the same as those shown in FIG. 4 have been given the same reference numerals and their explanation has been omitted. The waveform equalizer shown in FIG. 1 can be applied to the waveform equalizer 312 included in the receiver shown in FIG. 9.

In FIG. 1, an intermediate calculation unit 13 and an update amount setting unit 14 constitute an update amount calculation unit 15.

The intermediate calculation unit 13 calculates intermediate value $\Delta C'_i(n)$ used for setting a coefficient update amount for an ith tap, according to equation 5:

$$\Delta C'_i(n) = e(n) \times x^*(n-i) \qquad \text{(equation 5)}$$

and outputs $\Delta C'_i(n)$.

Figure 2:
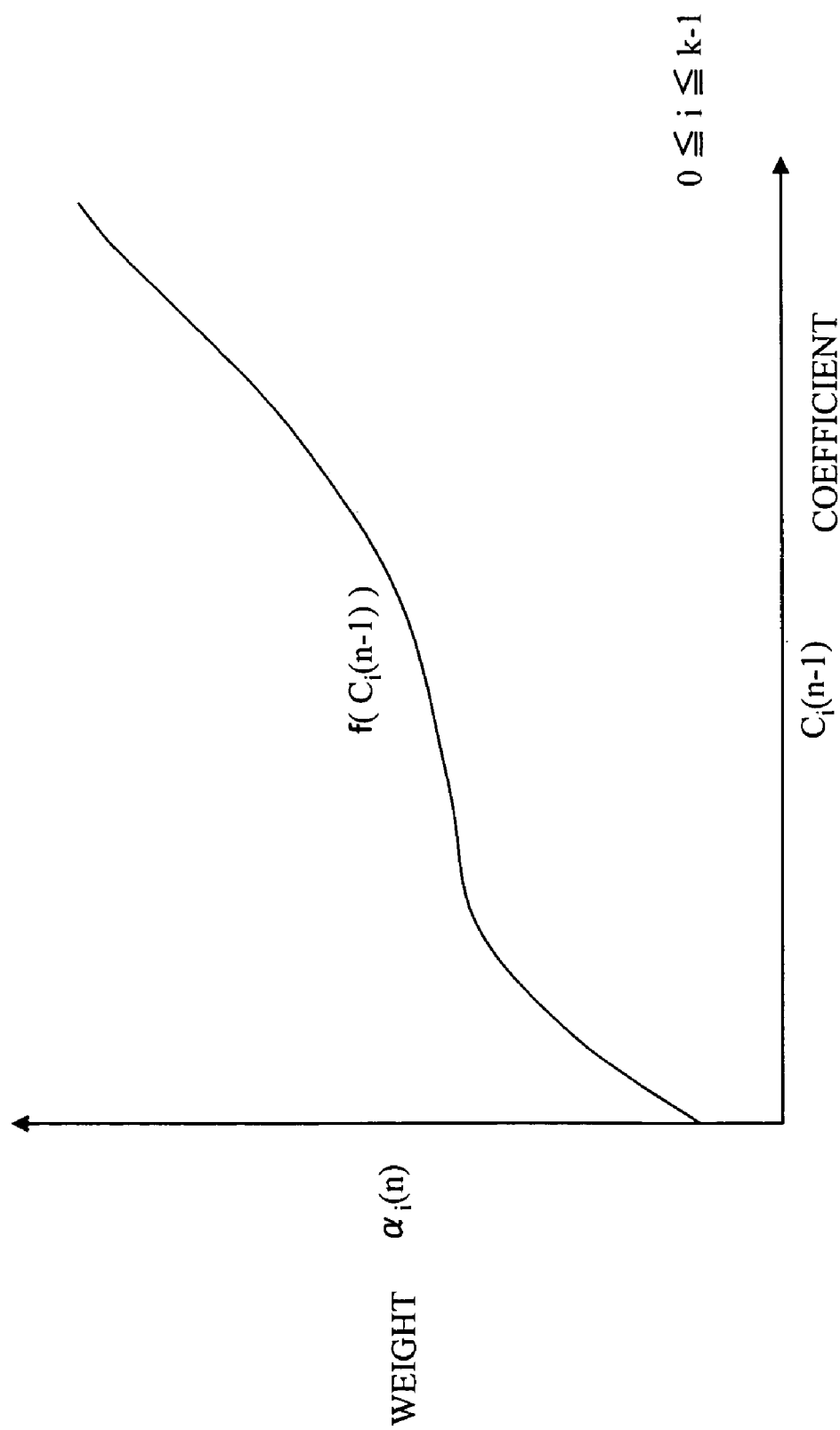
FIG. 2 shows weight $\alpha_i(n)$ used in the first embodiment.

The update amount setting unit 14 sets coefficient update amount $\Delta C_i(n)$ for the ith tap according to equation 6:

$$\Delta C_i(n) = \alpha_i(n) \times \mu \times \Delta C'_i(n) \qquad \text{(equation 6)}$$

and outputs $\Delta C_i(n)$. Here, $\alpha_i(n)$ is a weight assigned to the coefficient update amount for the ith tap at iteration n, where $0 < \alpha_i(n) \leq 1$. As shown in FIG. 2, $\alpha_i(n)$ is a function defined by $f(C_i(n-1))$, which monotonically increases with a magnitude of tap coefficient $C_i(n-1)$ of the ith tap calculated at iteration n−1 and stored in the tap coefficient storage unit 12. FIGS. 3A to 3F show specific examples of $f(C_i(n-1))$. In each of these drawings, $\alpha_i(n)$ increases and approaches to 1 as a parameter representing the magnitude of $C_i(n-1)$, such as power or an absolute value of $C_i(n-1)$, increases.

Figure 4:
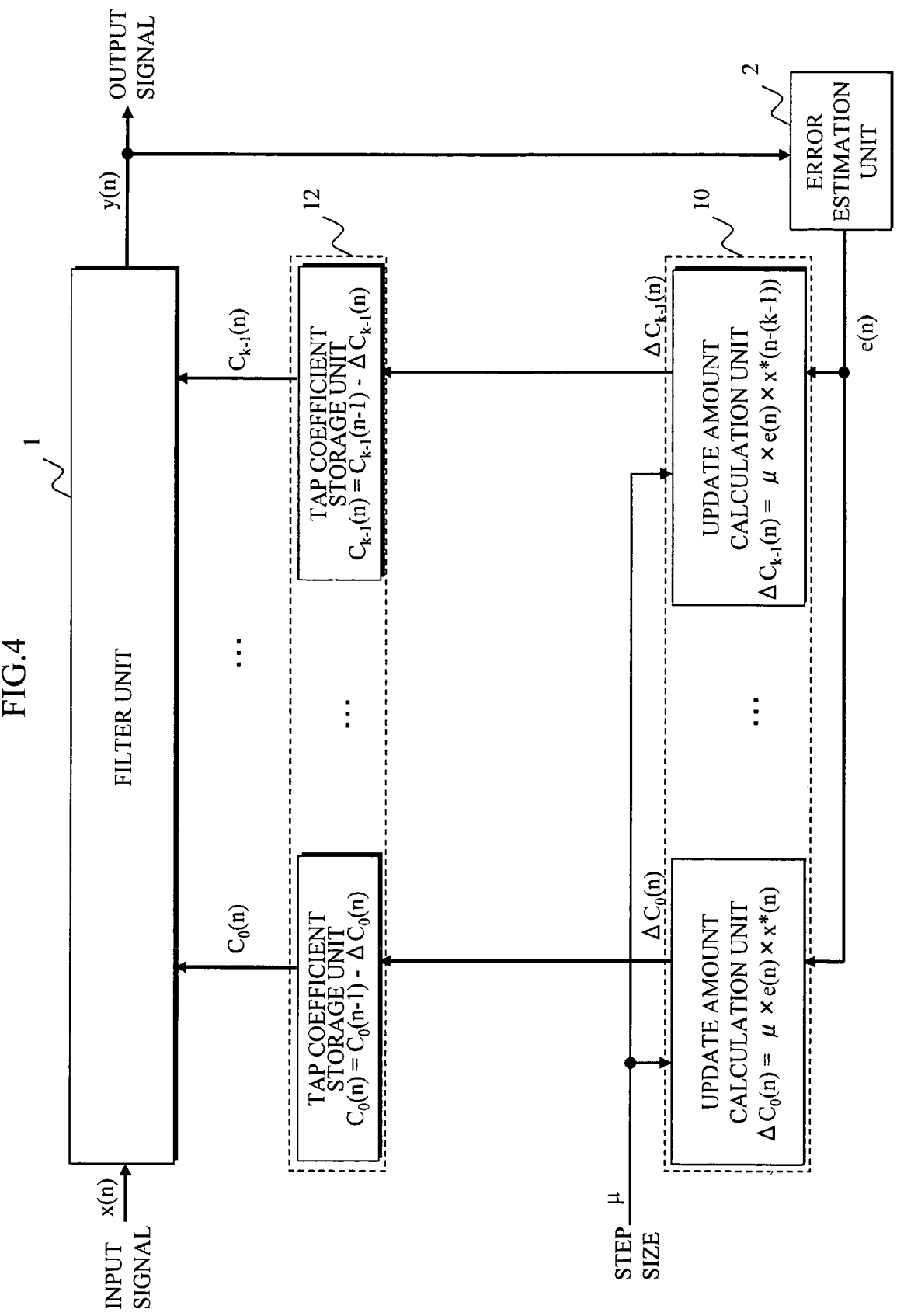
FIG. 4 is a block diagram of a conventional waveform equalizer.
Figure 5A:
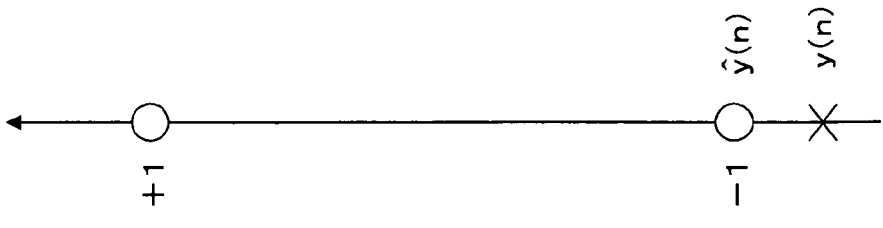
FIGS. 5A to 5C show specific examples of calculation of e(n) according to the LMS algorithm in the conventional waveform equalizer.
Figure 5B:
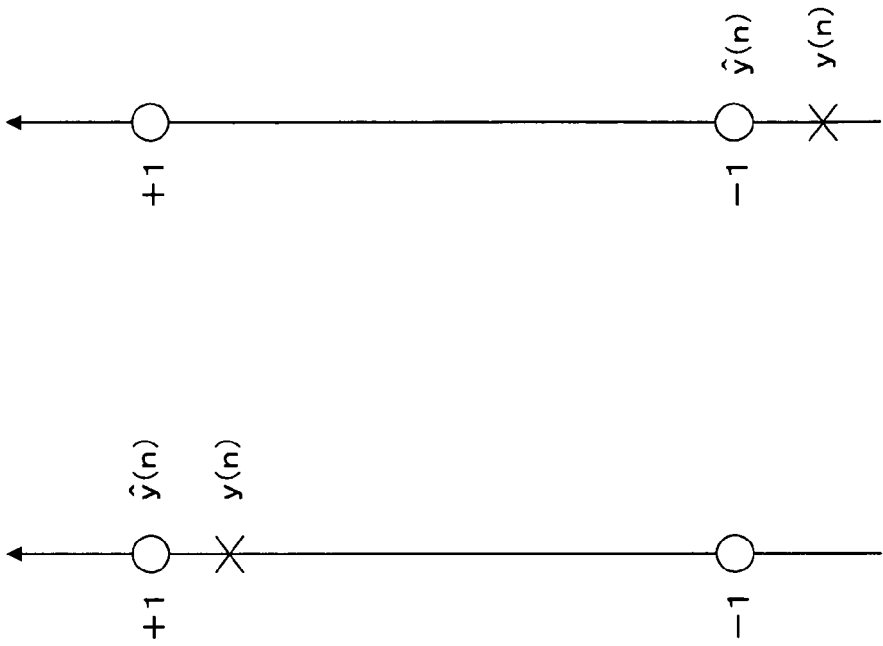
Figure 5C:
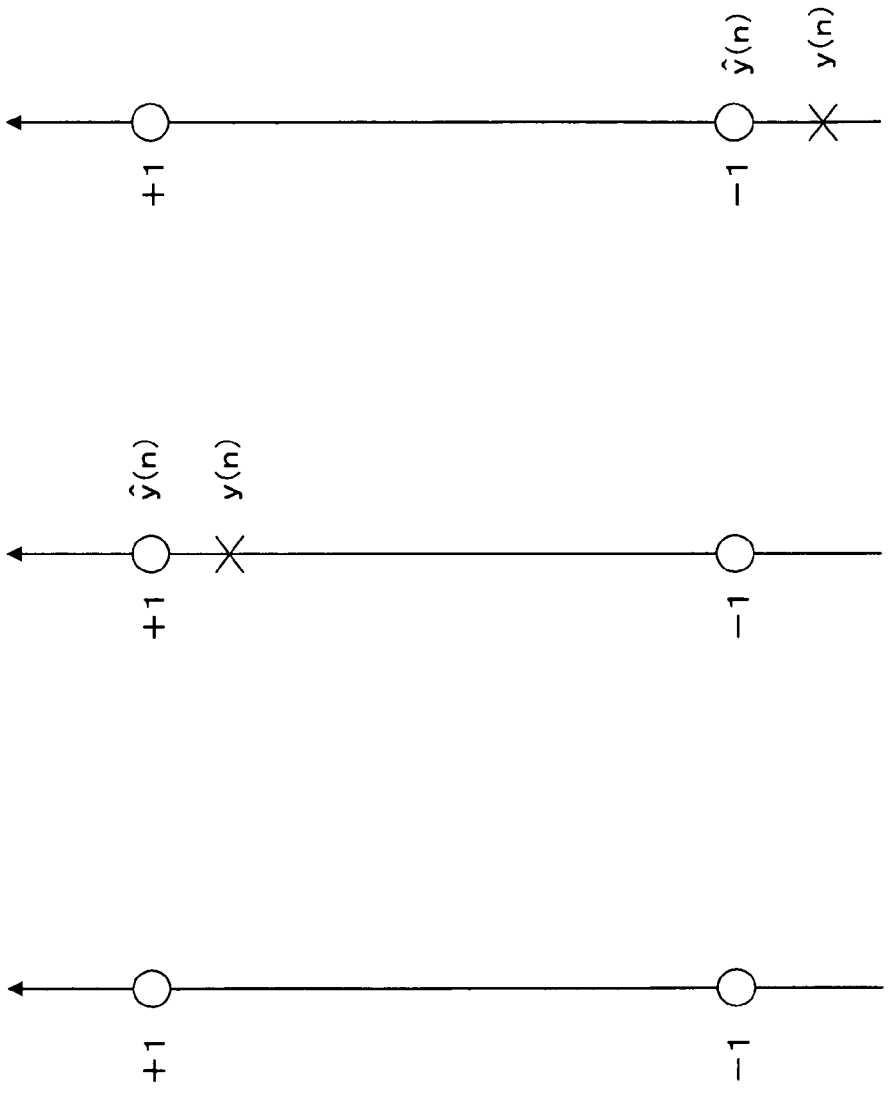
Figure 6A:
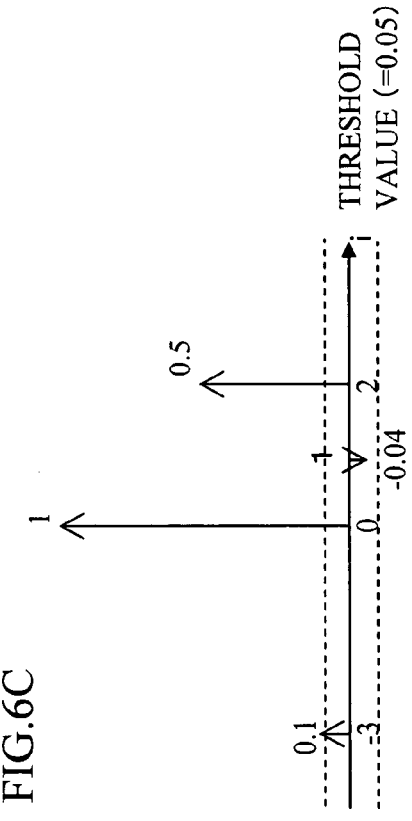
FIGS. 6A to 6D show a relationship between step sizes and tap coefficients, in the conventional waveform equalizer shown in FIG. 4 and a conventional waveform equalizer disclosed in patent document 1.
Figure 6B:
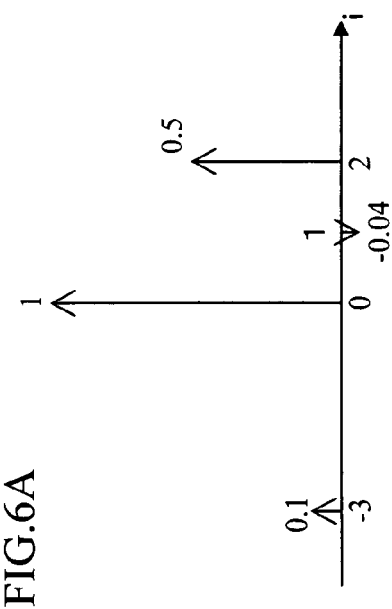
Figure 6C:
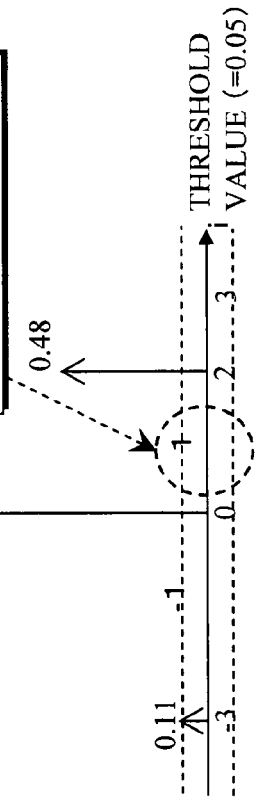

In the conventional waveform equalizer shown in FIG. 4, when step size $\mu$ is increased, small tap coefficients of taps such as i=−1 and i=3 shown in FIG. 6B cause an increase in residual error. In view of this, the first embodiment of the present invention multiplies the coefficient update amount of the conventional waveform equalizer by $\alpha_i(n)$ which monotonically increases with the magnitude of $C_i(n-1)$ in a range of $0 < \alpha_i(n) \leq 1$.

A tap which affects the convergence speed is a tap relevant to multipath, that is, a tap having a relatively large tap coefficient. For such a tap, $\alpha_i(n)$ is set to be close to 1. This has the same effect as increasing step size $\mu$. On the other hand, a tap which affects the residual error is a tap irrelevant to multipath, that is, a tap having a relatively small tap coefficient. For such a tap, $\alpha_i(n)$ is set to be close to 0. This has the same effect as decreasing step size $\mu$.

Even when $C_i(n-1)=0$, $\alpha_i(n)\neq0$ (e.g. the value a in FIG. 3A). Substituting $\alpha_i(n)=0$ into equation 6 yields $\Delta C_i(n)=0$. This means once $C_i(n)$ has become 0, it remains 0 thereafter. To avoid this, $\alpha_i(n)$ is set to be nonzero.

Figure 6D:
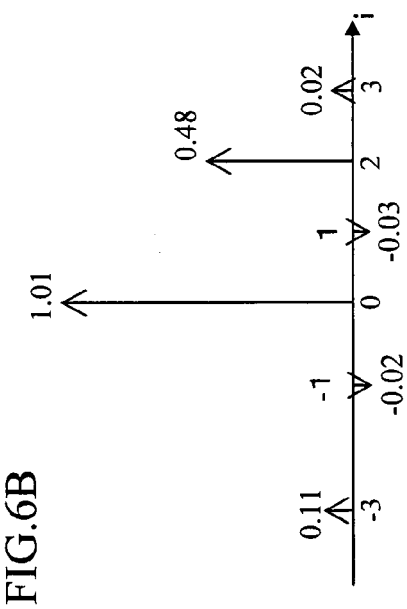
Figure 7:
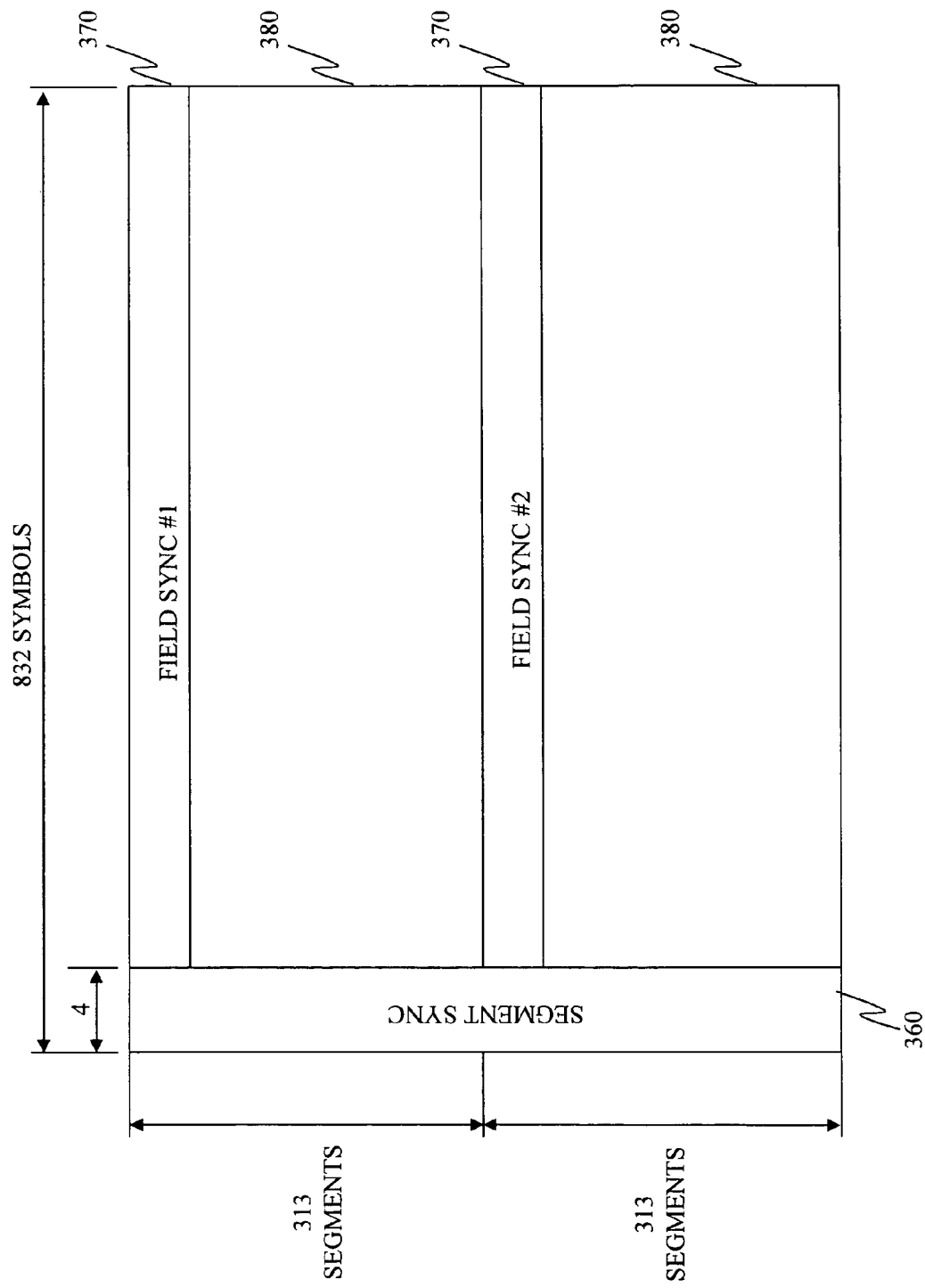
FIG. 7 shows a DTV signal format employed in the U.S.
Figure 8:
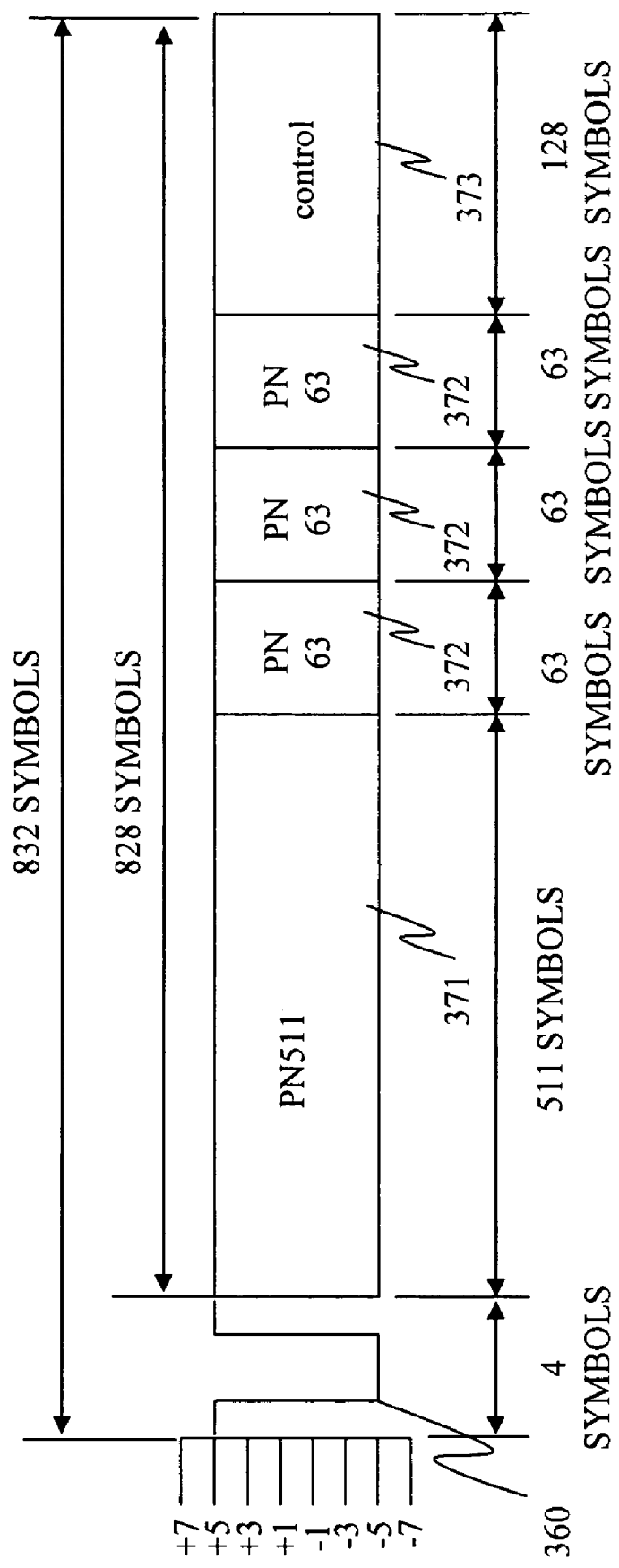
FIG. 8 shows the DTV signal format employed in the U.S.

Since $\alpha_i(n)\neq0$, a tap coefficient of a low power tap will not be fixed at 0 unlike the conventional waveform equalizer disclosed in patent document 1. This prevents a tap coefficient of a tap, such as i=1 in FIG. 6D, which is necessary for removing small multipath effects, from being fixed at 0. Hence the problem encountered by the waveform equalizer of patent document 1 can be solved.

Figure 10:
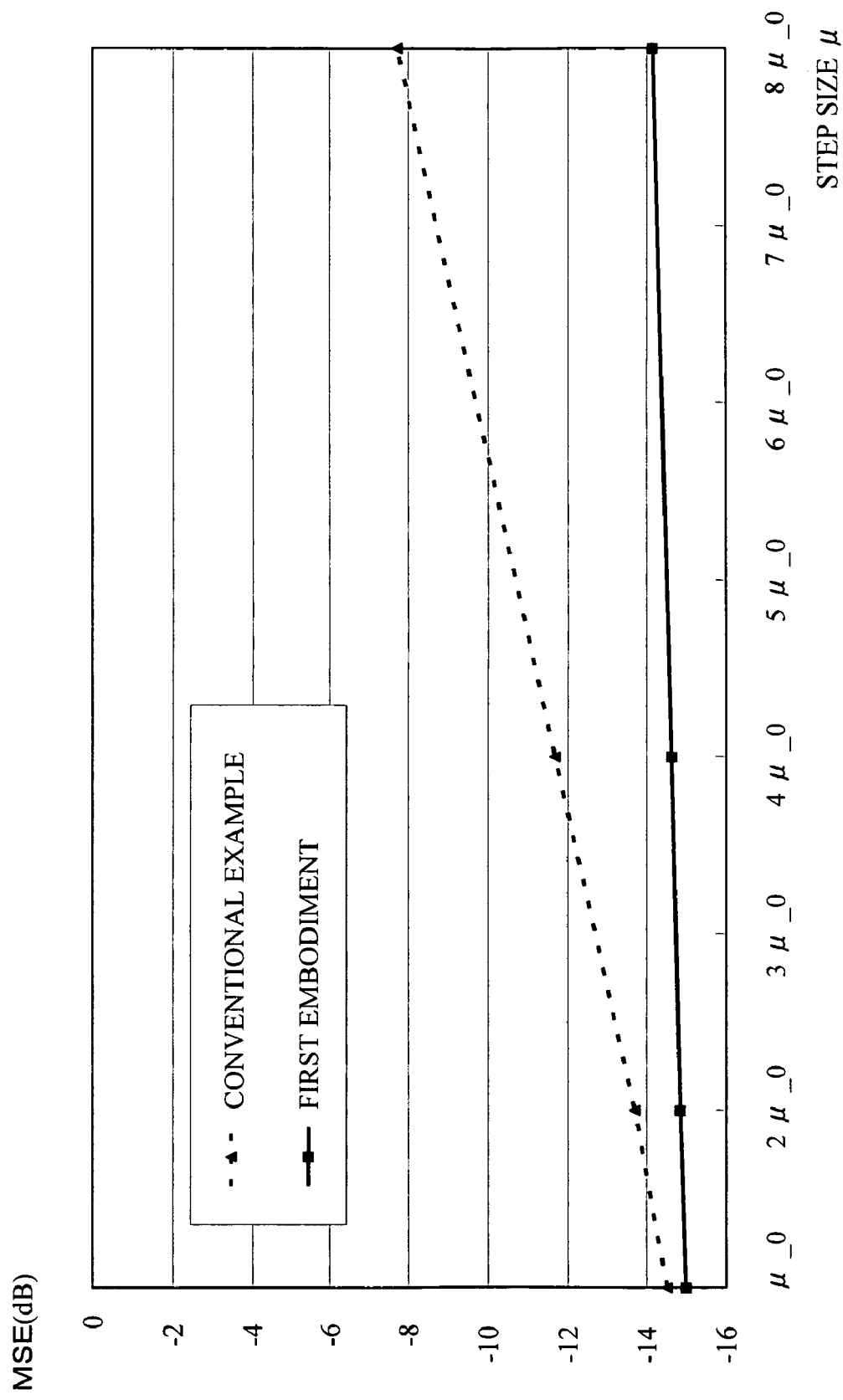
FIG. 10 shows effects achieved by the first embodiment.

FIG. 10 shows simulation results that demonstrate effects achieved by the first embodiment. Simulations were performed using a signal in an AWGN environment (C/N=15 dB) to which static multipath interference (see FIG. 33 for delay, phase, and D/U of multipath interference waves) has been added, as an input signal. In FIG. 10, a horizontal axis represents step size $\mu$, which takes the values from $\mu\_0$ to $8\mu\_0$ that is the eightfold of $\mu\_0$. A vertical axis represents an MSE (mean square error) in dB between an output signal after waveform equalization and a desired signal. A smaller MSE means a smaller residual error in the output signal. As can be understood from FIG. 10, the waveform equalizer of the first embodiment reduces the residual error when compared with a conventional waveform equalizer. In both the waveform equalizer of the first embodiment and the conventional waveform equalizer, the residual error tends to increase when step size $\mu$ increases. However, for the same level of MSE such as −14 dB, the waveform equalizer of the first embodiment can increase step size $\mu$ to $8\mu\_0$, whereas the conventional waveform equalizer can increase step size $\mu$ only up to about $2\mu\_0$. In other words, the waveform equalizer of the first embodiment can use a larger step size than the conventional waveform equalizer. This contributes to a higher tracking capability in waveform equalization.

Although the LMS algorithm and the CMA algorithm are mentioned as examples of the coefficient update algorithm in the first embodiment and the related art, the present invention is not limited to such, so long as a sequential update algorithm is employed as the coefficient update algorithm. Also, the first embodiment describes the functions shown in FIGS. 3A to 3F as examples of $\alpha_i(n)$, but the present invention is not limited to such functions, so long as $\alpha_i(n)$ monotonically increases with the magnitude of $C_i(n-1)$ and is nonzero even when $C_i(n-1)=0$. Further, the first embodiment describes the case where the multiplication by $\alpha_i(n)$ is performed after the calculation of $\Delta C'_i(n)$, but these calculations can be performed in any order so long as equation 7 holds in the end:

$$\Delta C_i(n)=\alpha_i(n)\times\mu\times e(n)\times x^*(n-i) \quad \text{(equation 7)}$$

The first embodiment describes the case where $\alpha_i(n)$ has an upper limit of 1, but the upper limit of $\alpha_i(n)$ is determined in relation to step size $\mu$, and is not limited to 1.

Figure 11B:
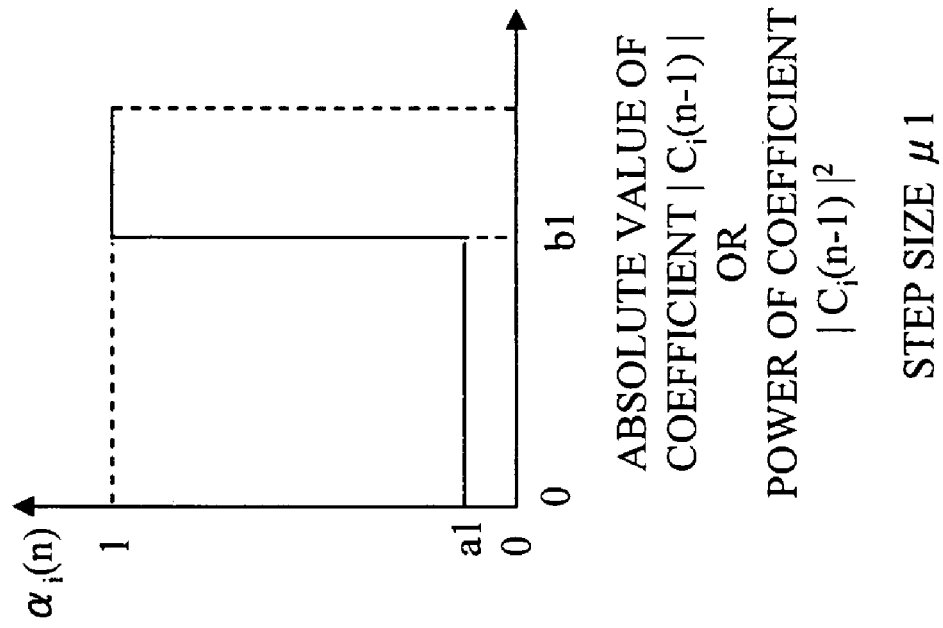
FIG. 11 shows specific examples of $\alpha_i(n)$ in a modification to the first embodiment.
Figure 11A:
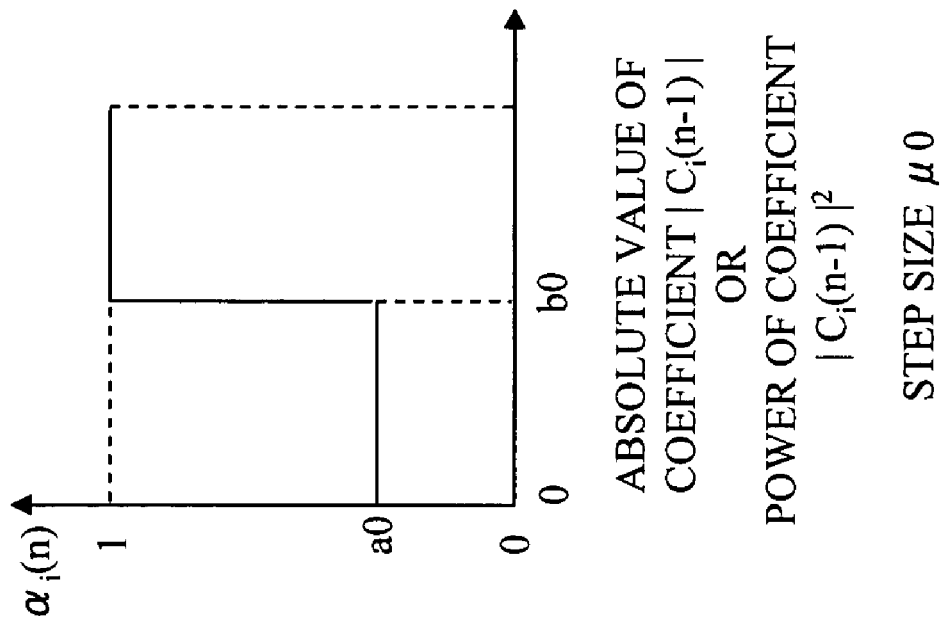

The first embodiment may be modified such that a different function is used as weight $\alpha_i(n)$ depending on step size $\mu$. FIGS. 11A and 11B show this modification applied to $\alpha_i(n)$ such as the one shown in FIG. 3B, as an example. When step size $\mu$ is $\mu0$, parameters a and b of $\alpha_i(n)$ are respectively a0 and b0, as shown in FIG. 11A. When step size $\mu$ is $\mu1$, on the other hand, parameters a and b of $\alpha_i(n)$ are respectively a1 and b1, as shown in FIG. 11B. Thus, $\alpha_i(n)$ may be altered depending on step size $\mu$. Though the parameters of the function shown in FIG. 3B are changed depending on step size $\mu$ in this example, the present invention is not limited to this. For example, completely different functions may be used as $\alpha_i(n)$ depending on step size $\mu$, such as using the function shown in FIG. 3B when step size $\mu$ is $\mu0$ and using the function shown in FIG. 3C when step size $\mu$ is $\mu1$. The update speed and amount of $C_i(n)$ change when step size $\mu$ changes. As a result, an appropriate gain for approaching a relatively small tap coefficient to 0 changes too. In view of this, $\alpha_i(n)$ which serves as the gain for approaching a relatively small tap coefficient to 0 is adjusted depending on step size $\mu$ in this modification. In this way, the residual error can be minimized optimally according to step size $\mu$.

Second Embodiment

A waveform equalizer according to a second embodiment of the present invention is described below, with reference to FIGS. 12, 13, 25, and 27.

Figure 12:
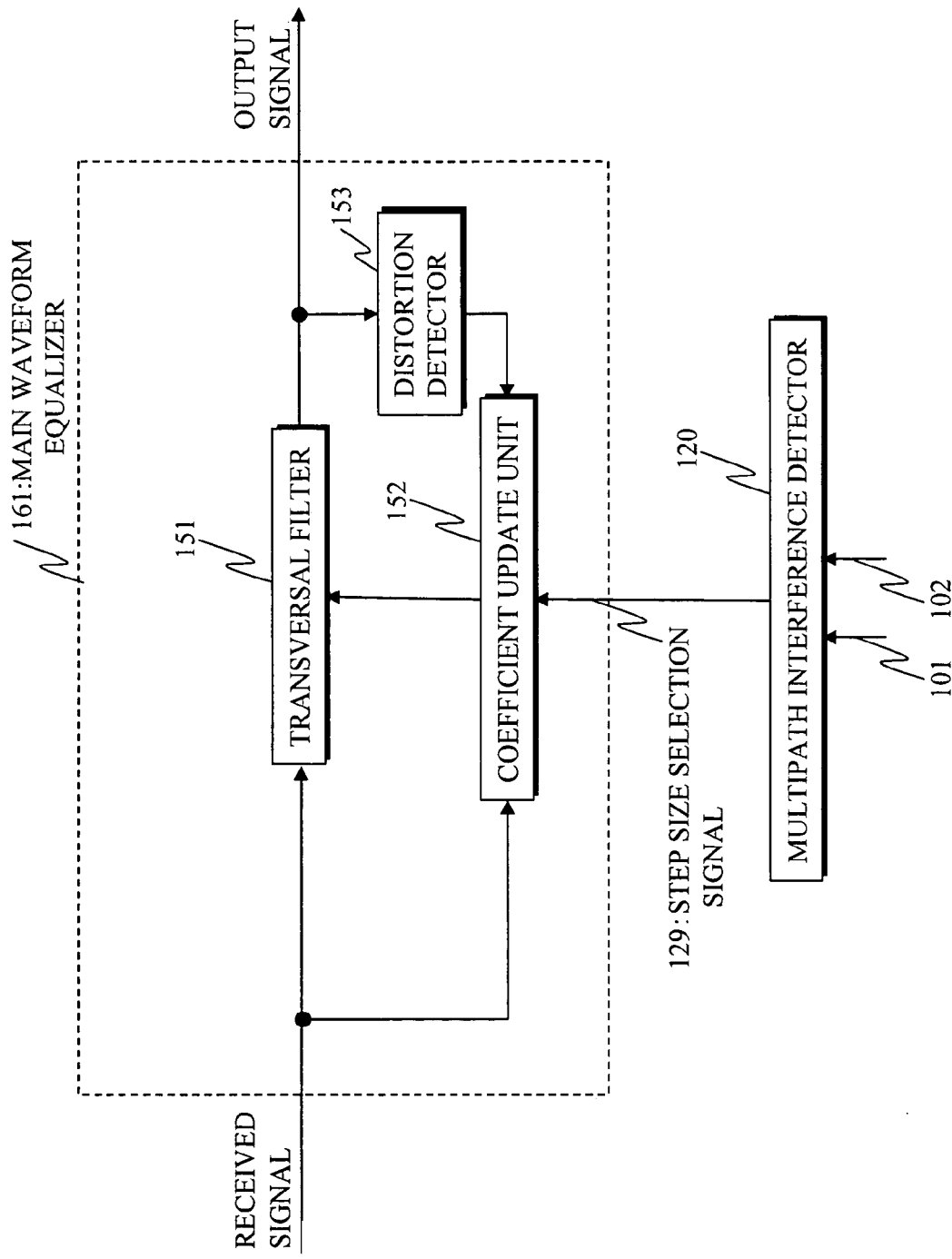
FIG. 12 is a block diagram of a waveform equalizer according to a second embodiment of the present invention.

FIG. 12 is a block diagram of the waveform equalizer in the second embodiment. As shown in FIG. 12, this waveform equalizer is roughly made up of a main waveform equalizer 161 and a multipath interference detector 120.

A received signal of the main waveform equalizer 161 is fed to a transversal filter 151 and a coefficient update unit 152. A distortion detector 153 receives an output signal of the transversal filter 151, and estimates an error contained in the output signal. This error estimation can be conducted using the LMS algorithm or the CMA algorithm mentioned in the description of the related art. Hence the distortion detector 153 can be realized by a construction similar to the error estimation unit 2 shown in FIG. 4.

An output of the distortion detector 153 is fed to the coefficient update unit 152. The coefficient update unit 152 calculates coefficient update amounts for the transversal filter 151 from the output of the distortion detector 153, the received signal of the main waveform equalizer 161, and a step size, and updates tap coefficients of the transversal filter 151 using the calculated coefficient update amounts. This operation is repeated to remove distortion and accomplish waveform equalization. Here, the coefficient update unit 152 has step size A and step size B. Step size A is set to a small value, whereas step size B is set to a large value. The coefficient update unit 152 calculates the coefficient update amounts using one of step size A and step size B.

Figure 13:
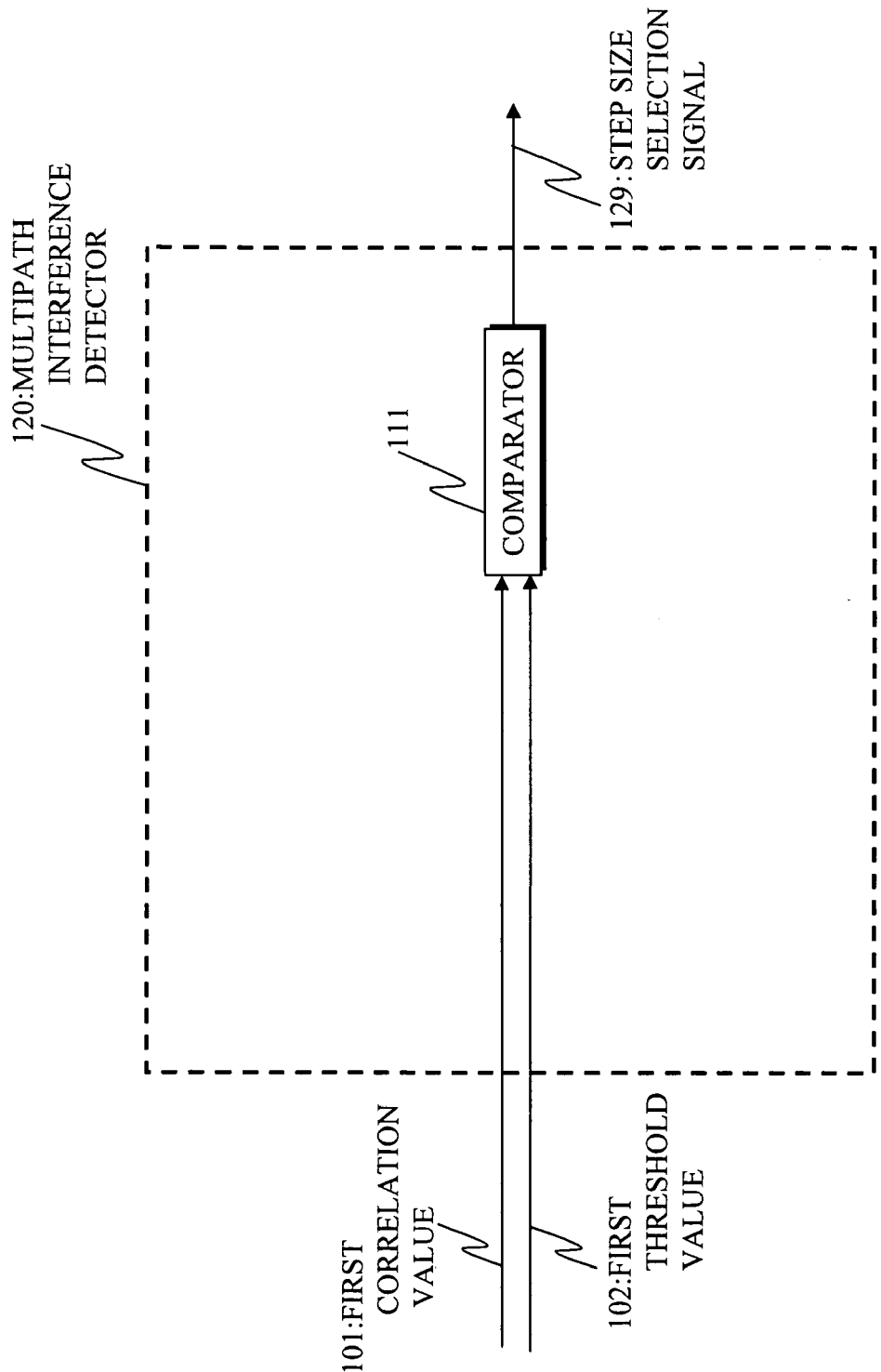
FIG. 13 is a block diagram of a multipath interference detector shown in FIG. 12.

FIG. 13 is a block diagram of the multipath interference detector 120. As illustrated, the multipath interference detector 120 includes a comparator 111.

The multipath interference detector 120 receives first correlation value 101 from a correlation calculator (not illustrated) which calculates correlation values between the received signal and a sync signal inserted in a transmitted signal. First correlation value 101 referred to here is a largest absolute value out of the absolute values of the correlation values calculated by the correlation calculator. First correlation value 101 and first threshold value 102 are input to the comparator 111, which compares the two values. If first correlation value 101 is no smaller than first threshold value 102, the comparator 111 judges that the received signal does not contain multipath interference, and outputs step size selection signal 129 to select step size A to the coefficient update unit 152 in the main waveform equalizer 161. If first correlation value 101 is smaller than first threshold value 102, the comparator 111 judges that the received signal contains multipath interference, and outputs step size selection signal 129 to select step size B to the coefficient update unit 152.

The coefficient update unit 152 selects one of step size A and step size B according to step size selection signal 129, and calculates the coefficient update amounts using the selected step size.

Figure 25:
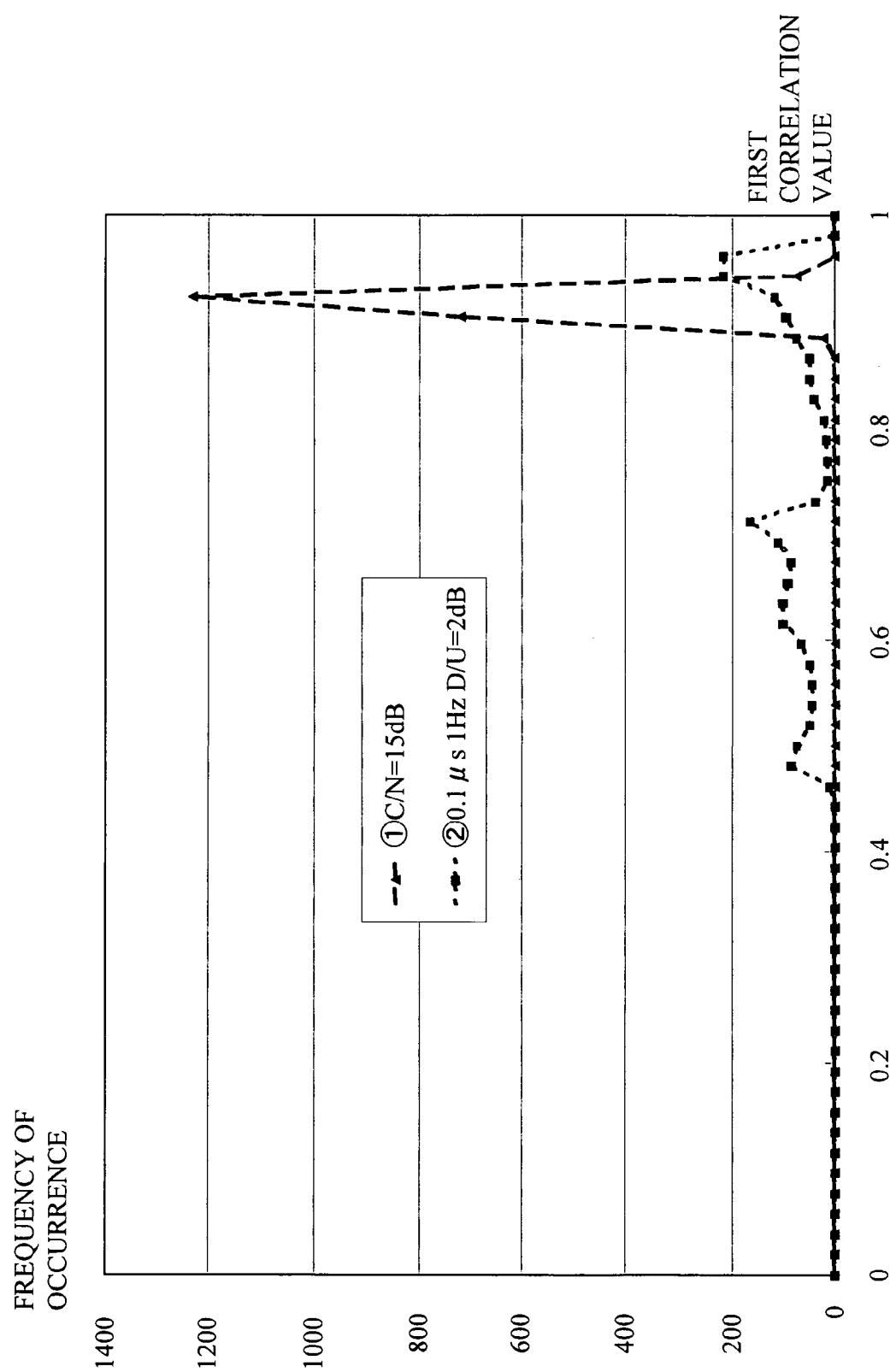
FIG. 25 shows a frequency of occurrence of first correlation values.

FIG. 25 shows a distribution in frequency of occurrence of first correlation value 101 (2500 sets of data), in each of an AWGN environment (C/N=15 dB) and a multipath interference environment (delay of 0.1 µs, Doppler frequency of 1 Hz, and D/U=2 dB), as one example. As can be seen from the drawing, first correlation value 101 tends to be small more frequently in the multipath interference environment than in the AWGN environment. Thus, the frequency of occurrence of first correlation value 101 in the multipath interference environment has a different distribution from that in the AWGN environment. Accordingly, by setting first threshold value 102 at 0.9 and comparing first correlation value 101 with such first threshold value 102, the presence or absence of multipath interference can be judged.

FIG. 27 shows simulation results which demonstrate effects achieved by the second embodiment. Having set step size A to µ_0 and step size B to 7µ_0 that is the sevenfold of µ_0, marginal C/N performance and marginal D/U performance were simulated. The marginal C/N performance indicates a lowest C/N ratio out of C/N ratios of a received signal whose bit error rate is below $3 \times 10^{-6}$, where the received signal is obtained by adding AWGN to a transmitted signal. The marginal D/U performance indicates a lowest D/U ratio out of D/U ratios (ratio in amplitude between a transmitted signal and a delay wave) of a received signal whose bit error rate is below $3 \times 10^{-6}$, where the received signal is obtained by adding multipath interference with a delay of 1 µs and a Doppler frequency of 1 Hz to a transmitted signal.

As can be understood from the drawing, step size µ_0 and step size 7µ_0 have a tradeoff relationship in that the marginal C/N performance is higher with step size µ_0 but the marginal D/U performance which requires a tracking capability is higher with step size 7µ_0. Based on this property, the waveform equalizer of the second embodiment selects step size µ_0 which delivers the marginal C/N performance of 14.9 dB if the received signal does not contain multipath interference, and selects step size 7µ_0 which delivers the marginal D/U performance of 0 dB if the received signal contains multipath interference.

Thus, if the channel has multipath and therefore waveform equalization needs to be performed at high-speed, the step size is increased to accelerate the waveform equalization. If the channel has no multipath, the step size is decreased to improve the marginal C/N performance and stabilize the waveform equalization.

Figure 46:
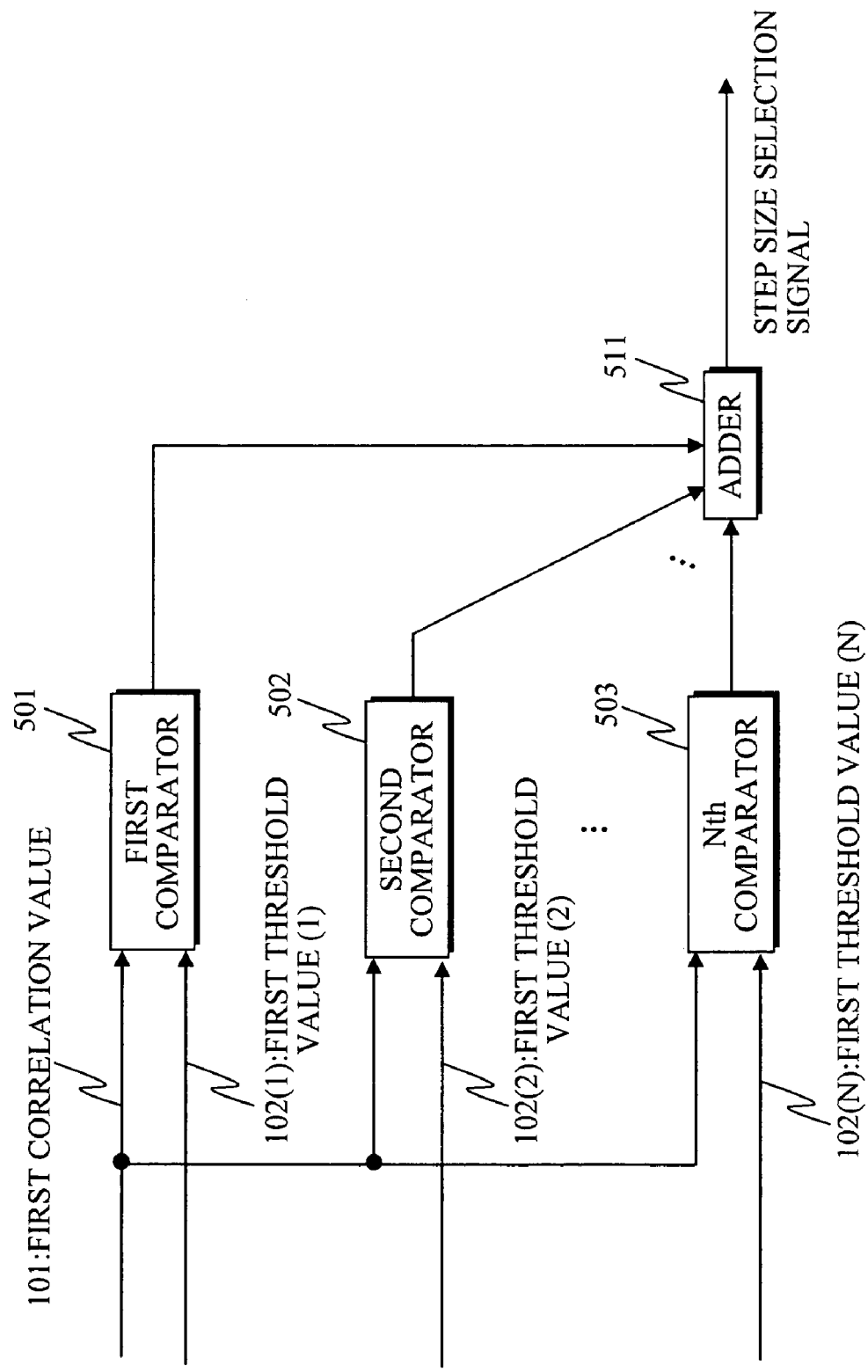
FIG. 46 shows a multipath interference detector which performs comparison using N threshold values.

The second embodiment describes the case where one first threshold value 102 is input to the comparator 111 in the multipath interference detector 120. As an alternative, N first threshold values 102 may be input to the comparator 111 to judge the degree of multipath interference in N+1 levels. FIG. 46 shows an example of this modification. In the drawing, N comparators 501, 502, . . . , 503 respectively receive different first threshold values 102(1), 102(2), . . . , 102(N), and compare first correlation value 101 with first threshold values 102(1), 102(2), . . . , 102(N). An adder 511 adds judgment results of the N comparators 501, 502, . . . , 503. Suppose each comparator outputs 0 when first correlation value 101 is smaller than the corresponding first threshold value, and 1 when first correlation value 101 is no smaller than the corresponding first threshold value. Then the adder 511 outputs one of N+1 possible values to the coefficient update unit 152 as the step size selection signal.

In this case, the coefficient update unit 152 has N+1 step sizes, instead of the two step sizes A and B. The coefficient update unit 152 selects one of the N+1 step sizes according to the step size selection signal, and calculates the coefficient update amounts for the transversal filter 151 using the selected step size.

The second embodiment describes the case where the sync signal is used in the correlation calculation by the correlation calculator, but any known signal inserted in the transmitted signal may instead be used.

Figure 14:
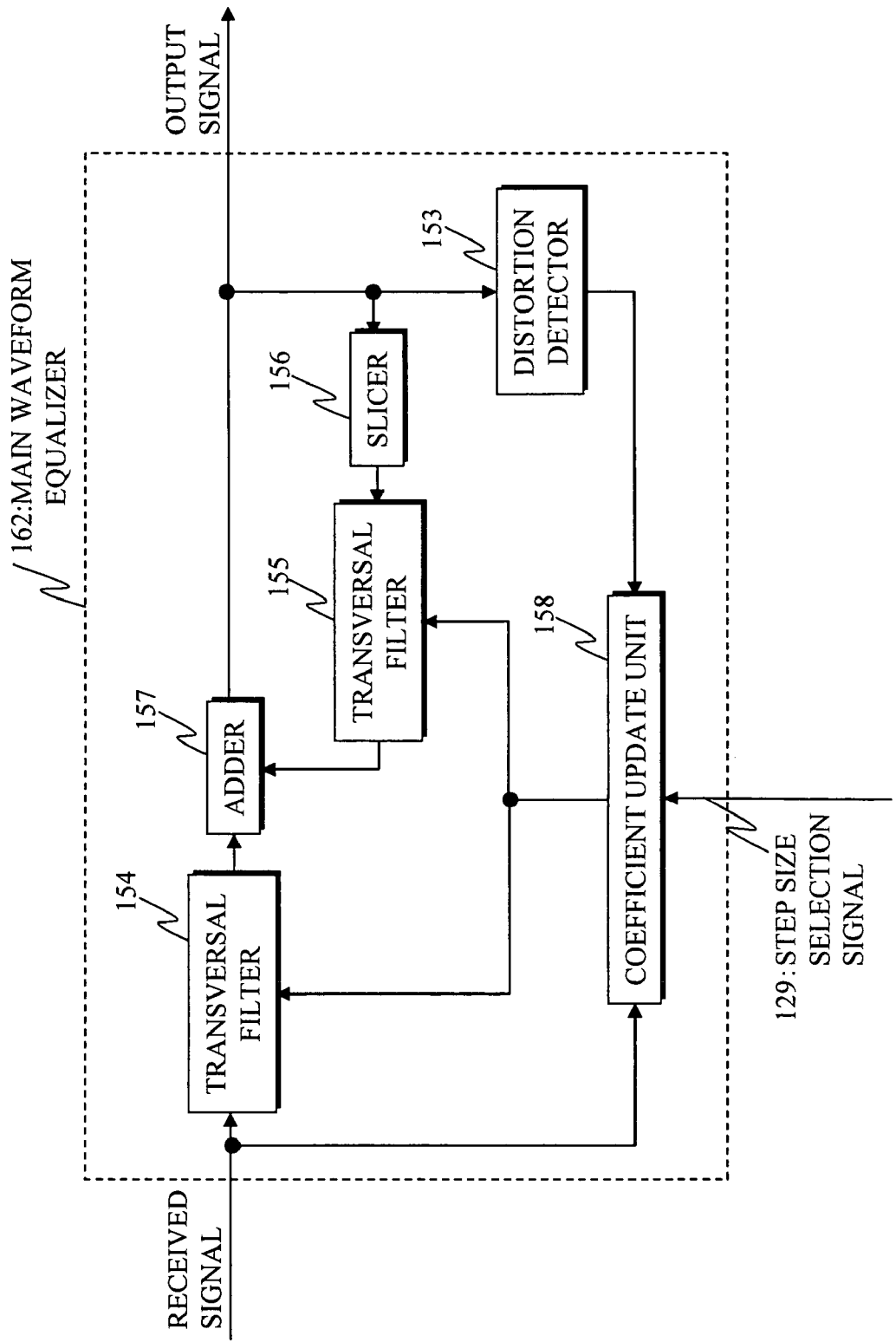
FIG. 14 is a block diagram of a main waveform equalizer which is a modification to the second embodiment.

Also, the main waveform equalizer 161 shown in FIG. 12 may be modified to a main waveform equalizer 162 shown in FIG. 14.

The main waveform equalizer 162 has a construction that is generally called a DFE (decision feedback equalizer). The DFE is well known in the art and so its construction is explained only briefly below.

A received signal is input to a transversal filter 154 and a coefficient update unit 158. An adder 157 adds an output of the transversal filter 154 and an output of a transversal filter 155, and outputs a sum to a slicer 156 and the distortion detector 153.

The slicer 156 is used for making a hard decision on an output signal of the main waveform equalizer 162 based on a signed signal point, in order to improve data reliability before the output signal is fed to the transversal filter 155.

The transversal filter 154 includes a set of taps for compositing current or future data with reference to a center tap (i.e. a tap which serves as a basis for a time axis, e.g. a tap located at 0 on the horizontal axis of the graph shown in FIG. 6). Meanwhile, the transversal filter 155 includes a set of taps for compositing past data with reference to the center tap. The transversal filters 154 and 155 have a different waveform equalization process depending on a delay time of a multipath interference wave contained in the received signal. Which is to say, when a direct wave is greater than a delay wave, the transversal filter 155 generates a replication of the delay wave from the direct wave of the output of waveform equalization, and the adder 157 adds the outputs of the transversal filters 154 and 155 to execute waveform equalization. If the direct wave is no greater than the delay wave, the multipath interference wave arrives earlier than the dominant wave. Accordingly, the multipath interference is removed from the received signal, and the tap coefficients of the transversal filter 154 are changed so as to gradually cancel out distortion newly generated as a result of the multipath interference removal.

Here, the tap coefficients are changed by the coefficient update unit 158 based on the received signal, an output of the distortion detector 153, and step size selection signal 129.

Figure 41:
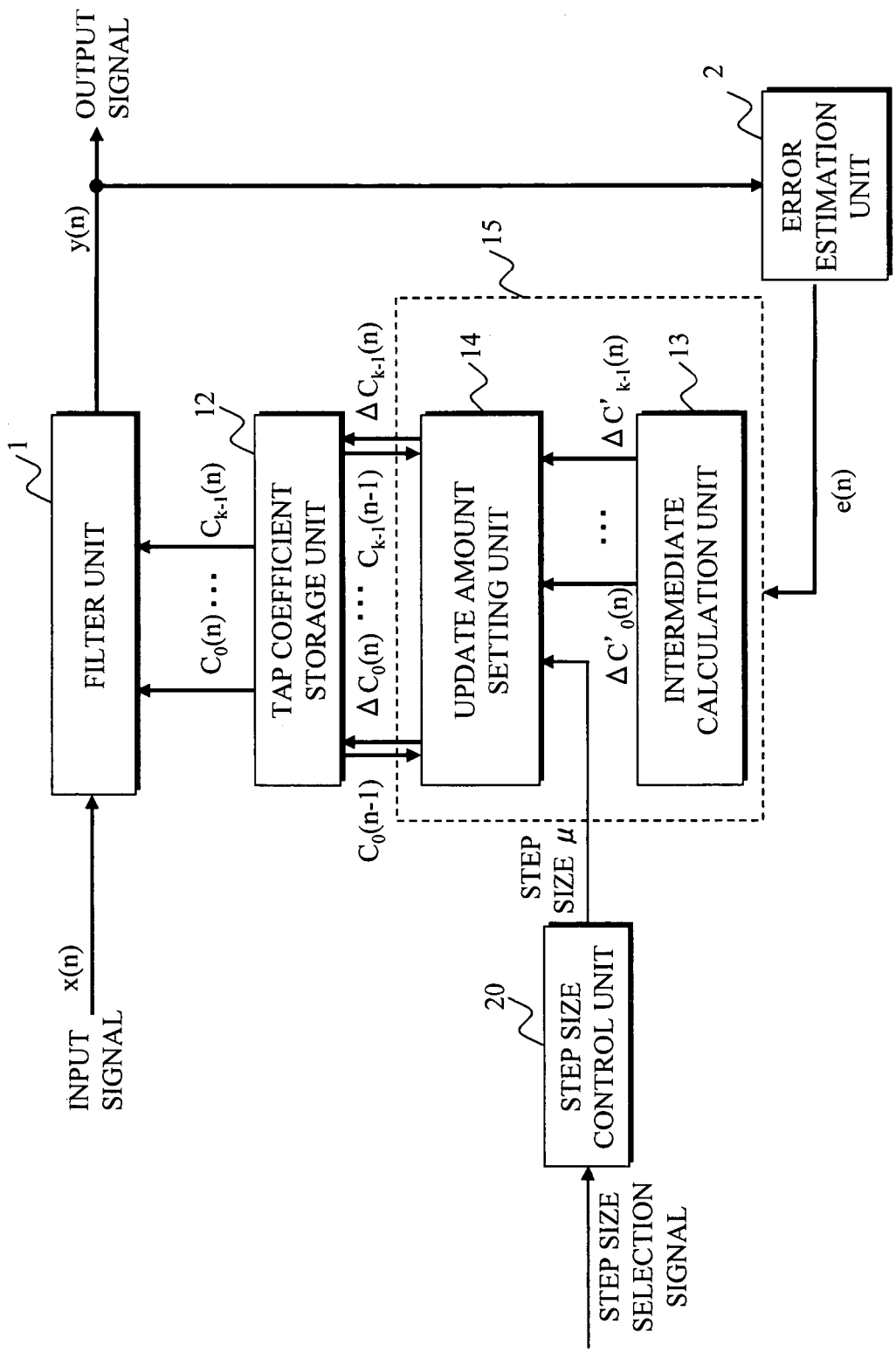
FIG. 41 is a block diagram of a construction in which the waveform equalizer of the first embodiment is applied to the main waveform equalizer of the second embodiment.

Also, the construction of the first embodiment may be applied to the main waveform equalizer 161 in FIG. 12. FIG. 41 shows an example of this modification. A step size control unit 20 is newly included in this construction. The step size control unit 20 controls step size µ based on the step size selection signal output from the multipath interference detector 120.

Third Embodiment

A waveform equalizer according to a third embodiment of the present invention is described below, with reference to FIGS. 15, 16, and 25.

Figure 15:
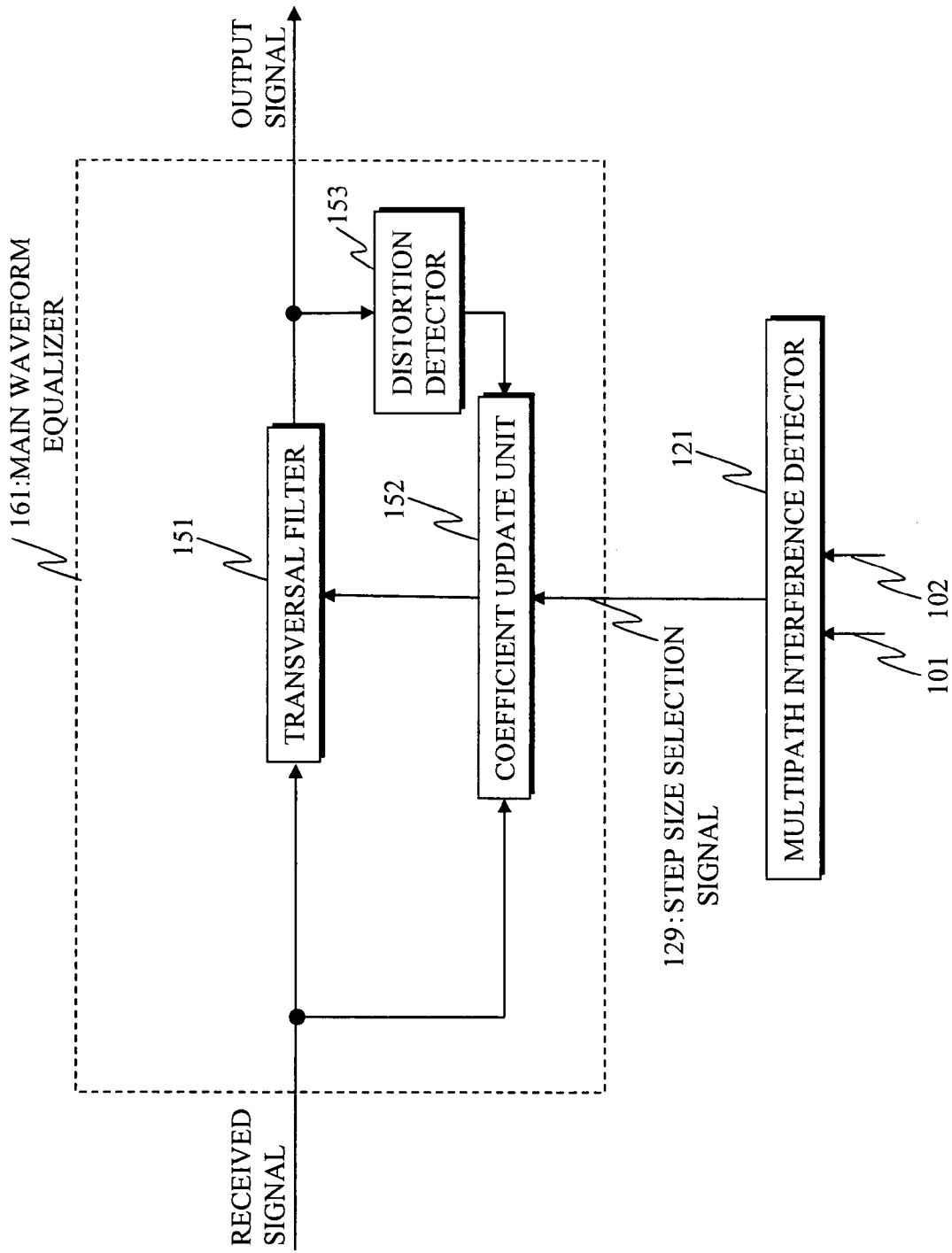
FIG. 15 is a block diagram of a waveform equalizer according to a third embodiment of the present invention.

FIG. 15 is a block diagram of the waveform equalizer in the third embodiment. FIG. 16 is a block diagram of a multipath interference detector 121 shown in FIG. 15. In FIGS. 15 and 16, construction elements which are the same as those in FIGS. 12 and 13 have been given the same reference numerals and their explanation has been omitted. The main waveform equalizer 161 shown in FIG. 15 has the same construction as the main waveform equalizer 161 shown in FIG. 12.

Figure 16:
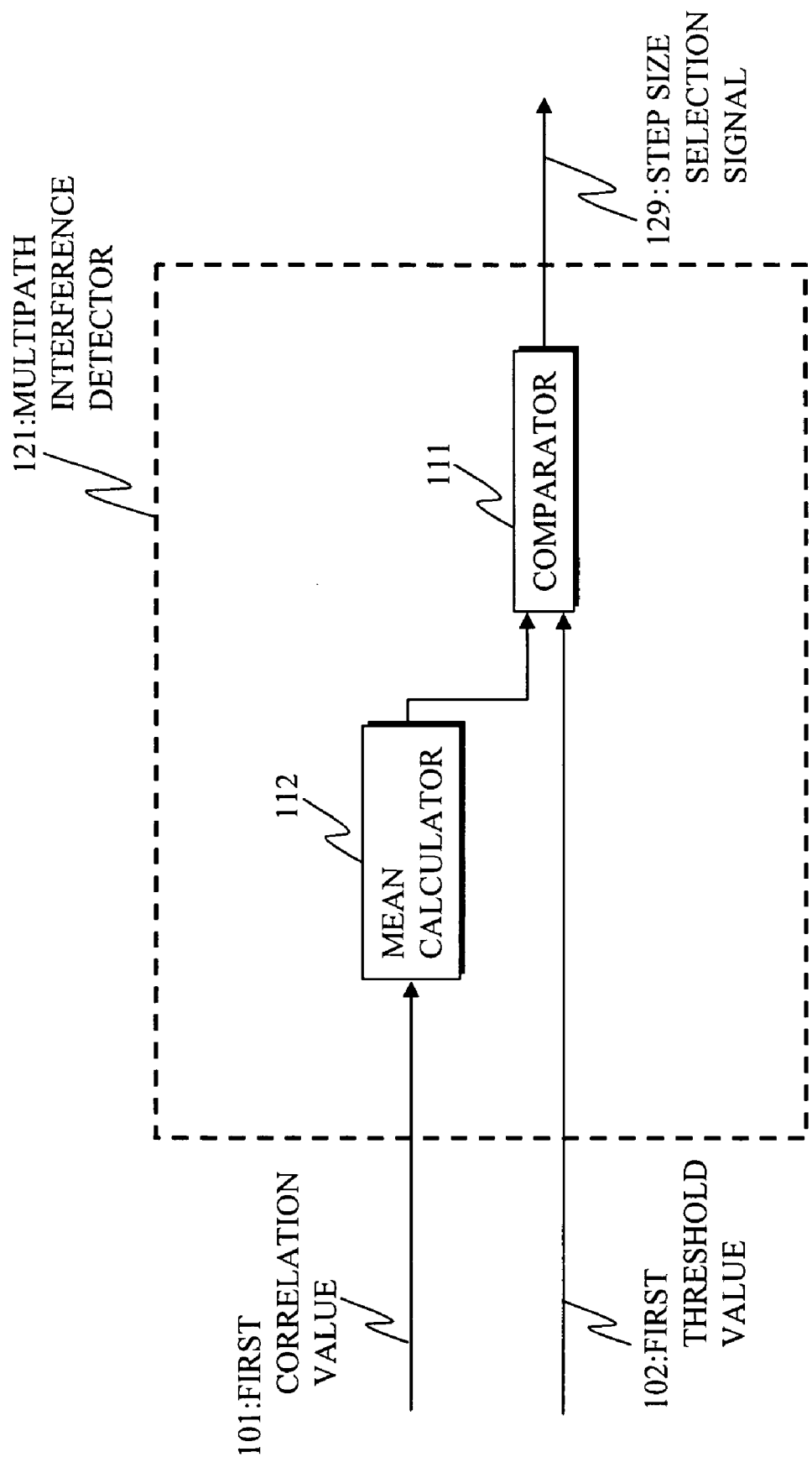
FIG. 16 is a block diagram of a multipath interference detector shown in FIG. 15.

The third embodiment differs from the second embodiment in that the multipath interference detector 121 includes a mean calculator 112, as shown in FIG. 16.

In detail, the multipath interference detector 121 includes the mean calculator 112 and the comparator 111. The mean calculator 112 can be realized by an integrator or the like. The multipath interference detector 121 receives first correlation value 101 from the correlation calculator (not illustrated) for calculating correlation values between a received signal and a sync signal inserted in a transmitted signal. The mean calculator 112 calculates a mean value of first correlation value 101. The comparator 111 compares the calculated mean value with first threshold value 102, to judge whether the received signal contains multipath interference.

As can be understood from the frequency of occurrence of first correlation value 101 shown in FIG. 25, first correlation value 101 tends to be small more frequently in the multipath interference environment than in the AWGN environment. Even in the multipath interference environment, however, values equal to or larger than those in the AWGN environment, such as 0.9 or more, occur in some instances. In such cases, the received signal which actually contains multipath interference will end up being wrongly judged as not containing multipath interference. In view of this, the mean calculator 112 is provided to calculate the mean value of first correlation value 101. Since the calculated mean value is smaller in the multipath interference environment than in the AWGN environment, the wrong judgment can be prevented by comparing the mean value with first threshold value 102.

Figure 17:
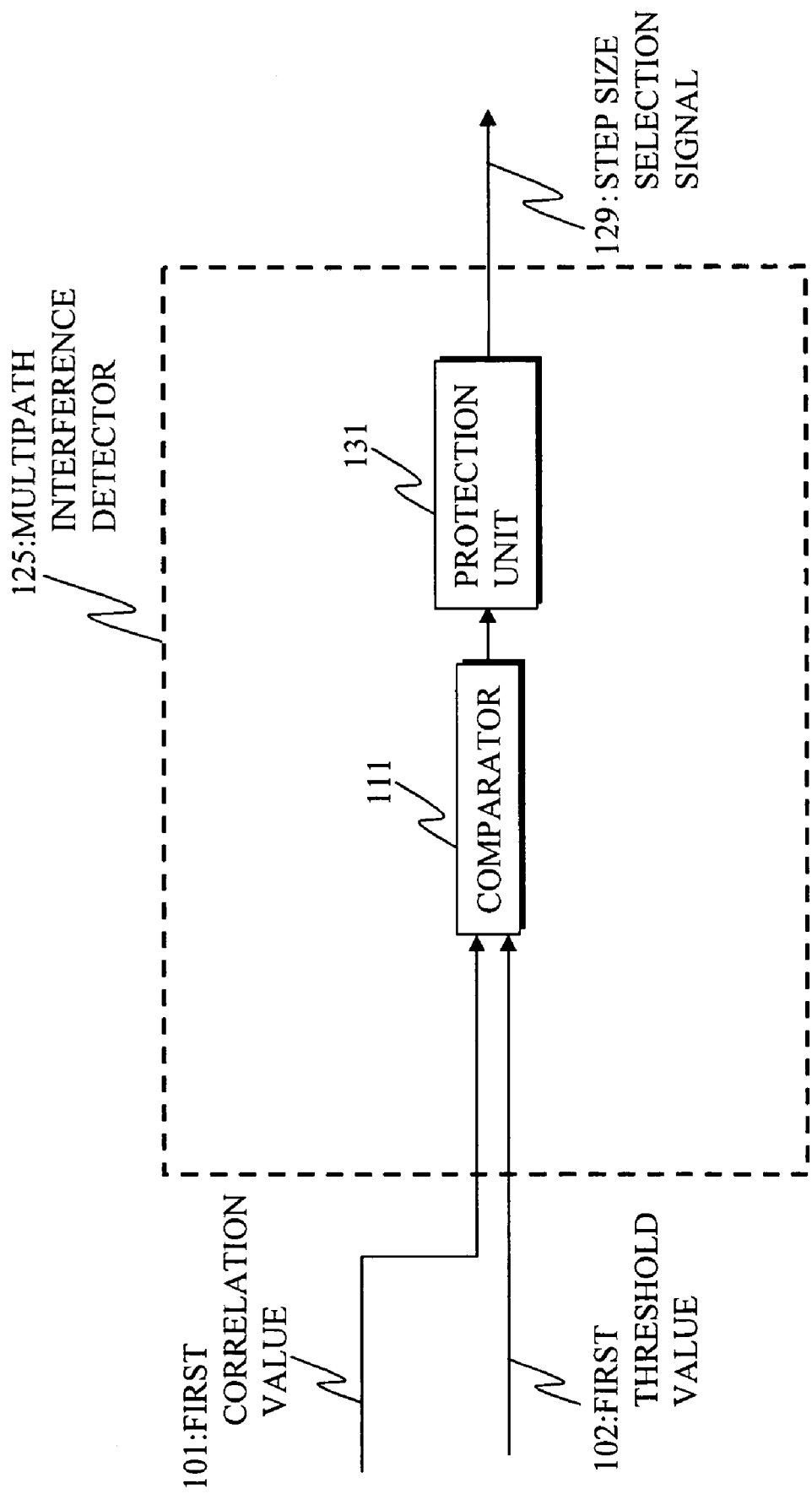
FIG. 17 is a block diagram of a multipath interference detector which is a modification to the third embodiment.
Figure 43:
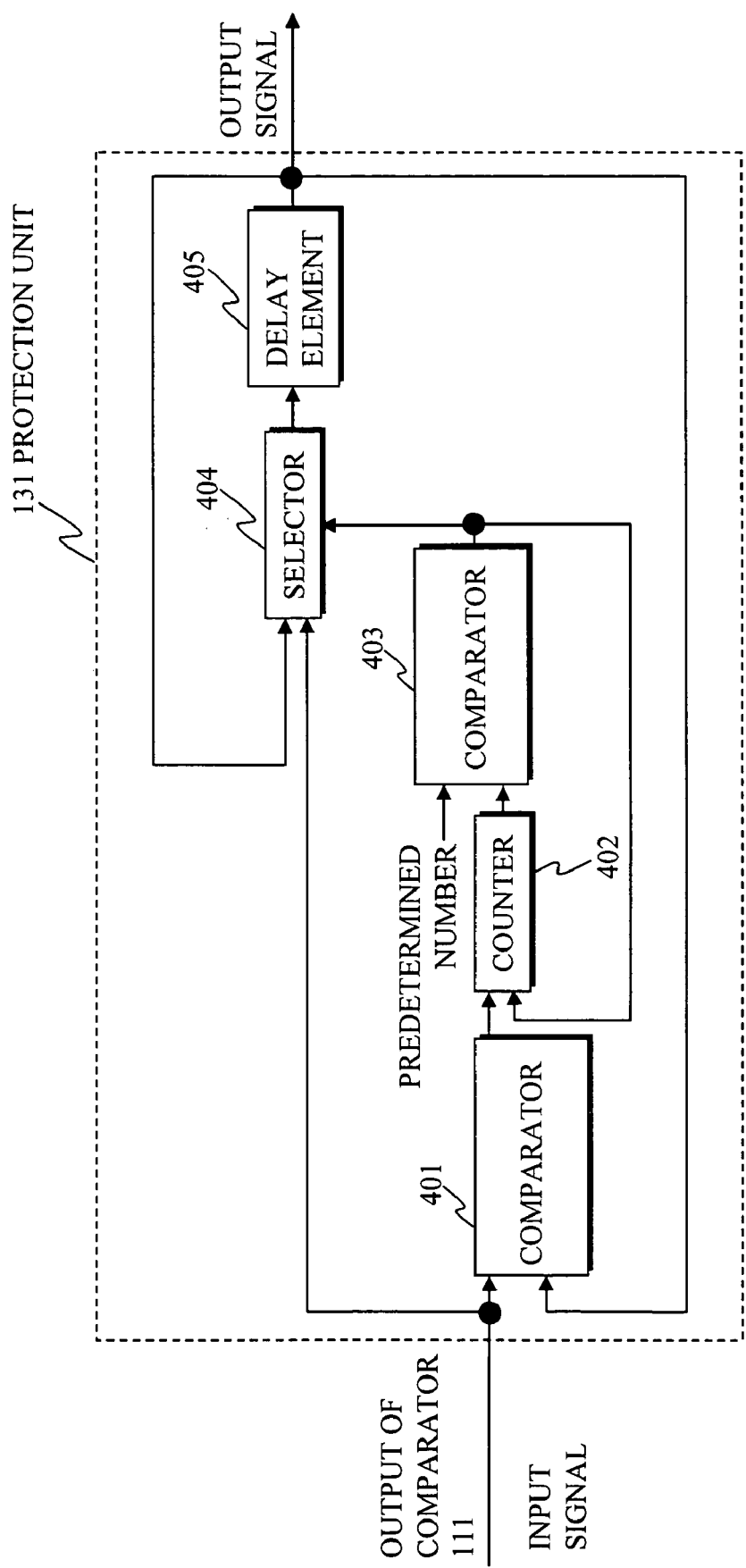
FIG. 43 shows a detailed construction of a protection unit shown in FIG. 17.

Here, the multipath interference detector 121 shown in FIG. 16 may be modified to a multipath interference detector 125 shown in FIG. 17. In the multipath interference detector 125, a protection unit 131 is provided instead of the mean calculator 112. Only when the same judgment result is repeatedly output from the comparator 111 a predetermined number of times, the protection unit 131 updates its output signal according to this judgment result. FIG. 43 is a block diagram showing an example construction of the protection unit 131. In the drawing, the protection unit 131 includes a comparator 401, a counter 402, a comparator 403, a selector 404, and a delay element 405. The comparator 401 compares an output signal of the protection unit 131 and an input signal of the protection unit 131 (i.e. the output of the comparator 111). If the output signal and the input signal do not match, the counter 402 increments a count. If the output signal and the input signal match, the counter 402 resets the count. The comparator 403 compares the count with a predetermined number. If the count is not the predetermined number, the selector 204 selects the output signal of the protection unit 131. If the count is the predetermined number, the selector 204 selects the input signal of the protection unit 131 and resets the count. The delay element 405 delays the selected signal and outputs the delayed signal as a new output signal of the protection unit 131.

The third embodiment describes the case where the sync signal is used in the correlation calculation by the correlation calculator, but any known signal inserted in the transmitted signal may instead be used.

The third embodiment describes the case where the comparator 111 in the multipath interference detector 121 receives one first threshold value 102. As an alternative, N first threshold values 102 may be input to the comparator 111 to judge the degree of multipath interference in N+1 levels. This construction is analogous to the one shown in FIG. 46 in the second embodiment, and so its explanation has been omitted here. In this case, the coefficient update unit 152 shown in FIG. 15 has N+1 step sizes instead of the two step sizes A and B. The coefficient update unit 152 selects one of the N+1 step sizes according to the step size selection signal output from the comparator 111, and calculates the coefficient update amounts for the transversal filter 151 using the selected step size.

The third embodiment describes the main waveform equalizer 161 shown in FIG. 15, but the construction of the main waveform equalizer 162 shown in FIG. 14 may instead be used. Also, the construction of the first embodiment may be applied as shown in FIG. 41.

Fourth Embodiment

Figure 18:
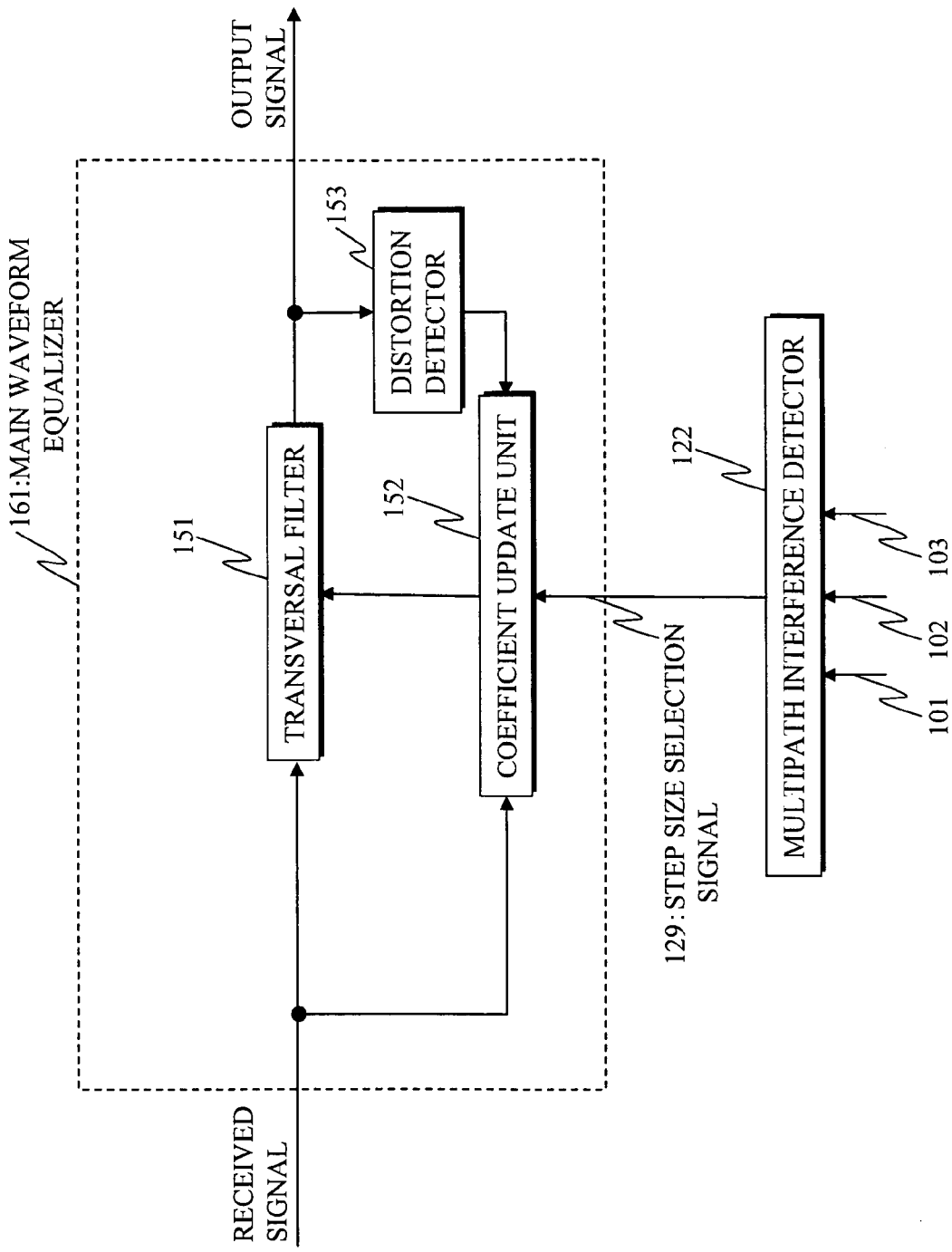
FIG. 18 is a block diagram of a waveform equalizer according to a fourth embodiment of the present invention.
Figure 19:
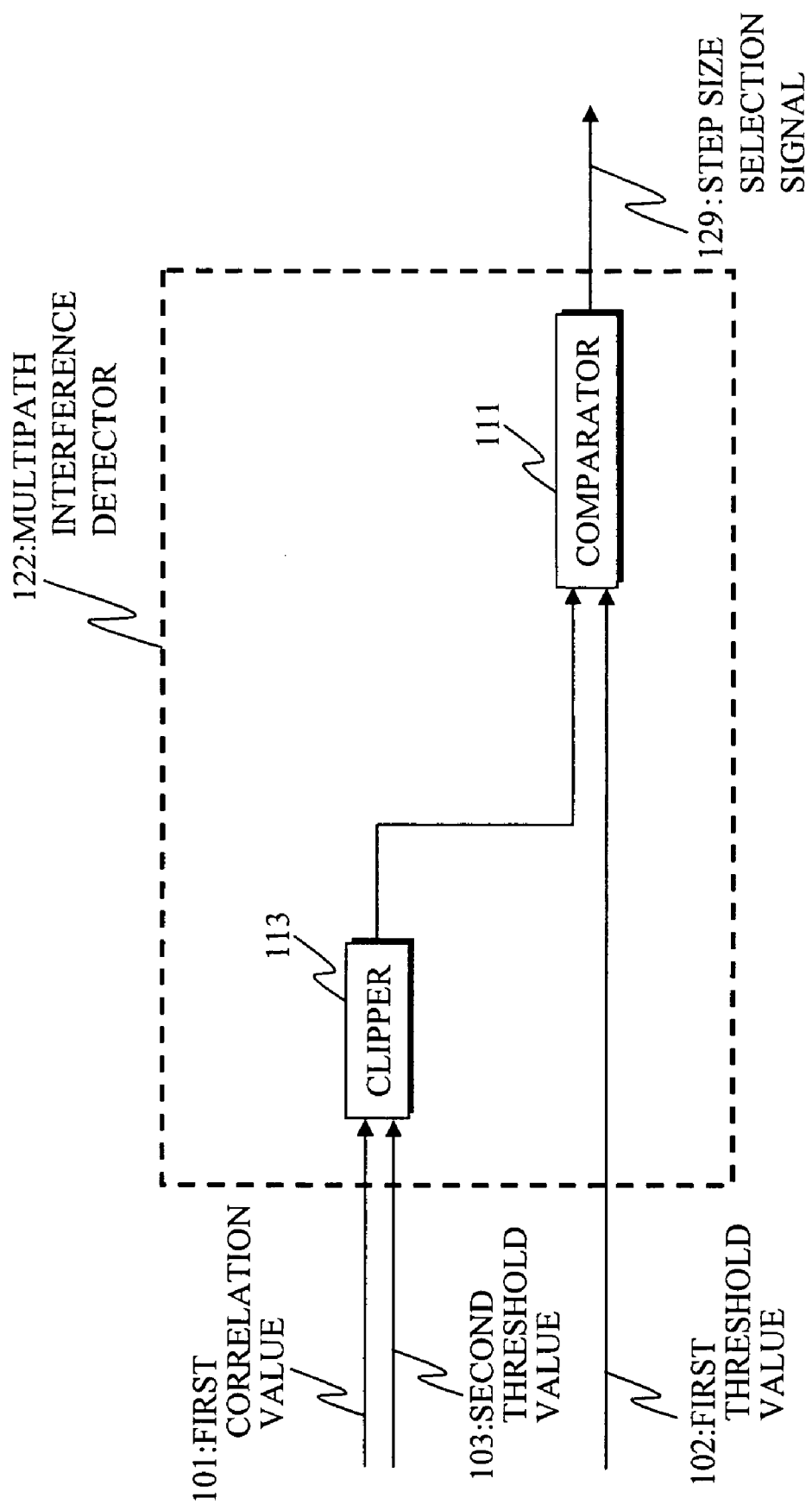
FIG. 19 is a block diagram of a multipath interference detector shown in FIG. 18.

A waveform equalizer according to a fourth embodiment of the present invention is described below, with reference to FIGS. 18, 19, and 25. FIG. 18 is a block diagram of the waveform equalizer in the fourth embodiment. FIG. 19 is a block diagram of a multipath interference detector 122 shown in FIG. 18. In FIGS. 18 an 19, construction elements which are the same as those shown in FIGS. 12 and 13 have been given the same reference numerals and their explanation has been omitted.

The fourth embodiment differs from the second embodiment in that the multipath interference detector 122 includes a clipper 113, as shown in FIG. 19.

Figure 44:
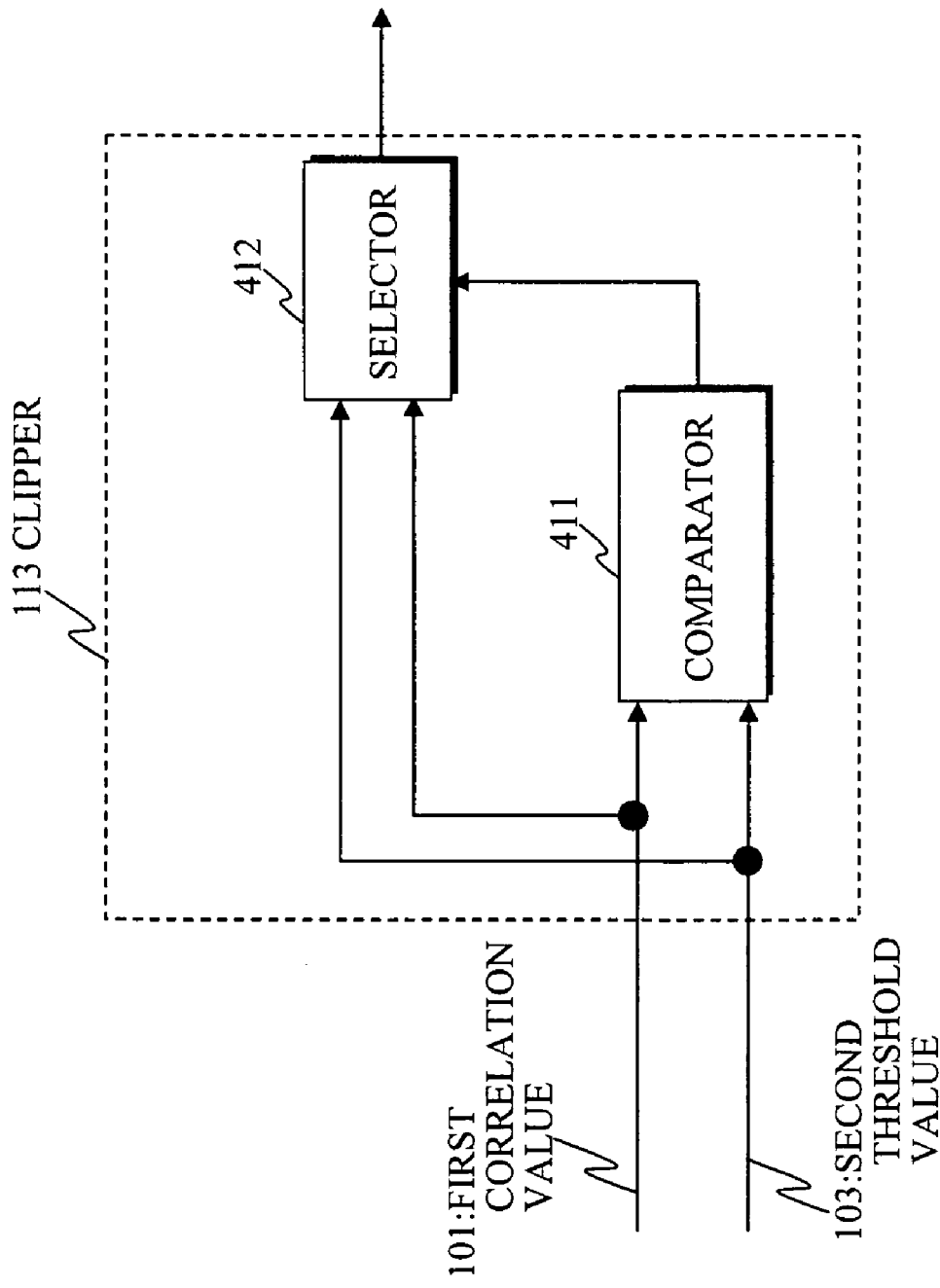
FIG. 44 shows a detailed construction of a clipper shown in FIG. 19.

In detail, the multipath interference detector 122 includes the clipper 113 and the comparator 111. The multipath interference detector 122 receives first correlation value 101 from the correlation calculator (not illustrated) for calculating correlation values between a received signal and a sync signal inserted in a transmitted signal. First correlation value 101 and second threshold value 103 are input in the clipper 113. FIG. 44 is a block diagram showing an example construction of the clipper 113. In the drawing, the clipper 113 includes a comparator 411 for comparing first correlation value 101 and second threshold value 103, and a selector 412 for selecting one of first correlation value 101 and second threshold value 103 based on a comparison result of the comparator 411.

With this construction, the clipper 113 outputs first correlation value 101 when first correlation value 101 is smaller than second threshold value 103, and outputs second threshold value 103 when first correlation value 101 is no smaller than second threshold value 103. The comparator 111 receives the output of the clipper 113 and first threshold value 102, and compares the two values to judge whether the received signal contains multipath interference.

As can be understood from the frequency of occurrence of first correlation value 101 shown in FIG. 25, first correlation value 101 tends to be small more frequently in the multipath interference environment than in the AWGN environment. Even in the multipath interference environment, however, values equal to or larger than those in the AWGN environment, such as 0.9 or more, occur in some instances. This may cause the received signal which contains multipath interference to be wrongly judged as not containing multipath interference. In view of this, the clipper 113 is provided to limit first correlation value 101 using second threshold value 103 which is set at an upper limit of first correlation value 101 in the AWGN environment. As a result, first correlation value 101 that exceeds the upper limit in the AWGN environment is excluded from the comparison by the comparator 111. Hence the wrong judgment on the presence or absence of multipath interference can be suppressed.

The fourth embodiment describes the case where the comparator 111 in the multipath interference detector 122 receives one first threshold value 102. As an alternative, the comparator 111 may receive N first threshold values 102 to judge the degree of multipath interference in N+1 levels. This construction is analogous to the one shown in FIG. 46 in the second embodiment, and so its explanation has been omitted here. In this case, the coefficient update unit 152 shown in FIG. 18 has N+1 step sizes instead of the two step sizes A and B. The coefficient update unit 152 selects one of the N+1 step sizes according to step size selection signal 129 output from the comparator 111, and calculates the coefficient update amounts for the transversal filter 151 using the selected step size.

The fourth embodiment describes the case where the sync signal is used in the correlation calculation by the correlation calculator, but any known signal inserted in the transmitted signal may instead be used.

The fourth embodiment describes the main waveform equalizer 161 shown in FIG. 18, but the construction of the main waveform equalizer 162 shown in FIG. 14 may instead be used. Also, the construction of the first embodiment may be applied as shown in FIG. 41.

Fifth Embodiment

Figure 20:
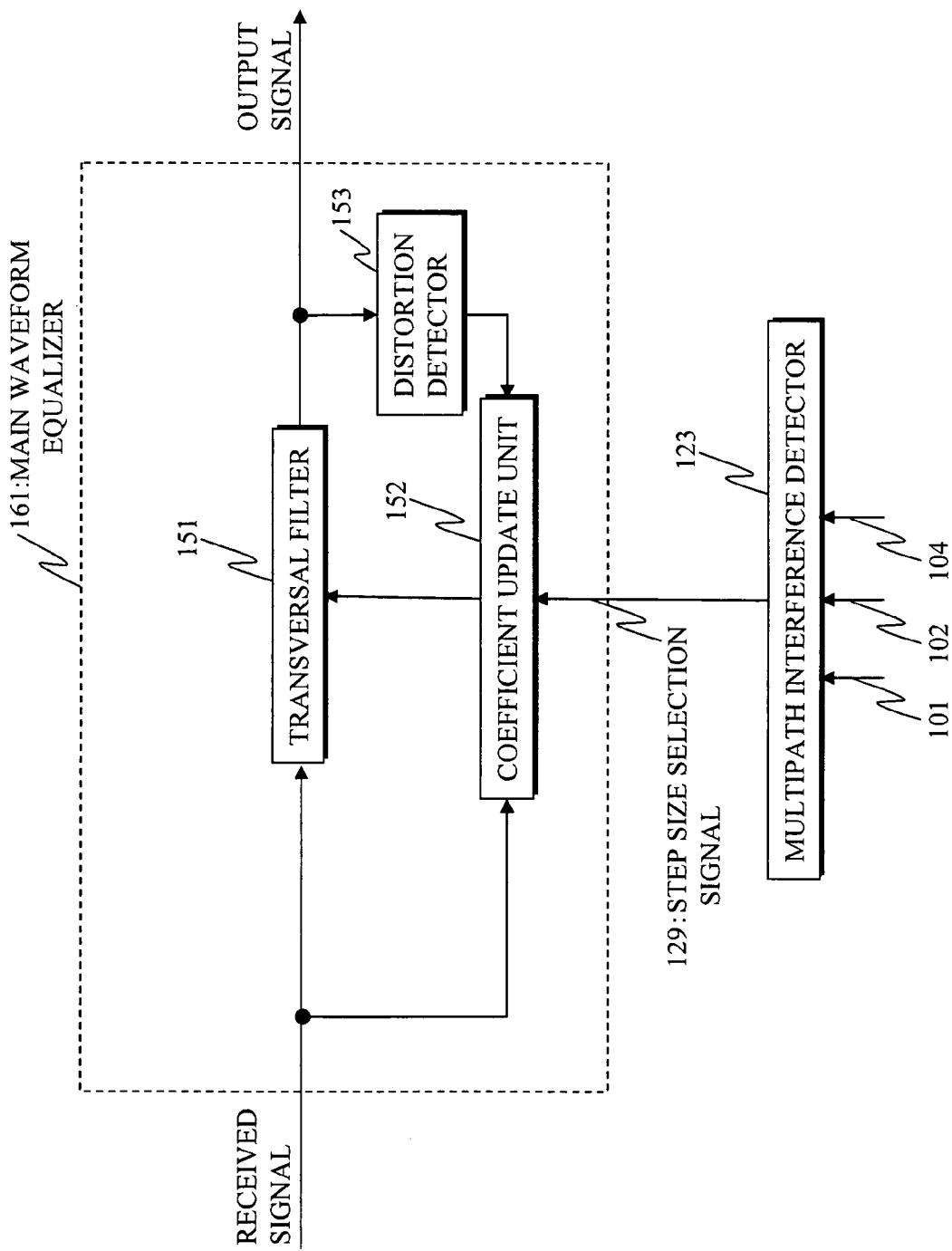
FIG. 20 is a block diagram of a waveform equalizer according to a fifth embodiment of the present invention.
Figure 21:
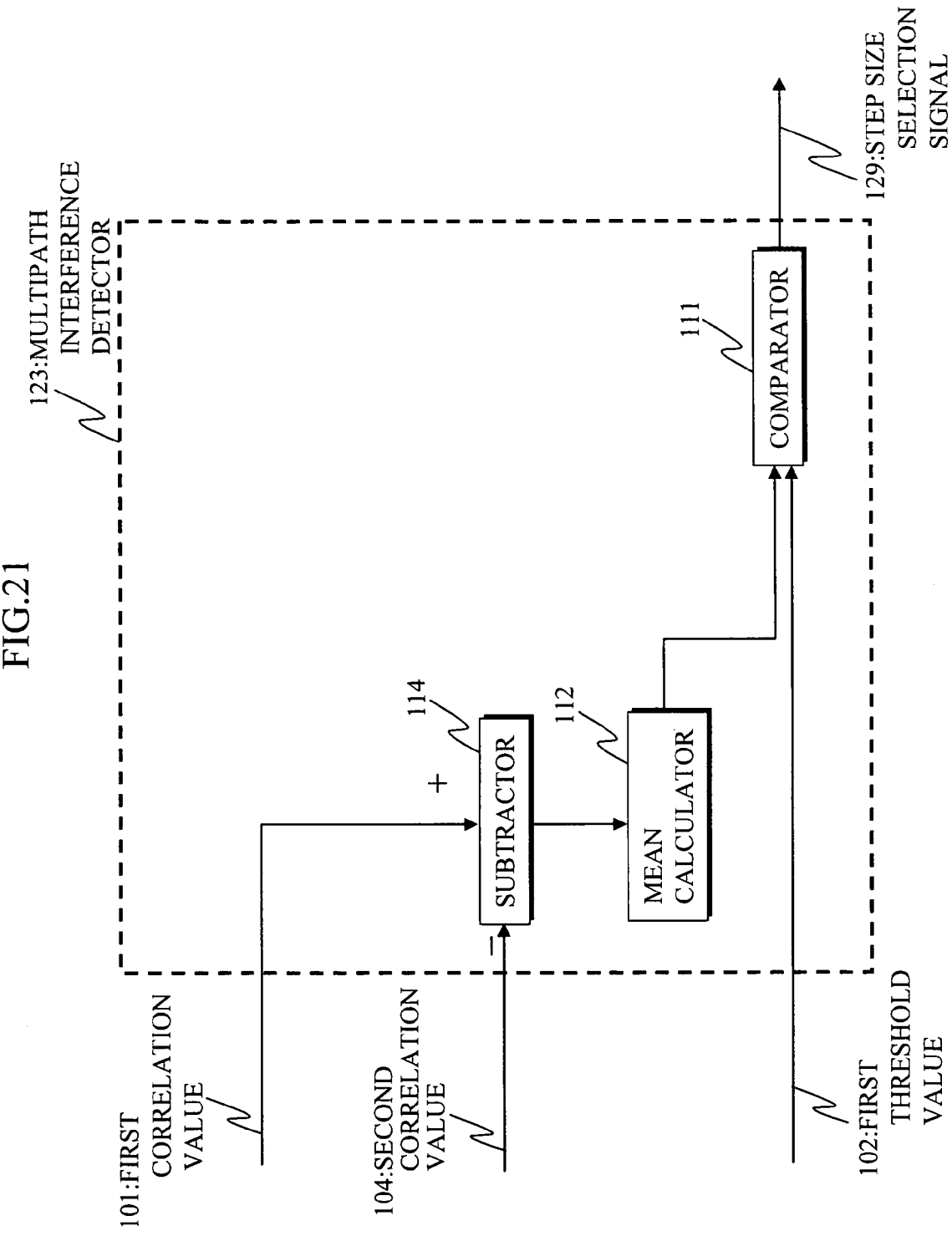
FIG. 21 is a block diagram of a multipath interference detector shown in FIG. 20.

A waveform equalizer according to a fifth embodiment of the present invention is described below, with reference to FIGS. 20, 21, and 26. FIG. 20 is a block diagram of the waveform equalizer in the fifth embodiment. FIG. 21 is a block diagram of a multipath interference detector 123 shown in FIG. 20. In FIGS. 20 and 21, construction elements which are the same as those shown in FIGS. 12 and 13 have been given the same reference numerals and their explanation has been omitted.

The fifth embodiment differs from the second embodiment in that the multipath interference detector 123 includes a subtractor 114 and the mean calculator 112, as shown in FIG. 21.

In detail, the multipath interference detector 123 includes the subtractor 114, the mean calculator 112, and the comparator 111. The multipath interference detector 123 receives first correlation value 101 and second correlation value 104 from the correlation calculator (not illustrated) for calculating correlation values between a received signal and a sync signal inserted in a transmitted signal. As mentioned earlier, first correlation value 101 is a first largest value out of the absolute values of the correlation values. Meanwhile, second correlation value 104 is a second largest value out of the absolute values of the correlation values. The subtractor 114 subtracts second correlation value 104 from first correlation value 101. The mean calculator 112 calculates a mean value of the difference calculated by the subtractor 114. The comparator 111 compares the calculated mean value with first threshold value 102, to judge whether the received signal contains multipath interference.

Figure 26:
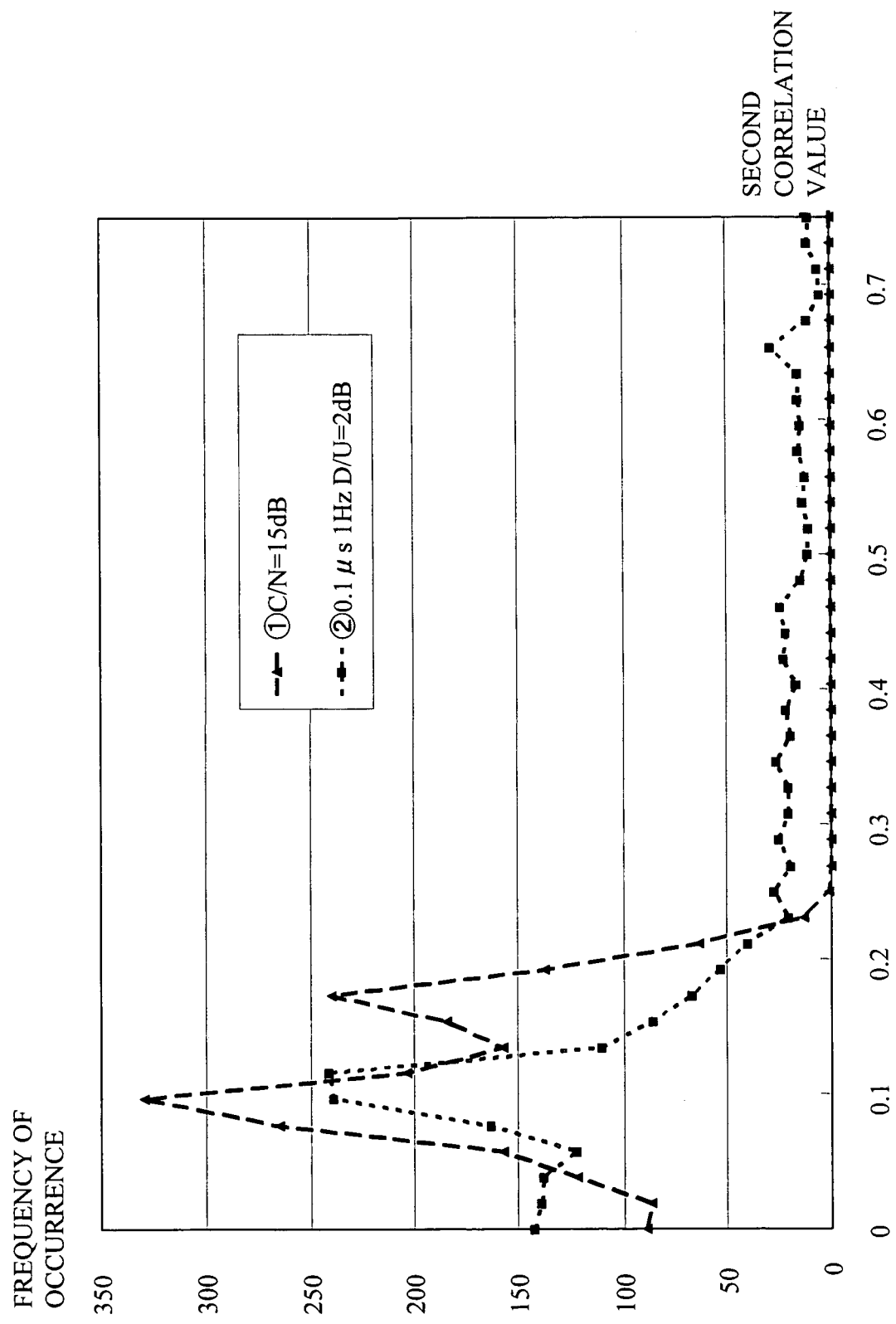
FIG. 26 shows a frequency of occurrence of second correlation values.
Figure 28:
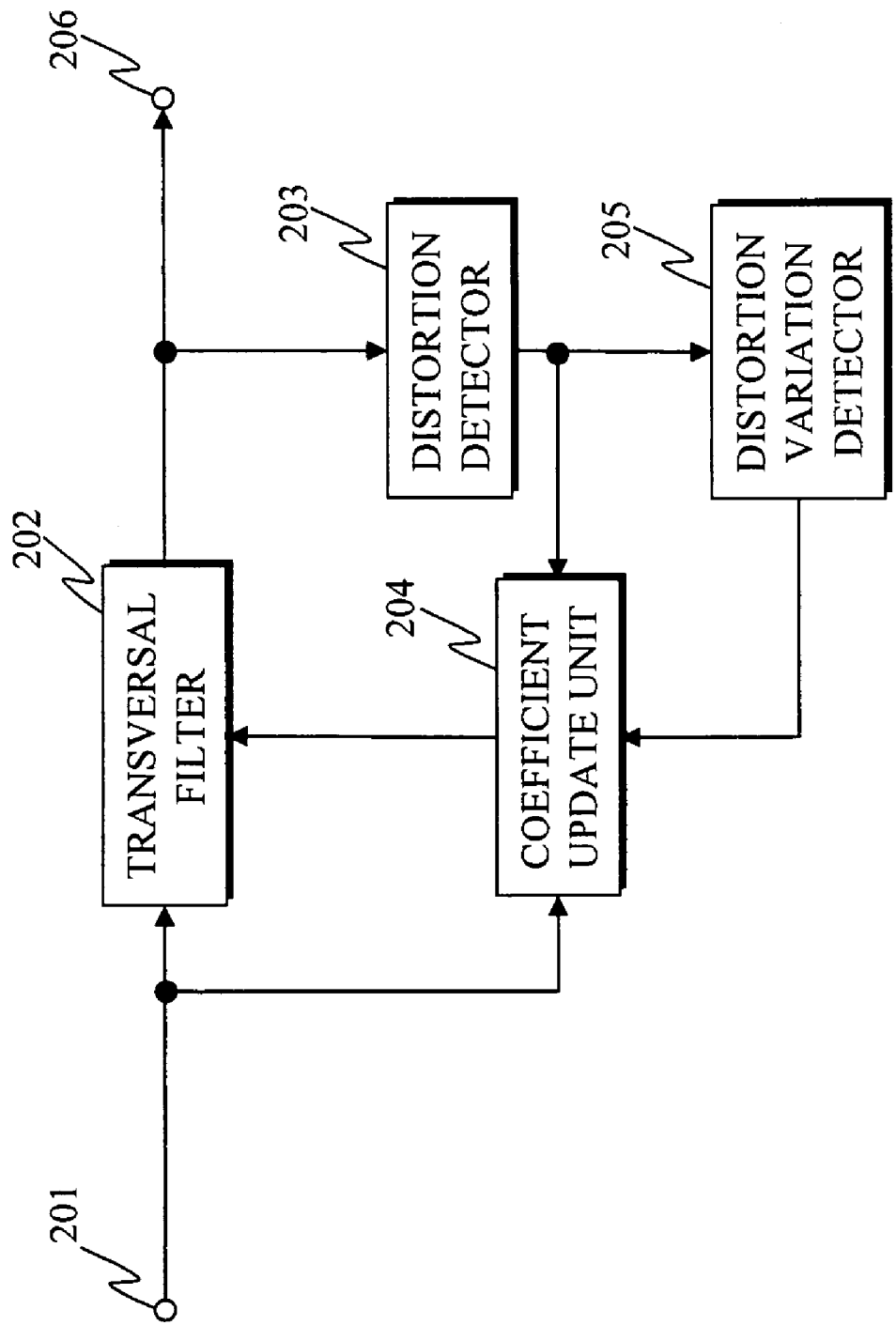
FIG. 28 is a block diagram of a conventional waveform equalizer disclosed in patent document 2.
Figure 29:
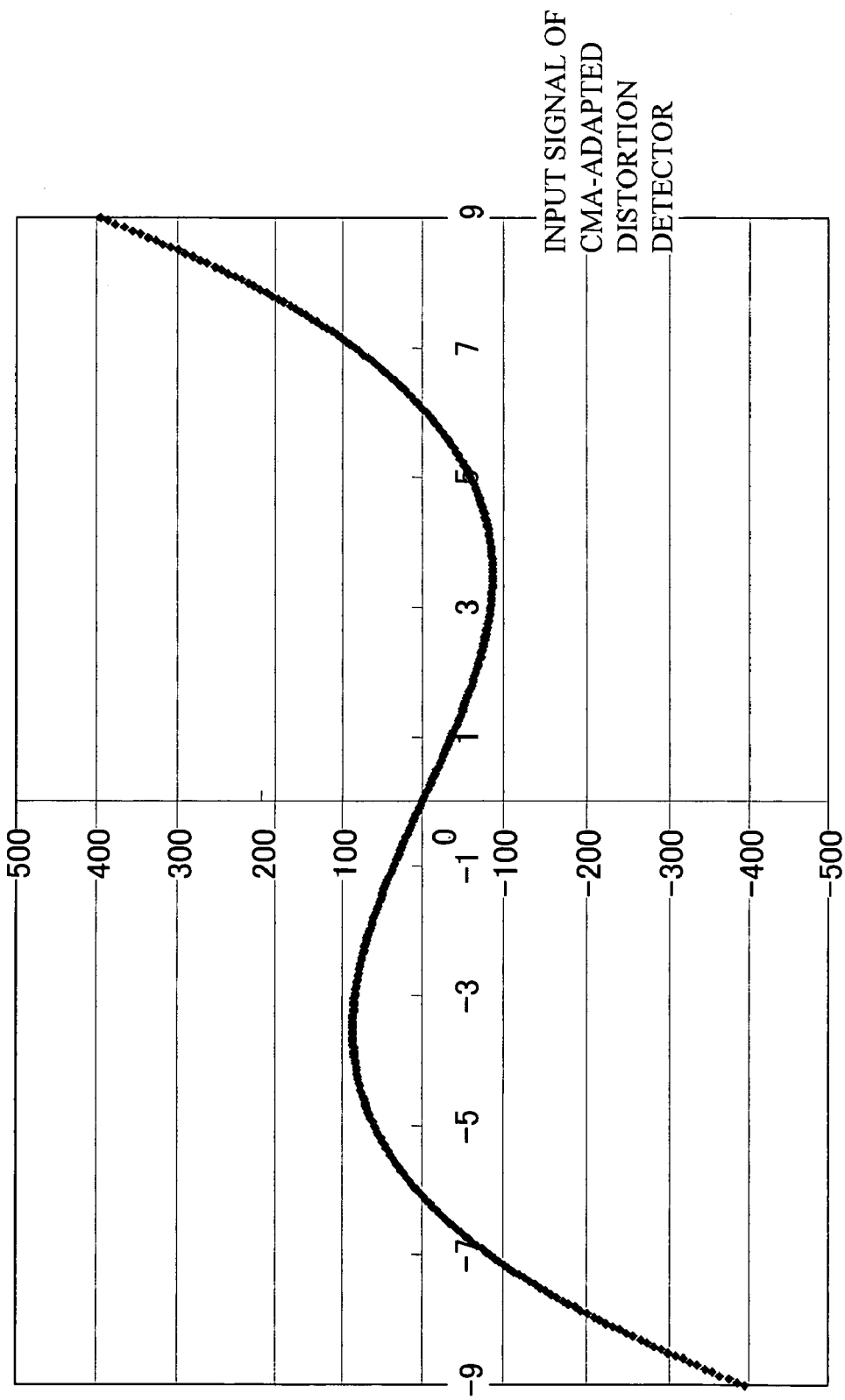
FIG. 29 shows input/output of a CMA-adapted distortion detector.

FIG. 26 shows a distribution in frequency of occurrence of second correlation value 104, in each of an AWGN environment (C/N=15 dB) and a multipath interference environment (delay of 0.1 μs, Doppler frequency of 1 Hz, and D/U=2 dB). As shown in the drawing, second correlation value 104 tends to be large more frequently in the multipath interference environment than in the AWGN environment. Thus, the frequency of occurrence of second correlation value 104 in the multipath interference environment has a different distribution from the one in the AWGN environment. As noted earlier, first correlation value 101, which is the first largest value out of the absolute values of the correlation values, tends to be small more frequently in the multipath interference environment than in the AWGN environment. In view of this, the subtractor 121 is provided to subtract second correlation value 104 from first correlation value 101. Such a calculated difference between first correlation value 101 and second correlation value 104 differs more greatly between the multipath interference environment and the AWGN environment, when compared with the case where only one of first correlation value 101 and second correlation value 104 is used. Hence a wrong judgment on the presence or absence of multipath interference can be prevented.

Figure 22:
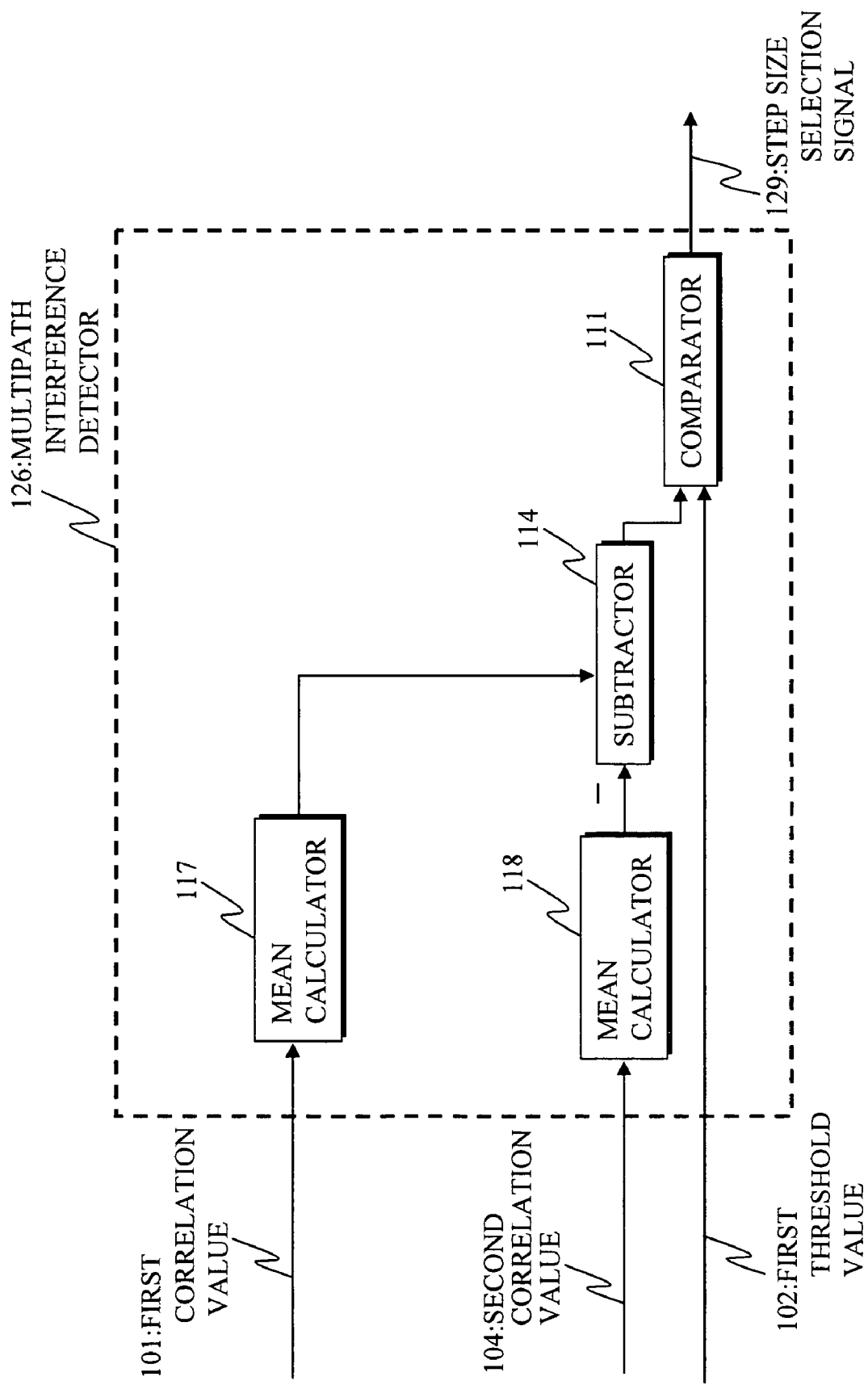
FIG. 22 is a block diagram of a multipath interference detector which is a modification to the fifth embodiment.

The fifth embodiment describes the case where the mean calculator 112 calculates the mean value of the output of the subtractor 114. This can be modified as shown in FIG. 22. In the drawing, a multipath interference detector 126 includes mean calculators 117 and 118 for calculating a mean value of first correlation value 101 and a mean value of second correlation value 104 respectively, instead of the mean calculator 112.

The fifth embodiment describes the case where the mean calculator 112 is used in the multipath interference detector 123. Instead of using the mean calculator 112, the protection unit 131 may be provided after the comparator 111 as shown in FIG. 17.

The fifth embodiment describes the case where the comparator 111 in the multipath interference detector 123 receives one first threshold value 102. As an alternative, the comparator 111 may receive N first threshold values 102 to judge the degree of multipath interference in N+1 levels. This construction is analogous to the one shown in FIG. 46 in the second embodiment, and so its explanation has been omitted here. This being the case, the coefficient update unit 152 shown in FIG. 20 has N+1 step sizes instead of the two step sizes A and B. The coefficient update unit 152 selects one of the N+1 step sizes according to step size selection signal 129 output from the comparator 111, and calculates the coefficient update amounts for the transversal filter 151 using the selected step size.

The fifth embodiment describes the case where the sync signal is used in the correlation calculation by the correlation calculator, but any known signal inserted in the transmitted signal may instead be used.

The fifth embodiment describes the main waveform equalizer 161 shown in FIG. 20, but the construction of the main waveform equalizer 162 shown in FIG. 14 may instead be used. Also, the construction of the first embodiment may be applied as shown in FIG. 41.

Sixth Embodiment

Figure 23:
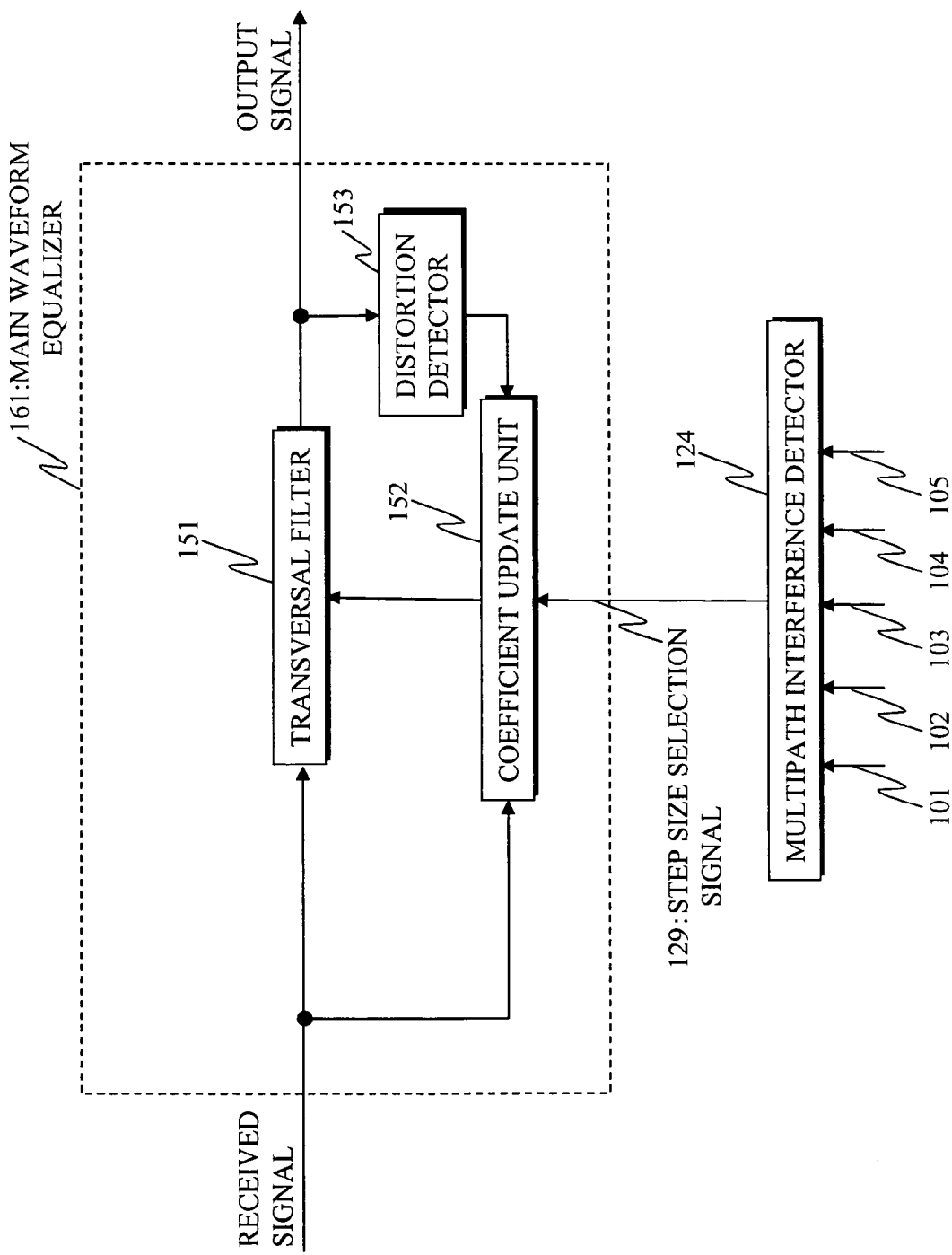
FIG. 23 is a block diagram of a waveform equalizer according to a sixth embodiment of the present invention.
Figure 24:
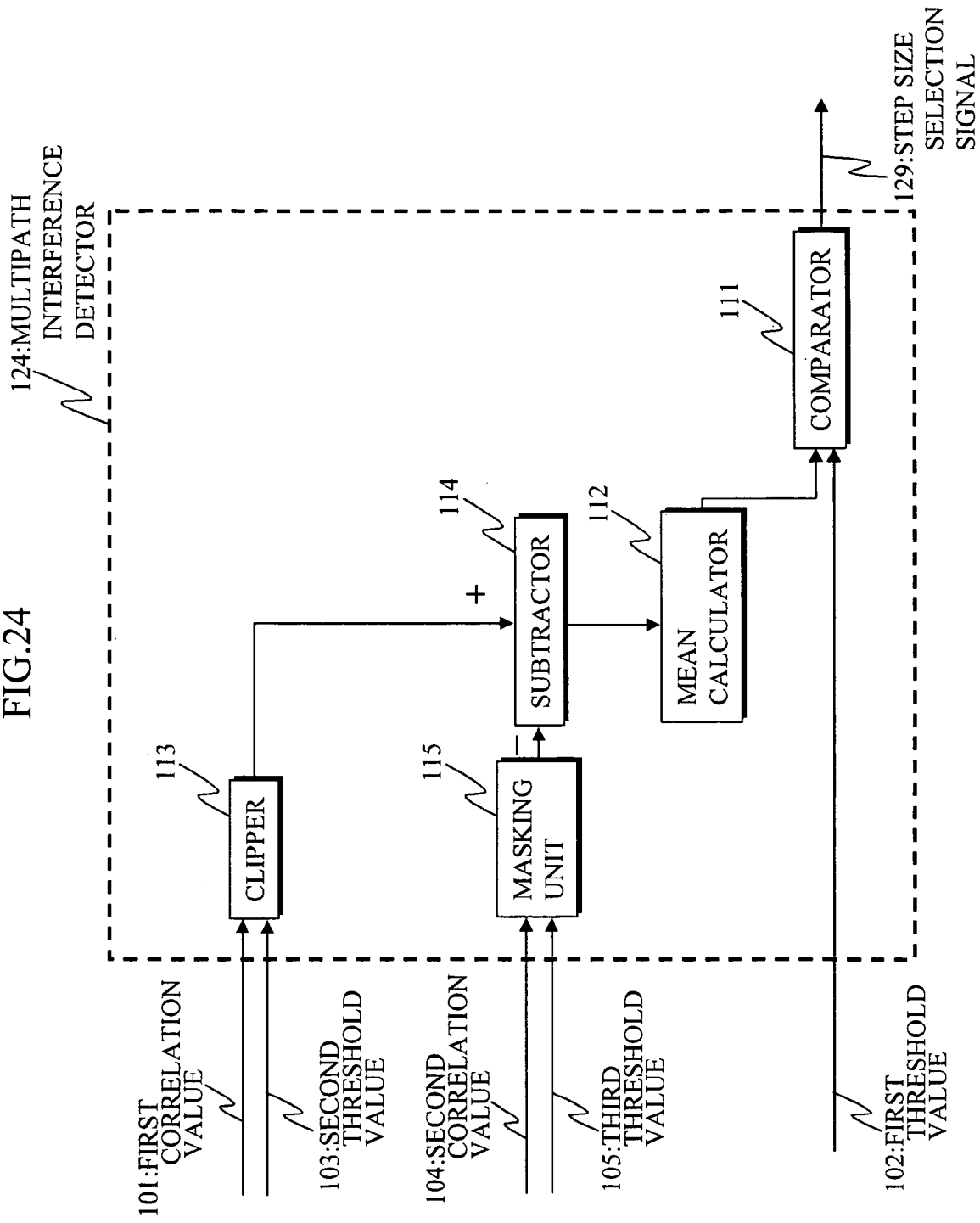
FIG. 24 is a block diagram of a multipath interference detector shown in FIG. 23.

A waveform equalizer according to a sixth embodiment of the present invention is described below, with reference to FIGS. 23, 24, 25, and 26. FIG. 23 is a block diagram of the waveform equalizer in the sixth embodiment. FIG. 24 is a block diagram of a multipath interference detector 124 shown in FIG. 23. In FIGS. 23 and 24, construction elements which are the same as those shown in FIGS. 20 and 21 have been given the same reference numerals and their explanation has been omitted.

The sixth embodiment differs from the fifth embodiment in that the multipath interference detector 124 includes the clipper 113 for limiting first correlation value 101 and a masking unit 115 for masking second correlation value 104, as shown in FIG. 24.

Figure 45:
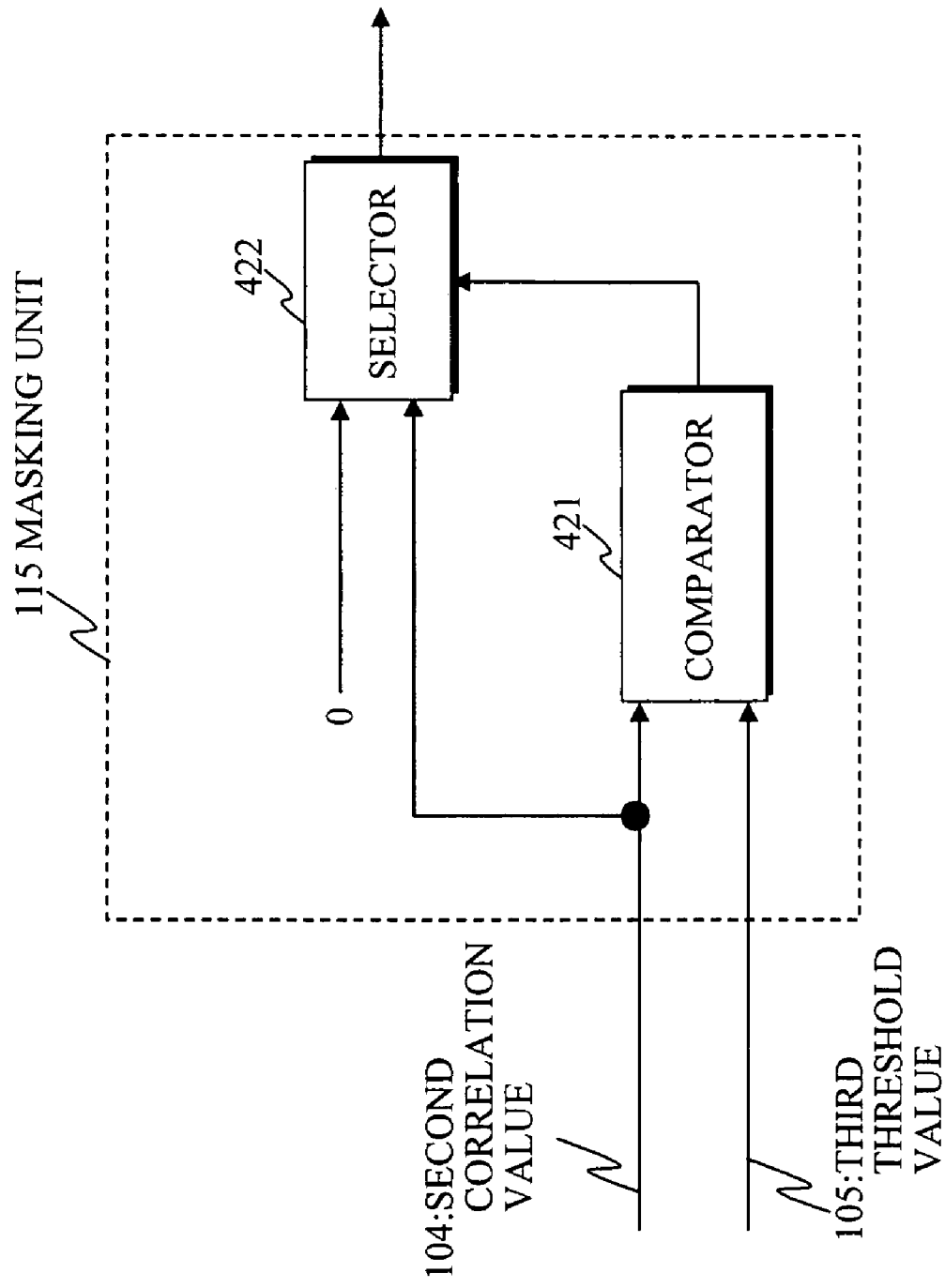
FIG. 45 shows a detailed construction of a masking unit shown in FIG. 24.

In detail, the multipath interference detector 124 includes the subtractor 114, the mean calculator 112, the comparator 111, the clipper 113, and the masking unit 115. The clipper 114 can be implemented by the construction shown in FIG. 44. FIG. 45 is a block diagram showing an example construction of the masking unit 115. As illustrated, the masking unit 115 includes a comparator 421 and a selector 422.

The multipath interference detector 124 receives first correlation value 101 and second correlation value 104, from the correlation calculator (not illustrated) for calculating correlation values between a received signal and a sync signal inserted in a transmitted signal. The clipper 113 receives first correlation value 101 and second threshold value 103. If first correlation value 101 is smaller than second threshold value 103, the clipper 113 outputs first correlation value 101. If first correlation value 101 is no smaller than second threshold value 103, the clipper 113 outputs second threshold value 103. Meanwhile, the masking unit 115 receives second correlation value 104 and third threshold value 105. If second correlation value 104 is no smaller than third threshold value 105, the masking unit 115 outputs second correlation value 104. If second correlation value 104 is smaller than third threshold value 105, the masking unit 115 outputs the value 0.

The subtractor 114 subtracts the output of the masking unit 115 from the output of the clipper 113. The mean calculator 112 calculates a mean value of the output of the subtractor 114. The comparator 111 compares the calculated mean value with first threshold value 102, to judge whether the received signal contains multipath interference.

As can be understood from the frequency of occurrence of first correlation value 101 shown in FIG. 25, values larger than the upper limit of first correlation value 101 in the AWGN environment occur in some instances in the multipath interference environment. These larger values may cause the mean value of first correlation value 101 in the multipath interference environment to be not very different from the one in the AWGN environment. In view of this, the clipper 113 is provided to limit first correlation value 101 using second threshold value 102 which is set at the upper limit of first correlation value 101 in the AWGN environment such as 0.9. This makes it possible to distinguish the mean value of first correlation value 101 between the AWGN environment and the multipath interference environment.

As can be seen from the frequency of occurrence of second correlation value 104 shown in FIG. 26, second correlation value 104 does not exceed 0.25 in the AWGN environment, but frequently exceeds 0.25 in the multipath interference environment. In view of this, the masking unit 115 is provided to exclude second correlation value 104 smaller than third threshold value 105 which is set at 0.25. In the AWGN environment, the output of the masking unit 115 is mostly 0. This being so, second correlation value 104 equal to or larger than third threshold value 105 in the multipath interference environment serves to increase the difference in mean value of second correlation value 104 between the multipath interference environment and the AWGN environment. As a result, the mean difference between first correlation value 101 and second correlation value 104 can be clearly distinguished between the multipath interference environment and the AWGN environment. This contributes to more accurate multipath interference detection.

The sixth embodiment describes the case where the multipath interference detector 124 includes the mean calculator 112 which calculates the mean value of the output of the subtractor 114. Instead, the multipath interference detector 124 may include mean calculators for calculating the mean value of the output of the clipper 113 and the mean value of the output of the masking unit 115, like the mean calculators 117 and 118 shown in FIG. 22.

The sixth embodiment describes the case where the multipath interference detector 124 includes the mean calculator 112. Instead of using the mean calculator 112, the protection unit 131 may be provided after the comparator 111 as shown in FIG. 17.

The sixth embodiment describes the case where the comparator 111 in the multipath interference detector 124 receives one first threshold value 102. Alternatively, the comparator 111 may receive N first threshold values 102 to judge the degree of multipath interference in N+1 levels. This construction is analogous to the one shown in FIG. 46 in the second embodiment, and so its explanation has been omitted here. This being the case, the coefficient update unit 152 shown in FIG. 23 has N+1 step sizes instead of the two step sizes A and B. The coefficient update unit 152 selects one of the N+1 step sizes according to step size selection signal 129 output from the comparator 111, and calculates the coefficient update amounts for the transversal filter 151 using the selected step size.

The sixth embodiment describes the case where the sync signal is used in the correlation calculation by the correlation calculator, but any known signal inserted in the transmitted signal may instead be used.

The sixth embodiment describes the main waveform equalizer 161 shown in FIG. 23, but the construction of the main waveform equalizer 162 shown in FIG. 14 may instead be used. Also, the construction of the first embodiment may be applied as shown in FIG. 41.

Seventh Embodiment

Figure 30:
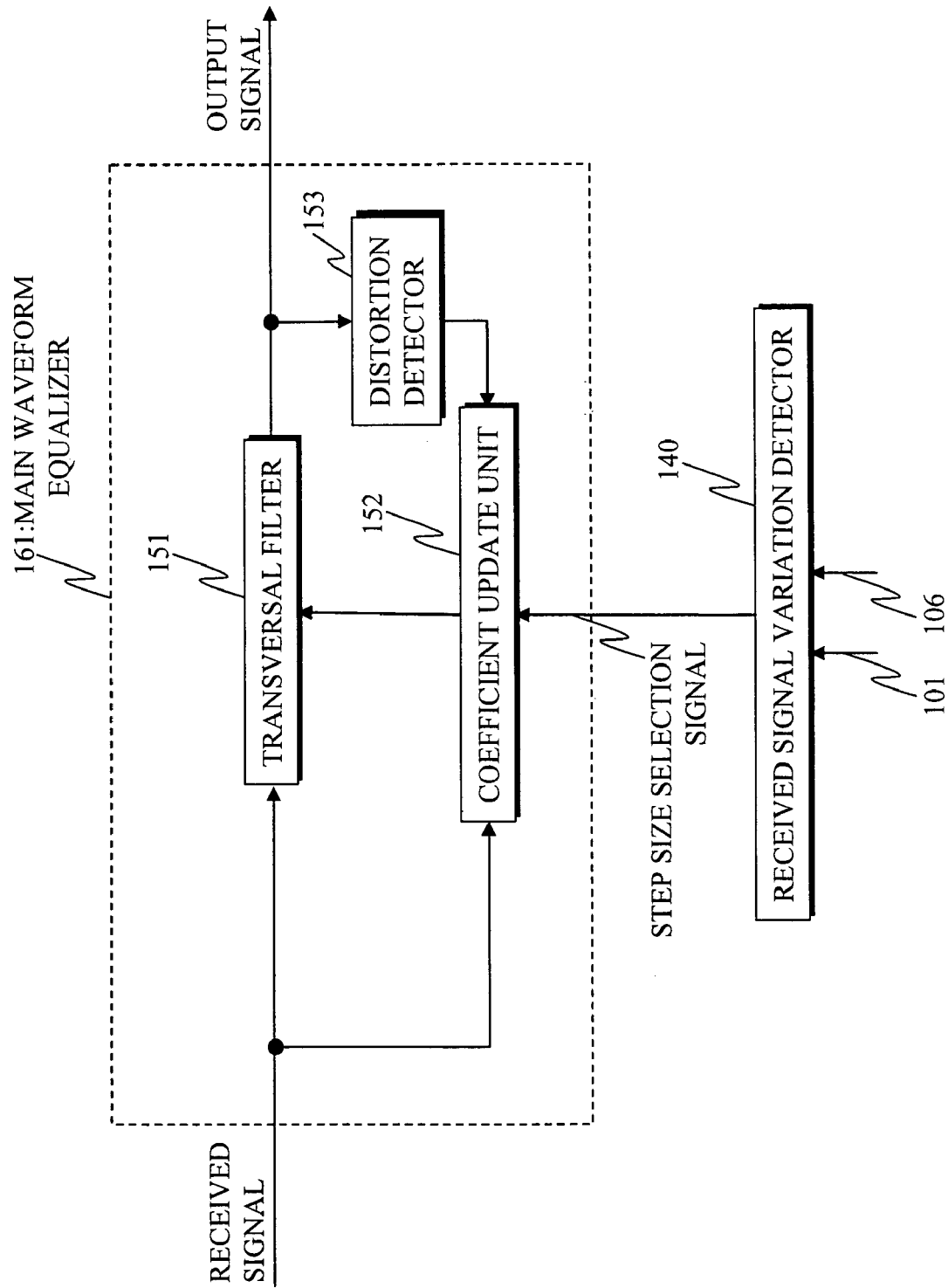
FIG. 30 is a block diagram of a waveform equalizer according to a seventh embodiment of the present invention.
Figure 31:
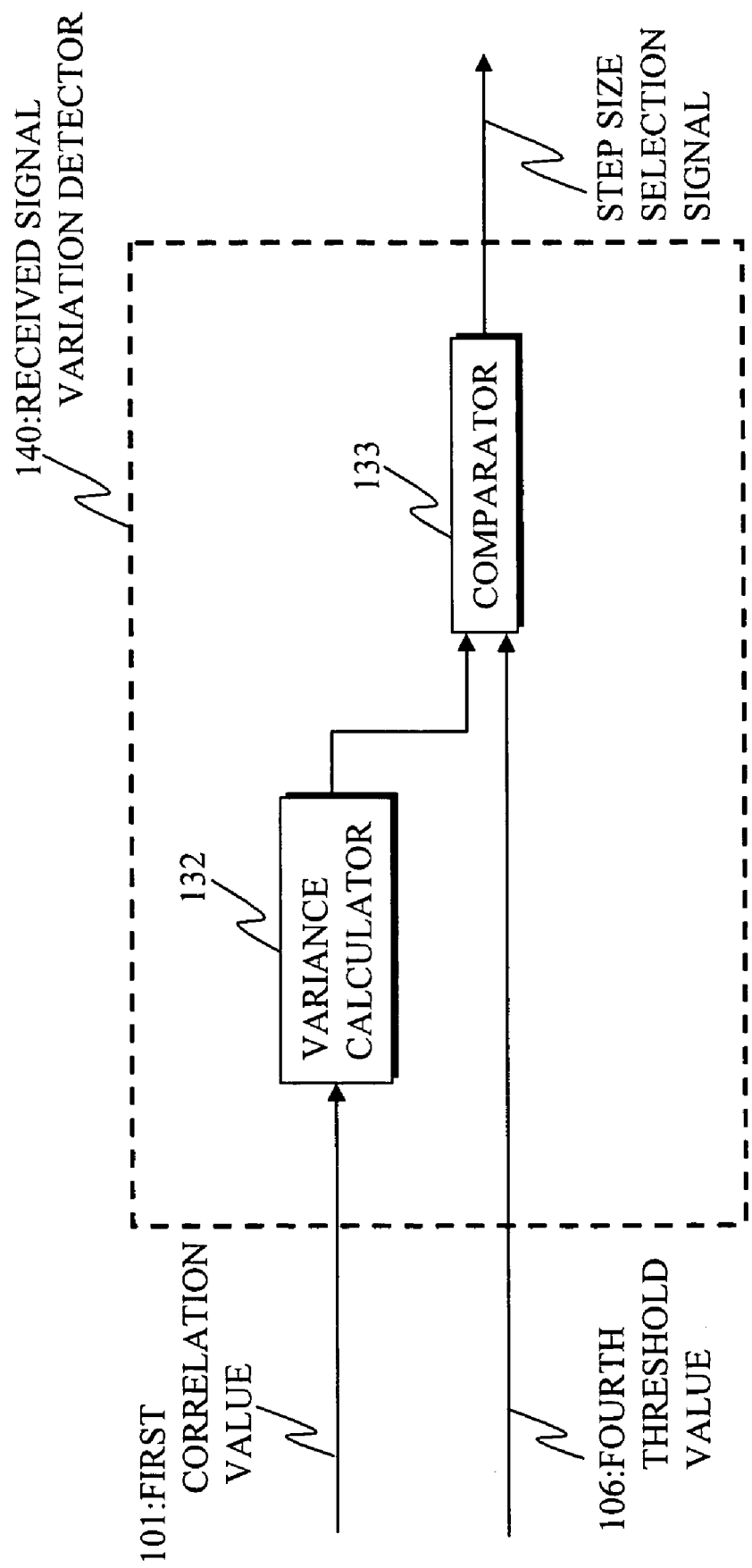
FIG. 31 is a block diagram of a received signal variation detector shown in FIG. 30.

A waveform equalizer according to a seventh embodiment of the present invention is described below, with reference to FIGS. 30, 31, 32, and 33. FIG. 30 is a block diagram of the waveform equalizer in the seventh embodiment. FIG. 31 is a block diagram of a received signal variation detector 140 shown in FIG. 30.

The waveform equalizer of the seventh embodiment is roughly made up of the main waveform equalizer 161 and the received signal variation detector 140.

A received signal of the main waveform equalizer 161 is input to the transversal filter 151 and the coefficient update unit 152. The distortion detector 153 receives an output signal of the transversal filter 151, and estimates an error contained in the output signal. The output of the distortion detector 153 is fed to the coefficient update unit 152. The coefficient update unit 152 calculates update amounts of coefficients of the transversal filter 151 from the output of the distortion detector 153, the received signal of the main waveform equalizer 161, and a step size, and updates the coefficients accordingly. This operation is repeated to remove distortion and thereby accomplish waveform equalization. Here, the coefficient update unit 152 has step size A and step size B. Step size A is set to a small value, whilst step size B is set to a large value. The coefficient update unit 152 calculates the coefficient update amounts using one of step size A and step size B.

The received signal variation detector 140 includes a variance calculator 132 and a comparator 133, as shown in FIG. 31. The received signal variation detector 140 receives first correlation value 101 from the correlation calculator (not illustrated) for calculating correlation values between a received signal and a sync signal inserted in a transmitted signal. As noted earlier, first correlation value 101 is a largest value out of the absolute values of the correlation values. First correlation value 101 is fed to the variance calculator 132, which calculates a variance of first correlation value 101.

The variance calculator 132 performs an operation of finding variance V, i.e. a deviation of n values of signal $X_i$ from its mean value $X_{ave}$. In more detail, the variance calculator 132 solves the following two equations:

$$X_{ave} = \frac{\sum_{i=1}^{n} X_i}{n}$$

$$V = \frac{\sum_{i=1}^{n}(X_i - X_{ave})^2}{n} = \frac{\sum_{i=1}^{n} X_i^2}{n} - X_{ave}^2$$

The variance calculated by the variance calculator 132 and fourth threshold value 106 are fed to the comparator 133.

The comparator 133 compares the variance of first correlation value 101 with fourth threshold value 106. If the variance is no smaller than fourth threshold value 106, the comparator 133 judges that the received signal varies, and outputs the step size selection signal to select step size B to the coefficient update unit 152 in the main waveform equalizer 161. If the variance is smaller than fourth threshold value 106, the comparator 133 judges that the received signal does not vary, and outputs the step size selection signal to select step size A to the coefficient update unit 152.

The coefficient update unit 152 selects one of step size A and step size B according to the step size selection signal, and calculates the coefficient update amounts for the transversal filter 151 using the selected step size.

Figure 32:
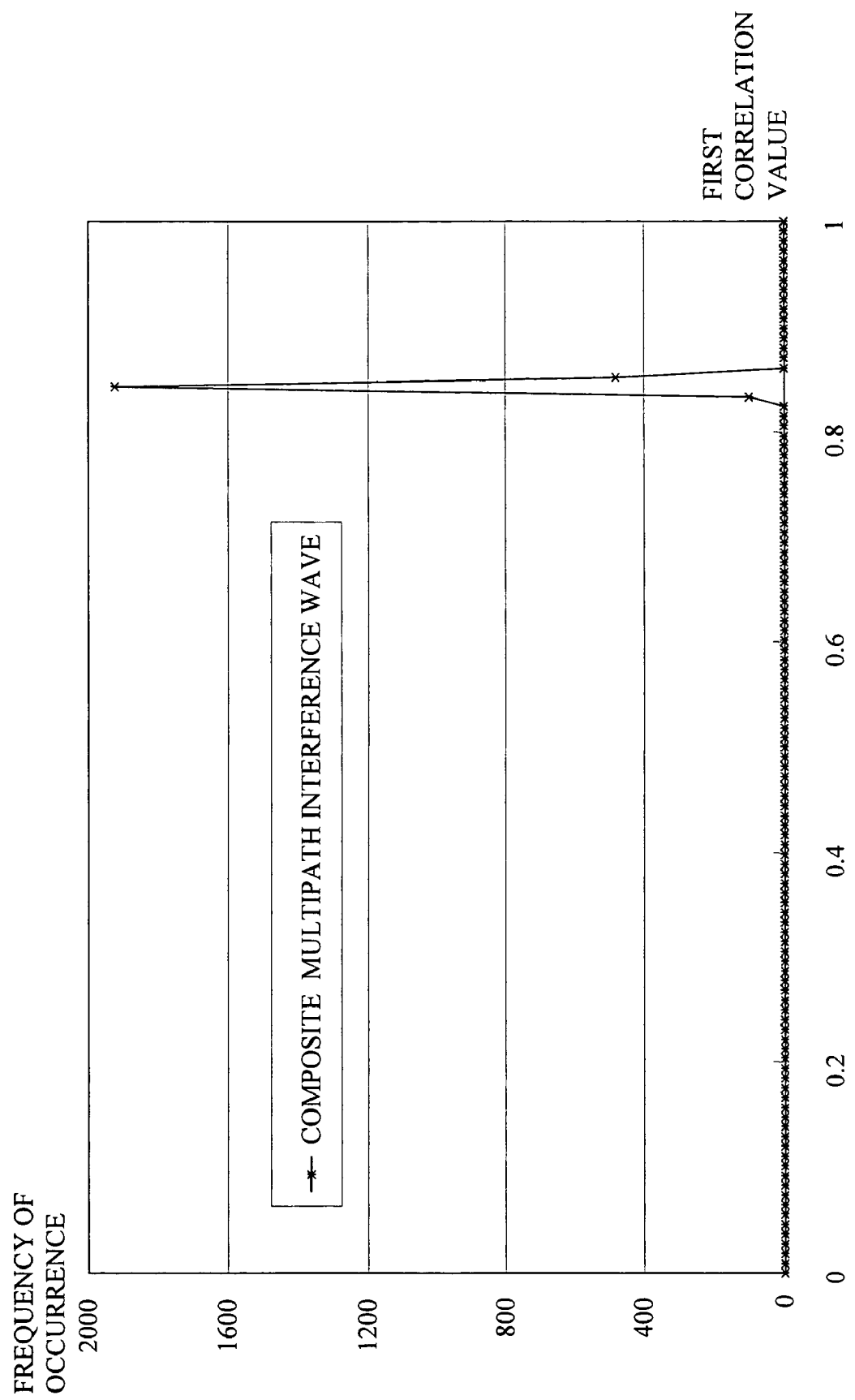
FIG. 32 shows a frequency of occurrence of first correlation values.

FIG. 32 shows a distribution in frequency of occurrence of first correlation value 101 in a composite multipath interference environment (see FIG. 33 for delay, phase, and D/U of static multipath interference waves which are all static), as one example. This is clearly different from the distribution of first correlation value 101 in the dynamic multipath interference environment shown in FIG. 25 (delay of 0.1 μs, Doppler frequency of 1 Hz, and D/U=2 dB). In view of this, by comparing the variance of first correlation value 101 with appropriate fourth threshold value 106, the dynamic or static nature of multipath interference can be judged.

FIG. 42 shows simulation results which demonstrate effects achieved by the seventh embodiment. Having set step size A at μ_0 and step size B at 7μ_0 which is the sevenfold of μ_0, marginal C/N performance and marginal D/U performance were simulated. Here, the marginal D/U performance was observed in an environment where dynamic multipath interference of 1 μs in delay and 1 Hz in Doppler frequency is added to a transmitted signal, and in an environment where static multipath interference of 1 μs in delay and 180° in phase difference is added to a transmitted signal. As can be seen from FIG. 42, step size μ_0 delivers better marginal C/N performance. Meanwhile, step size 7μ_0 delivers better marginal D/U performance in the dynamic multipath interference environment which requires a tracking capability. On the other hand, step size μ_0 delivers slightly better marginal D/U performance than step size 7μ_0 in the static multipath interference environment, since a large step size causes an increase in residual error in the static multipath interference environment. This being the case, the following effects are achieved by applying the seventh embodiment. When the received signal contains no multipath interference, the received signal is static, so that step size μ_0 is selected which results in marginal C/N performance of 14.9 dB. When the received signal contains dynamic multipath interference, step size 7μ_0 is selected which results in marginal D/U performance of 0 dB. When the received signal contains static multipath interference, step size μ_0 is selected which results in marginal D/U performance of 0 dB.

Thus, when the received signal contains dynamic multipath interference that requires fast waveform equalization, the step size is increased to accelerate waveform equalization. When the received signal contains static multipath interference, on the other hand, the step size is decreased to improve the marginal C/N performance and stabilize waveform equalization.

Figure 34:
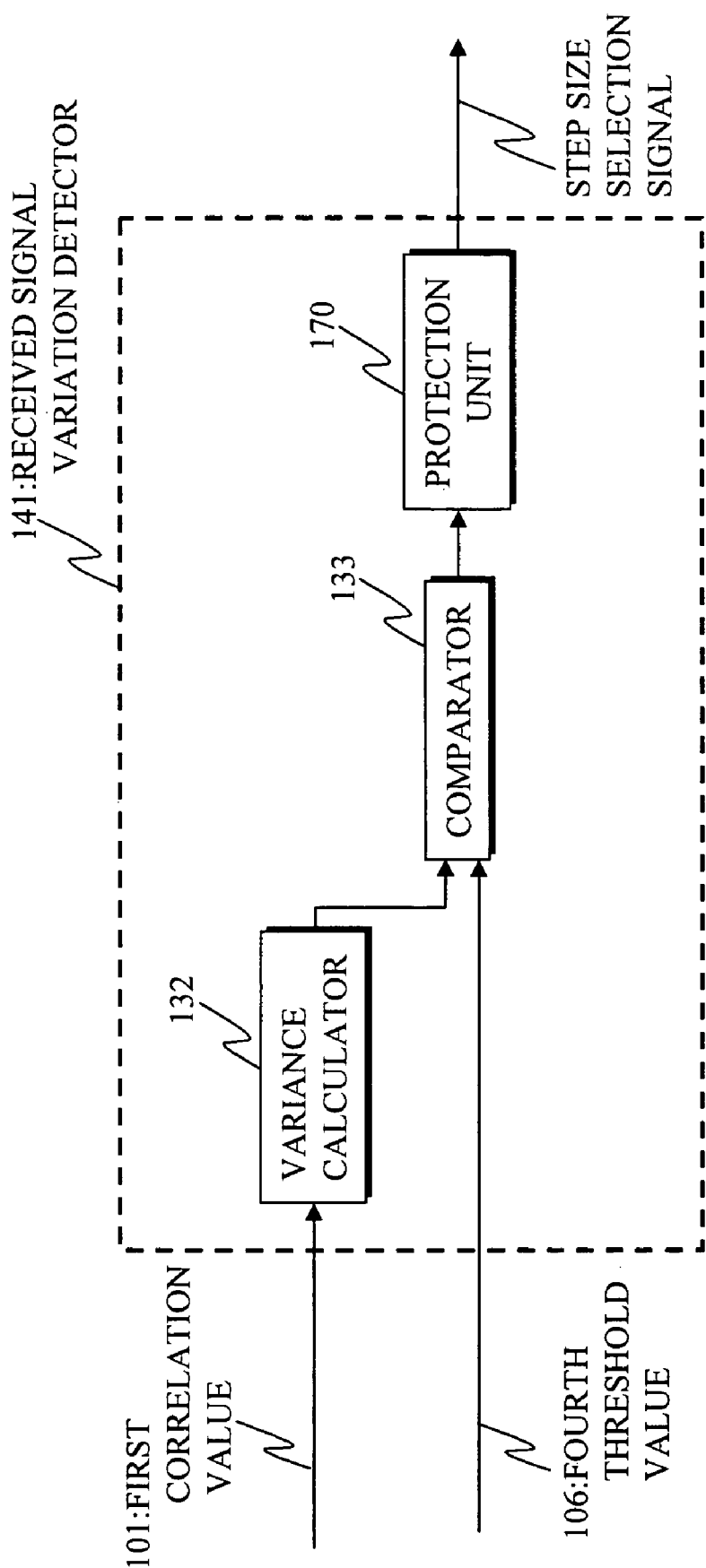
FIG. 34 is a block diagram of a received signal variation detector which is a modification to the seventh embodiment.

Here, the received signal variation detector 140 shown in FIG. 31 may be modified as shown in FIG. 34. In the drawing, a received signal variation detector 141 includes a protection unit 170 connected to the comparator 133. Only when the same judgment result is repeatedly output from the comparator 133 a predetermined number of times, the protection unit 170 updates its output signal according to this judgment result. In this way, a wrong judgment on the dynamic or static nature of multipath interference can be avoided.

The seventh embodiment describes the case where the comparator 133 in the received signal variation detector 140 receives one fourth threshold value 106. As an alternative, the comparator 133 may receive N fourth threshold values 106 to judge the degree of variance in N+1 levels. This construction is analogous to the one shown in FIG. 46 in the second embodiment, and so its explanation has been omitted here. In this case, the coefficient update unit 152 has N+1 step sizes instead of the two step sizes A and B. The coefficient update unit 152 selects one of the N+1 step sizes according to the step size selection signal, and calculates the coefficient update amounts for the transversal filter 151 using the selected step size.

The seventh embodiment describes the case where the sync signal is used in the correlation calculation by the correlation calculator, but any known signal inserted in the transmitted signal may instead be used.

The seventh embodiment describes the main waveform equalizer 161 shown in FIG. 30, but the construction of the main waveform equalizer 162 shown in FIG. 14 may instead be used. Also, the construction of the first embodiment may be applied as shown in FIG. 41.

The variance calculator 132 in the received signal variation detector 140 may be a standard deviation calculator for calculating a standard deviation of first correlation value 101. Thus, any circuit for calculating a statistic, such as a dispersion, for first correlation value 101 is applicable.

Eighth Embodiment

Figure 35:
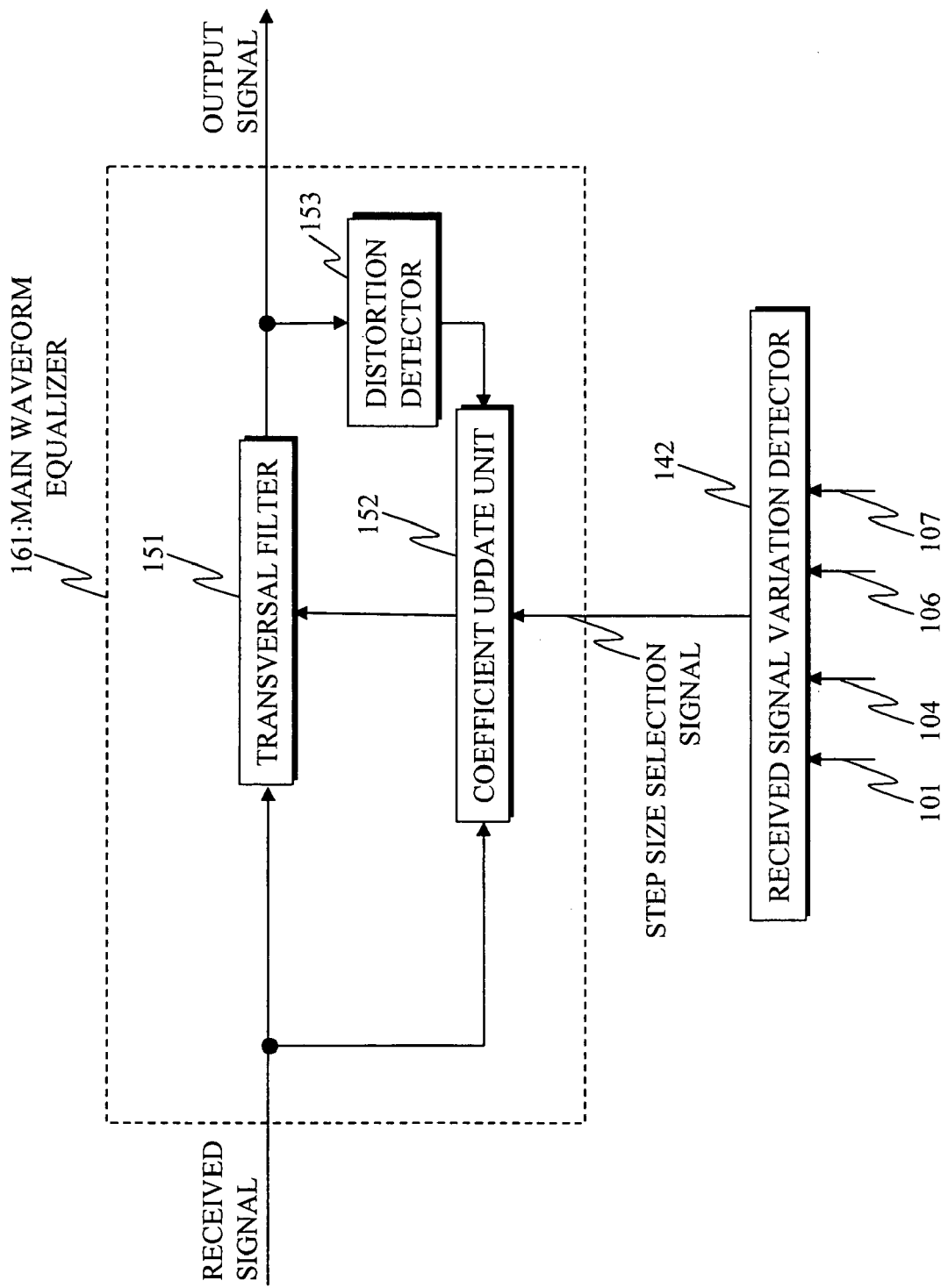
FIG. 35 is a block diagram of a waveform equalizer according to an eighth embodiment of the present invention.
Figure 36:
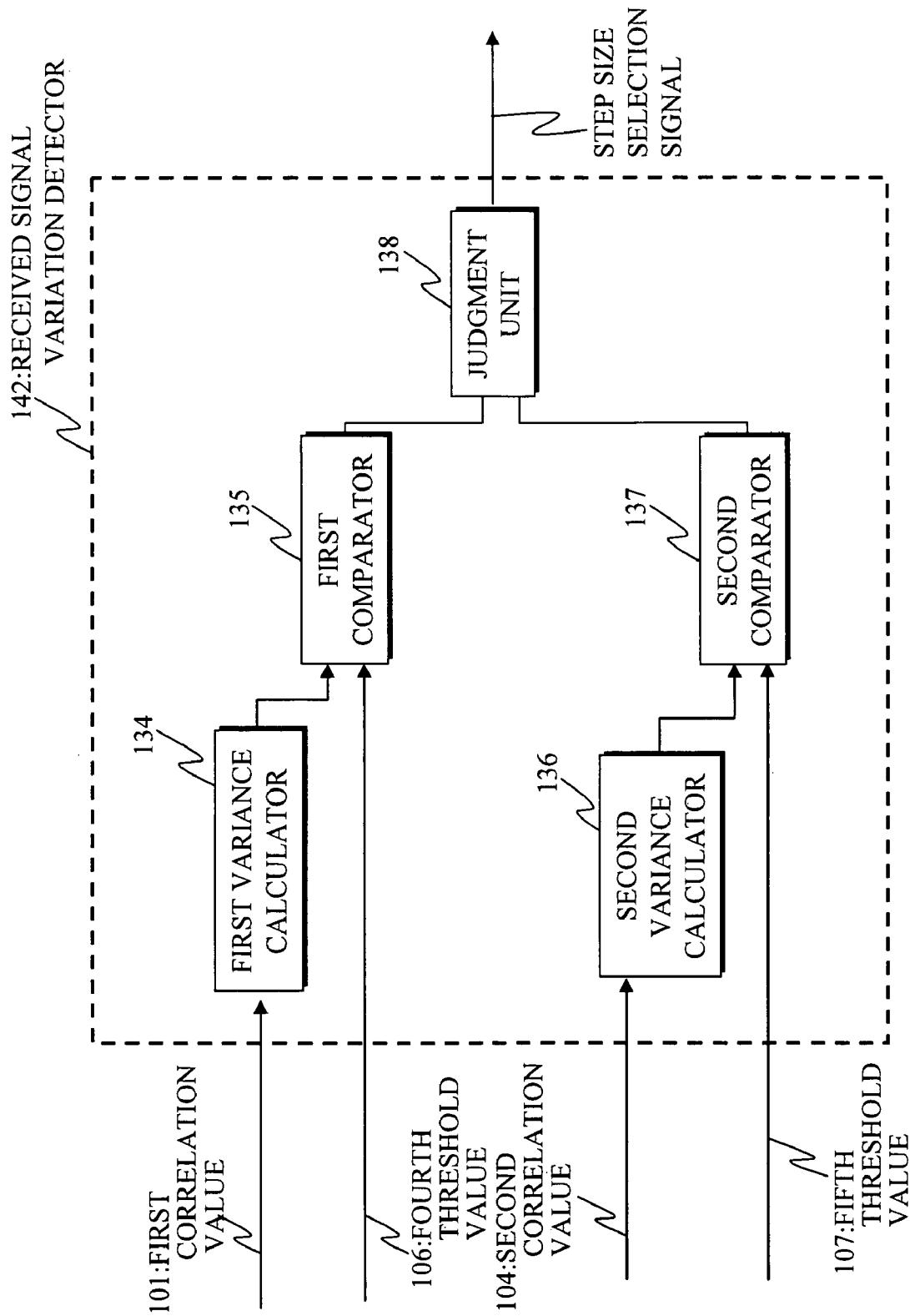
FIG. 36 is a block diagram of a received-signal variation detector shown in FIG. 35.

A waveform equalizer according to an eighth embodiment of the present invention is described below, with reference to FIGS. 35, 36 and 37. FIG. 35 is a block diagram of the waveform equalizer in the eighth embodiment. FIG. 36 is a block diagram of a received signal variation detector 142 shown in FIG. 35. In FIG. 35, construction elements which are the same as those shown in FIG. 30 have been given the same reference numerals and their explanation has been omitted. The main waveform equalizer 161 shown in FIG. 35 has the same construction as the main waveform equalizer 161 shown in FIG. 30. The eighth embodiment differs from the seventh embodiment in that the received signal variation detector 142 receives not only first correlation value 101 but also second correlation value 104.

The received signal variation detector 142 includes a first variance calculator 134, a second variance calculator 136, a first comparator 135, a second comparator 137, and a judgment unit 138, as shown in FIG. 36.

The received signal variation detector 142 receives first correlation value 101 and second correlation value 104 from the correlation calculator (not illustrated) for calculating correlation values between a received signal and a sync signal inserted in a transmitted signal. As mentioned earlier, first correlation value 101 and second correlation value 104 are respectively the first and second largest values out of the absolute values of the correlation values. First correlation value 101 is fed to the first variance calculator 134, which calculates a variance of first correlation value 101. The first comparator 135 compares the calculated variance of first correlation value 101 and fourth threshold value 106. Meanwhile, second correlation value 104 is fed to the second variance calculator 136, which calculates a variance of second correlation value 104. The second comparator 137 compares the calculated variance of second correlation value 104 and fifth threshold value 107. The judgment unit 138 receives the comparison result of the first comparator 135 and the comparison result of the second comparator 137. If the comparison results of the first comparator 135 and the second comparator 137 both indicate that the calculated variance is no smaller than the corresponding threshold value, the judgment unit 138 judges that the received signal varies, and outputs the step size selection signal to select step size B to the coefficient update unit 152 in the main waveform equalizer 161 shown in FIG. 35. If any of the comparison results of the first comparator 135 and the second comparator 137 indicates that the calculated variance is smaller than the corresponding threshold value, the judgment unit 138 judges that the received signal does not vary, and outputs the step size selection signal to select step size A to the coefficient update unit 152.

Figure 37:
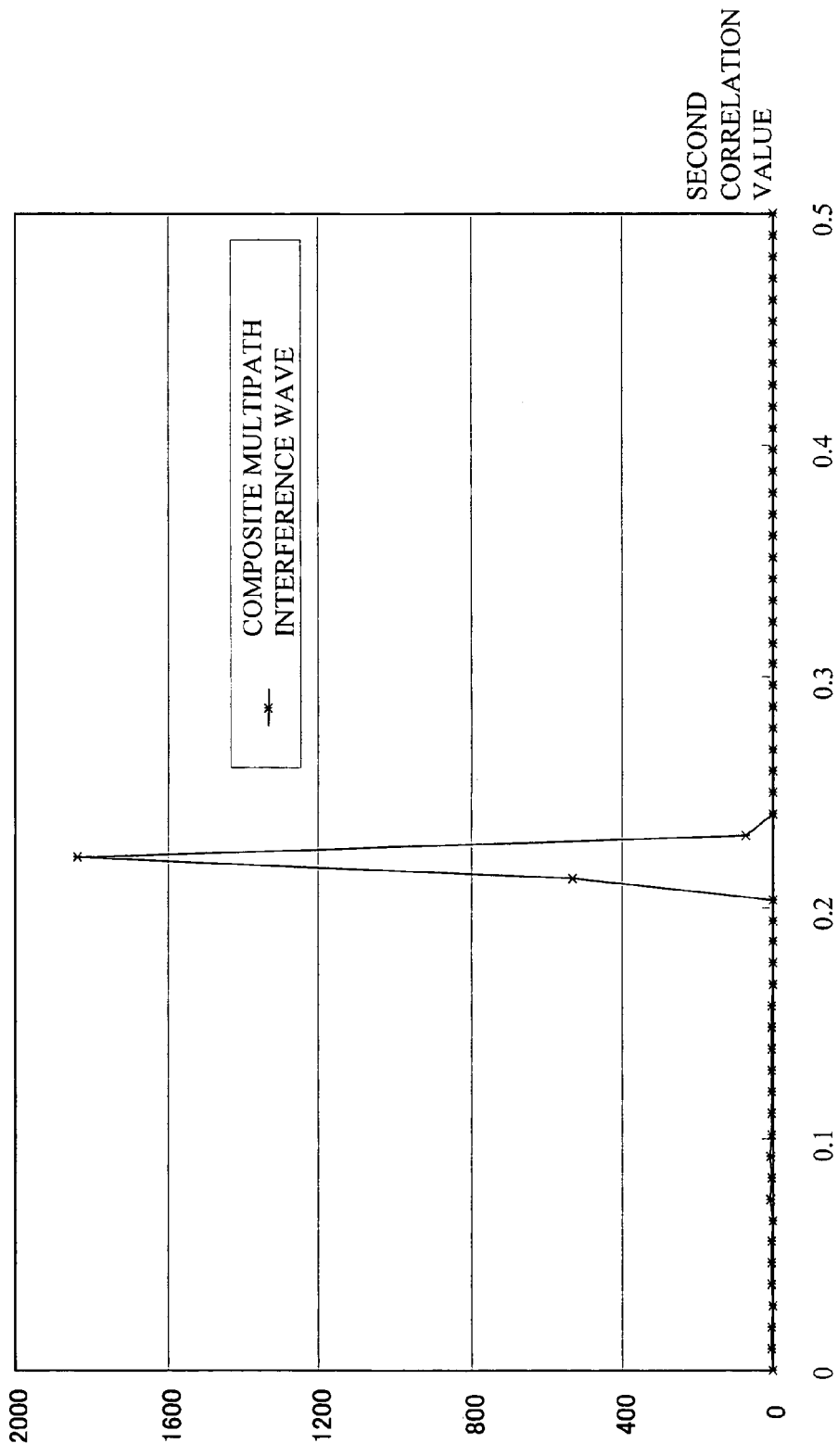
FIG. 37 shows a frequency of occurrence of second correlation values.

FIG. 37 shows a distribution in frequency of occurrence of second correlation value 104 in a composite multipath interference environment (see FIG. 33 for delay, phase, and D/U of static multipath interference waves), as one example. This is clearly different from the distribution in frequency of occurrence of second correlation value 104 in the dynamic multipath interference environment shown in FIG. 26 (delay of 0.1 µs, Doppler frequency of 1 Hz, and D/U=2 dB). In view of this, when both the variance of first correlation value 101 and the variance of second correlation value 104 are no smaller than the corresponding threshold values, the received signal can be judged as containing dynamic multipath interference. When the received signal is judged as containing dynamic multipath interference which requires fast waveform equalization, the step size is increased to accelerate waveform equalization. When the received signal is judged as containing static multipath interference, on the other hand, the step size is decreased to improve the marginal C/N performance and thereby stabilize waveform equalization.

Figure 38:
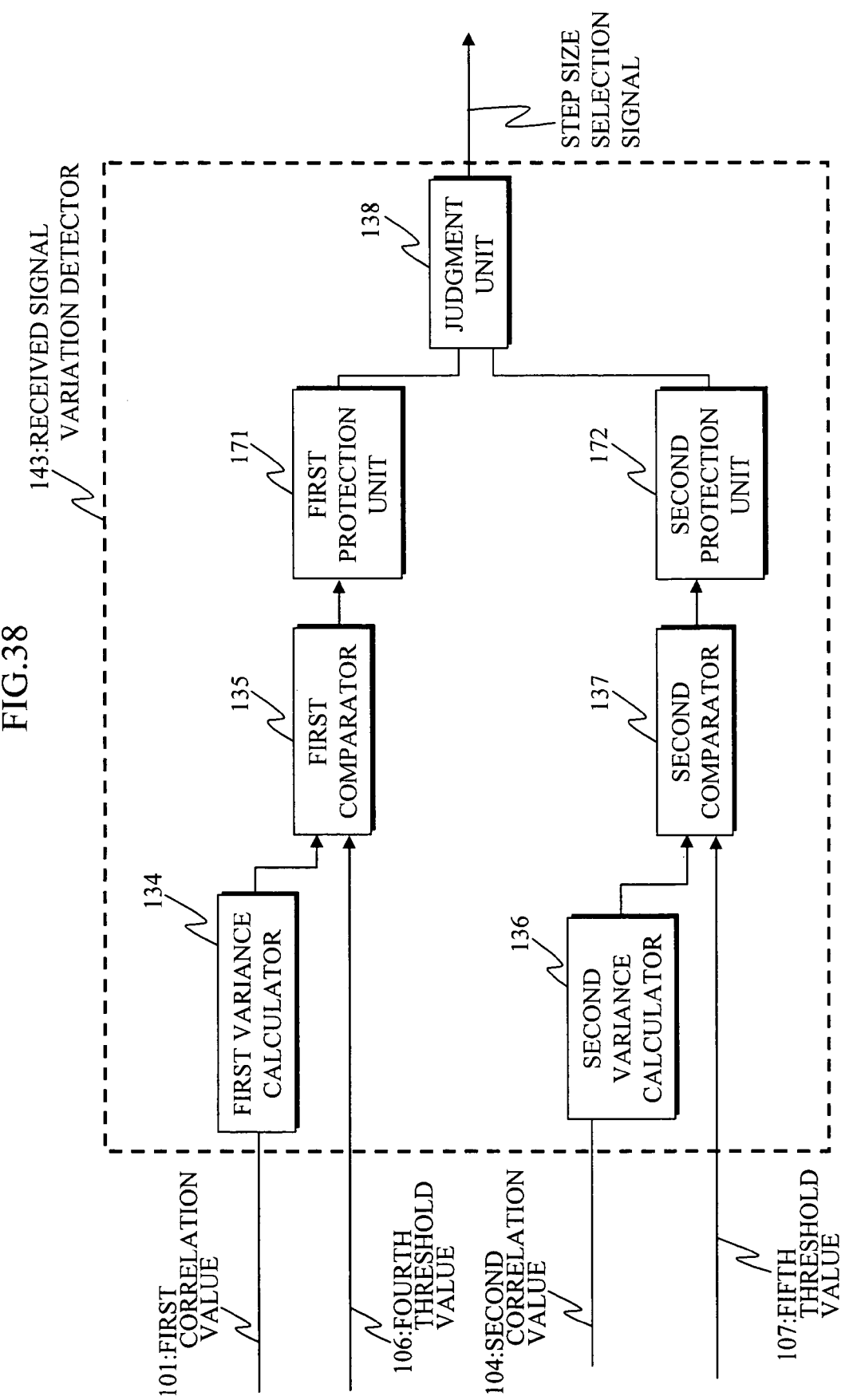
FIG. 38 is a block diagram of a received signal variation detector which is a modification to the eighth embodiment.

Here, the received signal variation detector 142 may be modified as shown in FIG. 38. In the drawing, a received signal variation detector 143 includes a first protection unit 171 connected to the first comparator 135, and a second protection unit 172 connected to the second comparator 137. Only when the same judgment result is repeatedly output from the first comparator 135 a predetermined number of times, the first protection unit 171 updates its output signal according to the judgment result. Likewise, only when the same judgment result is repeatedly output from the second comparator 137 a predetermined number of times, the second protection unit 172 updates its output signal according to the judgment result. In this way, a wrong judgment on the dynamic or static nature of multipath interference can be suppressed.

The eighth embodiment describes the case where the first comparator 135 and the second comparator 137 in the received signal variation detector 142 respectively receive one fourth threshold value 106 and one fifth threshold value 107. Alternatively, the first comparator 135 and the second comparator 137 may receive N fourth threshold values 106 and M fifth threshold values 107 (N and M are integers no less than 2), to judge the degree of variance in N+1 levels and M+1 levels respectively. The judgment unit 138 outputs the step size selection signal showing one of L possible judgment results based on the outputs of the first comparator 135 and the second comparator 137 (L is a natural number), to the coefficient update unit 152 shown in FIG. 35. The coefficient update unit 152 has L step sizes instead of the two step sizes A and B. The coefficient update unit 152 selects one of the L step sizes according to the step size selection signal, and calculates the coefficient update amounts for the transversal filter 151 using the selected step size.

Also, the judgment on the dynamic or static nature of multipath interference by the judgment unit 138 may be modified as follows. If any one of the comparison results of the first comparator 135 and the second comparator 137 indicates that the calculated variance is no smaller than the corresponding threshold value, the judgment unit 138 judges that the received signal varies. If the comparison results of the first comparator 135 and the second comparator 137 both indicate that the calculated variance is smaller than the corresponding threshold value, on the other hand, the judgment unit 138 judges that the received signal does not vary.

The eighth embodiment describes the case where the sync signal is used in the correlation calculation by the correlation calculator, but any known signal inserted in the transmitted signal may instead be used.

The eighth embodiment describes the main waveform equalizer 161 shown in FIG. 35, but the construction of the main waveform equalizer 162 shown in FIG. 14 may instead be used. Also, the construction of the first embodiment may be applied as shown in FIG. 41.

The first variance calculator 134 and the second variance calculator 136 may respectively be a first standard deviation calculator for calculating a standard deviation of first correlation value 101 and a second standard deviation calculator for calculating a standard deviation of second correlation value 104. In other words, any circuit for calculating a statistic such as a dispersion is applicable.

Ninth Embodiment

Figure 39:
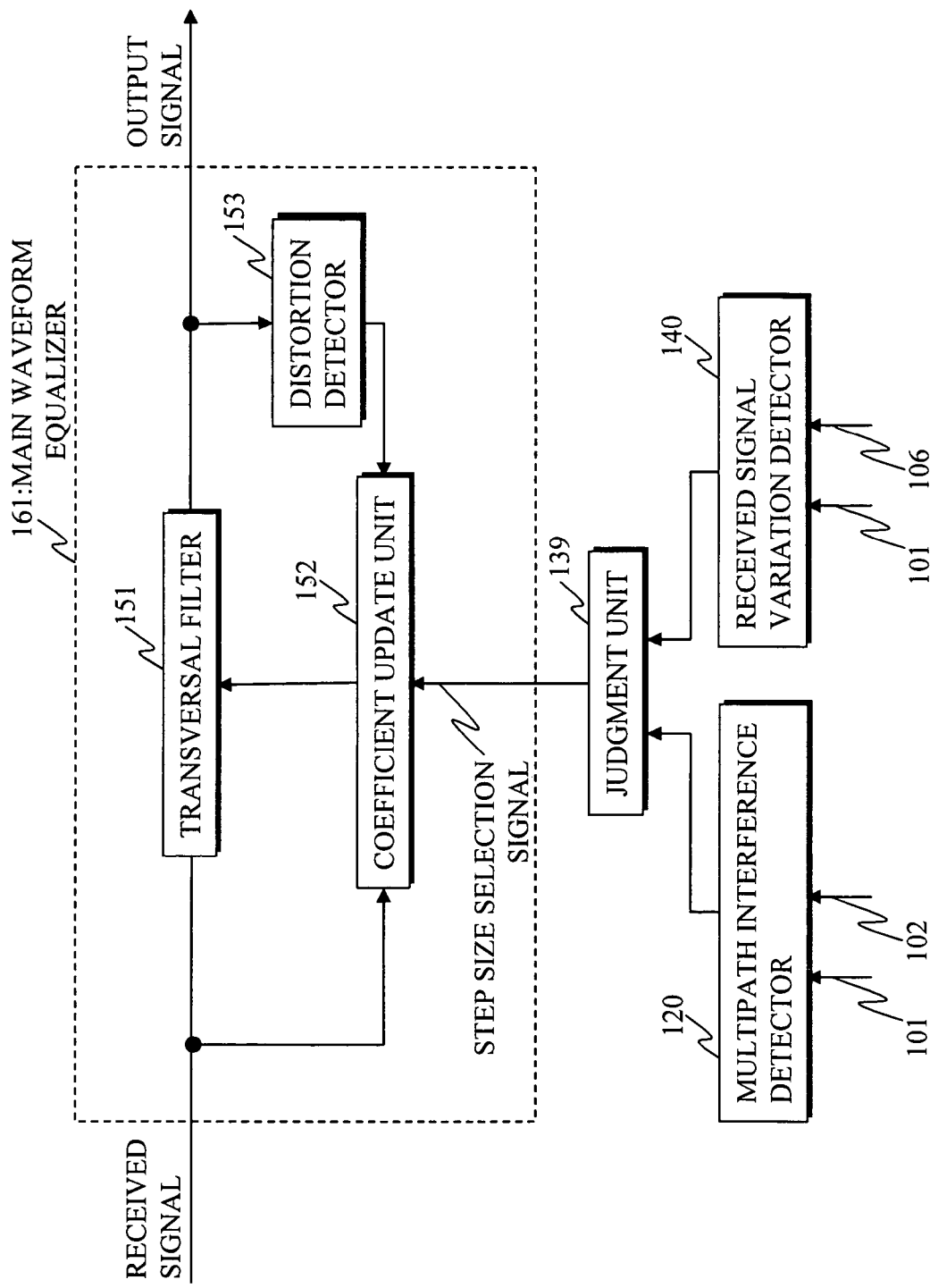
FIG. 39 is a block diagram of a waveform equalizer according to a ninth embodiment of the present invention.

A waveform equalizer according to a ninth embodiment of the present invention is described below, with reference to FIGS. 39 and 40. FIG. 39 is a block diagram of the waveform equalizer in the ninth embodiment.

This waveform equalizer includes the main waveform equalizer 161, the multipath interference detector 120, the received signal variation detector 140, and a judgment unit 139. The main waveform equalizer 161 shown in FIG. 39 has the same construction as those shown in FIGS. 12 and 30. The multipath interference detector 120 shown in FIG. 39 has the same construction as that shown in FIG. 13. The received signal variation detector 140 shown in FIG. 39 has the same construction as that shown in FIG. 31.

In FIG. 39, the multipath interference detector 120 judges whether the received signal contains multipath interference, and the received signal variation detector 140 judges whether the multipath interference in the received signal is dynamic or static. The judgment unit 139 receives these judgment results. If the multipath interference detector 120 judges that the received signal contains multipath interference and the received signal variation detector 140 judges that the multipath interference is dynamic, the judgment unit 139 outputs the step size selection signal to select step size B to the coefficient update unit 152 in the main waveform equalizer 161. If the multipath interference detector 120 judges that the received signal contains no multipath interference or if the received signal variation detector 140 judges that the received signal contains static multipath interference, the judgment unit 139 outputs the step size selection signal to select step size A to the coefficient update unit 152. FIG. 40 shows judgment criteria used by the judgment unit 139.

When the received signal contains some variations caused by AWGN but no multipath interference or when the received signal contains only static multipath interference, it is necessary to set small coefficient update amounts. If the coefficient update amounts are large, there is a danger that waveform equalization may diverge due to external disturbances. To avoid this, a wrong judgment to set large coefficient update amounts need be prevented. In view of this, the judgment result of the multipath interference detector 120 and the judgment result of the received signal variation detector 140 are combined in the ninth embodiment. In so doing, when the received signal contains some variations due to AWGN but no multipath interference or when the received signal contains only static multipath interference, small coefficient update amounts are used. Thus, with the provision of the judgment criteria shown in FIG. 40, the condition for increasing the coefficient update amounts is narrowed to thereby prevent a wrong judgment to set large coefficient update amounts.

The ninth embodiment describes the case where the comparator 133 in the received signal variation detector 140 receives one fourth threshold value 106. As an alternative, the comparator 133 may receive N fourth threshold values 106 (N is an integer no less than 2), to judge the degree of variance in N+1 levels. Likewise, the comparator 111 in the multipath interference detector 120 may receive M first threshold values 102 (M is an integer no less than 2), to judge the degree of multipath interference in M+1 levels. The judgment unit 139 outputs the step size selection signal showing one of L possible judgment results (L is a natural number) to the coefficient update unit 152, based on the outputs of the multipath interference detector 120 and the received signal variation detector 140. The coefficient update unit 152 has L step sizes instead of the two step sizes A and B. The coefficient update unit 152 selects one of the L step sizes according to the step size selection signal, and calculates the coefficient update amounts for the transversal filter 151 using the selected step size.

The ninth embodiment describes the case where the sync signal is used in the correlation calculation by the correlation calculator, but any known signal inserted in the transmitted signal may instead be used.

The ninth embodiment describes the main waveform equalizer 161 shown in FIG. 39, but the construction of the main waveform equalizer 162 shown in FIG. 14 may instead be used. Also, the construction of the first embodiment may be applied as shown in FIG. 41.

Also, the multipath interference detector 120 may be replaced with any of the multipath interference detectors shown in FIGS. 16, 17, 19, 21, 22, and 24. Further, the received signal variation detector 140 may be replaced with any of the received signal variation detectors shown in FIGS. 34, 36, and 38.

(Modifications)

Although the present invention has been described based on the above embodiments, the present invention is not limited to such. Example modifications are given below.

(A) The second to ninth embodiments describe the case where the step size of the main waveform equalizer is controlled according to the output of the multipath interference detector and/or the output of the received signal variation detector, but the present invention is not limited to this. For instance, part of a demodulator (not illustrated) may be controlled according to the output of the multipath interference detector and/or the output of the received signal variation detector. As one example, the output of the multipath interference detector and/or the output of the received signal variation detector may be used to control a parameter of a loop gain in an AFC or a parameter of a loop gain in an AGC.

(B) The construction elements included in the waveform equalizer of each of the first to ninth embodiments may be realized by an integrated circuit. In this case, the construction elements may be individually constructed in chips, or partly or wholly constructed in one chip.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A waveform equalizer comprising:

a filter unit operable to perform waveform equalization on an input signal x(n) to generate an output signal y(n) to an nth iteration;

an error estimation unit operable to estimate a waveform equalization error e(n) in the output signal y(n), and output the waveform equalization error e(n);

an update amount calculation unit operable to calculate a coefficient update amount $\Delta C_i(n)$ for an ith tap in the filter unit according to an equation $$\Delta C_i(n) = \alpha_i(n) \times \mu \times e(n) \times x^*(n-i)$$

where μ is a constant, x*(n−i) is a complex conjugate of an input signal x(n−i), and $\alpha_i(n)$ is a function of $C_i(n-1)$; and a tap coefficient storage unit operable to calculate a new tap coefficient Ci(n) of the ith tap using a tap coefficient $C_i(n-1)$ of the ith tap and the coefficient update amount $\Delta C_i(n)$, and store the new tap coefficient $C_i(n)$ therein, wherein $\alpha_i(n)$ monotonically increases with a magnitude of $C_i(n-1)$ in a range of $0 < \alpha_i(n) \leq 1$; and wherein the magnitude of $$C_i(n-1) \text{ is } |C_i(n-1)|, \text{ and}$$

$$\alpha_i(n) = a \text{ if } |C_i(n-1)| < b,$$

$$\alpha_i(n) = 1 \text{ if } |C_i(n-1)| \geq b,$$

where a<1.

2. A waveform equalizer comprising:

a filter unit operable to perform waveform equalization on an input signal x(n) to generate an output signal y(n) to an nth iteration;

an error estimation unit operable to estimate a waveform equalization error e(n) in the output signal y(n), and output the waveform equalization error e(n);

an update amount calculation unit operable to calculate a coefficient update amount $\Delta C_i(n)$ for an ith tap in the filter unit according to an equation $$\Delta C_i(n) = \alpha_i(n) \times \mu \times e(n) \times x^*(n-i)$$

where $\mu$ is a constant, $x^*(n-i)$ is a complex conjugate of an input signal $x(n-i)$, and $\alpha_i(n)$ is a function of $C_i(n-1)$;

a tap coefficient storage unit operable to calculate a new tap coefficient $Ci(n)$ of the ith tap using a tap coefficient $C_i(n-1)$ of the ith tap and the coefficient update amount $\Delta C_i(n)$, and store the new tap coefficient $C_i(n)$ therein, wherein $\alpha_i(n)$, monotonically increases with a magnitude of $C_i(n-1)$ in a range of $0<\alpha_i(n) \leq 1$; and at least one detection unit out of:

a multipath interference detection unit operable to judge whether a received signal contains multipath interference; and a received signal variation detection unit operable to judge whether the received signal contains dynamic multipath interference or static multipath interference, wherein the constant $\mu$ is controlled according to a judgment result of the at least one detection unit.

3. The waveform equalizer of claim 2, wherein the multipath interference detection unit includes:

a computation unit operable to perform a computation using at least one of first to Nth largest values out of absolute values of correlation values calculated from the received signal and a known signal inserted in a transmitted signal; and a comparison unit operable to compare a computation result of the computation unit with a threshold value, and the multipath interference detection unit judges whether the received signal contains multipath interference, based on a comparison result of the comparison unit.

4. The waveform equalizer of claim 2, wherein the received signal variation detection unit includes:

m statistic computation units each operable to compute a statistic for a different one of m values taken from first to Nth largest values out of absolute values of correlation values, the correlation values being calculated from the received signal and a known signal inserted in a transmitted signal, m being a natural number such that m≦N; and m comparison units operable to compare statistics computed for the m values with predetermined threshold values respectively, and the received signal variation detection unit judges whether the received signal contains dynamic multipath interference or static multipath interference, based on comparison results of the m comparison units.

5. A waveform equalization method used by a waveform equalizer that includes:

a filter unit operable to perform waveform equalization on an input signal x(n) to generate an output signal y(n) in an nth iteration;

an error estimation unit operable to estimate a waveform equalization error e(n) in the output signal y(n), and output the waveform equalization error e(n);

an update amount calculation unit operable to calculate a coefficient update amount $\Delta C_i(n)$ for an ith tap in the filter unit according to an equation $$\Delta C_i(n) = \alpha_i(n) \times \mu \times e(n) \times x^*(n-i)$$

where $\mu$ is a constant, $x^*(n-i)$ is a complex conjugate of an input signal $x(n-i)$, and $\alpha_i(n)$ is a function of $C_i(n-1)$; and a tap coefficient storage unit operable to calculate a new tap coefficient $C_i(n)$ of the ith tap using a tap coefficient $C_i(n-1)$ of the ith tap and the coefficient update amount $\Delta C_i(n)$, and store the new tap coefficient $C_i(n)$ therein, the waveform equalization method comprising:

a filter step of performing waveform equalization on an input signal x(n) to generate an output signal y(n) in an nth iteration;

an error estimation step of estimating a waveform equalization error e(n) in the output signal y(n), and outputting the waveform equalization error e(n);

an update amount calculation step of calculating a coefficient update amount $\Delta C_i(n)$ for an ith tap, using the waveform equalization error e(n), an input signal x(n−i) in an (n−i)th iteration, and a tap coefficient $C_i(n-1)$ of the ith tap; and a tap coefficient storage step of calculating a new tap coefficient $C_i(n)$ of the ith tap using the tap coefficient $C_i(n-1)$ of the ith tap and the coefficient update amount $\Delta C_i(n)$, and storing the new tap coefficient $C_i(n)$, wherein $\alpha_i(n)$ monotonically increases with a magnitude of $C_i(n-1)$ in a range of $0<\alpha_i(n) \leq 1$; and wherein the magnitude of $$C_i(n-1) \text{ is } |C_i(n-1)|, \text{ and}$$
$$\alpha_i(n) = a \text{ if } |C_i(n-1)| < b,$$
$$\alpha_i(n) = 1 \text{ if } |C_i(n-1)| \geq b,$$

where a<1.

6. An integrated circuit including a signal processing unit, the signal processing unit comprising:

a filter unit operable to perform waveform equalization on an input signal x(n) to generate an output signal y(n) in an nth iteration;

an error estimation unit operable to estimate a waveform equalization error e(n) in the output signal y(n), and output the waveform equalization error e(n);

an update amount calculation unit operable to calculate a coefficient update amount $\Delta C_i(n)$ for an ith tap in the filter unit according to an equation $$\Delta C_i(n) = \alpha_i(n) \times \mu \times e(n) \times x^*(n-i)$$

where $\mu$ is a constant, $x^*(n-i)$ is a complex conjugate of an input signal $x(n-i)$, and $\alpha_i(n)$ is a function of $C_i(n-1)$;

a tap coefficient storage unit operable to calculate a new tap coefficient $C_i(n)$ of the ith tap using a tap coefficient $C_i(n-1)$ of the ith tap and the coefficient update amount $\Delta C_i(n)$, and store the new tap coefficient $C_i(n)$ therein, wherein $\alpha_i(n)$ monotonically increases with a magnitude of $C_i(n-1)$ in a range of $0<\alpha_i(n)\leq 1$;

wherein the signal processing unit includes at least one detection unit out of:

a multipath interference detection unit operable to judge whether a received signal contains multipath interference; and a received signal variation detection unit operable to judge whether the received signal contains dynamic multipath interference or static multipath interference, wherein the constant μ is controlled according to a judgment result of the at least one detection unit, the multipath interference detection unit includes:

a computation unit operable to perform a computation using at least one of first to Nth largest values out of absolute values of correlation values calculated from the received signal and a known signal inserted in a transmitted signal; and a comparison unit operable to compare a computation result of the computation unit with a threshold value, and the multipath interference detection unit judges whether the received signal contains multipath interference, based on a comparison result of the comparison unit.

7. The integrated circuit of claim 6, wherein the received signal variation detection unit includes:

m statistic computation units each operable to compute a statistic for a different one of m values taken from first to Nth largest values out of absolute values of correlation values, the correlation values being calculated from the received signal and a known signal inserted in a transmitted signal, m being a natural number such that m=N; and m comparison units operable to compare statistics computed for the m values with predetermined threshold values respectively, and the received signal variation detection unit judges whether the received signal contains dynamic multipath interference or static multipath interference, based on comparison results of the m comparison units.

8. An integrated circuit including a signal processing unit, the signal processing unit comprising:

a filter unit performing waveform equalization on an input signal x(n) to generate an output signal y(n) in an nth iteration;

an error estimation unit estimating a waveform equalization error e(n) in the output signal y(n), and output the waveform equalization error e(n);

an update amount calculation unit calculating a coefficient update amount $\Delta C_i(n)$ for an ith tap in the filter unit according to an equation $$\Delta C_i(n) = \alpha_i(n) \times \mu \times e(n) \times x^*(n - i)$$

where μ is a constant, $x^*(n-i)$ is a complex conjugate of an input signal x(n−i), and $\alpha_i(n)$ is a function of $C_i(n-1)$; and a tap coefficient storage unit calculating a new tap coefficient $C_i(n)$ of the ith tap using a tap coefficient $C_i(n-1)$ of the ith tap and the coefficient update amount $\Delta C_i(n)$, and store the new tap coefficient $C_i(n)$ therein, wherein the signal processing unit includes at least one detection unit out of:

a multipath interference detection unit judging whether a received signal contains multipath interference; and a received signal variation detection unit judging whether the received signal contains dynamic multipath interference or static multipath interference, wherein the constant μ is controlled according to a judgment result of the at least one detection unit, the multipath interference detection unit includes:

a computation unit operable to perform a computation using at least one of first to Nth largest values out of absolute values of correlation values calculated from the received signal and a known signal inserted in a transmitted signal; and a comparison unit operable to compare a computation result of the computation unit with a threshold value, and the multipath interference detection unit judges whether the received signal contains multipath interference, based on a comparison result of the comparison unit.

9. The integrated circuit of claim 8, wherein the received signal variation detection unit includes:

m statistic computation units each computing a statistic for a different one of m values taken from first to Nth largest values out of absolute values of correlation values, the correlation values being calculated from the received signal and a known signal inserted in a transmitted signal, m being a natural number such that m=N; and m comparison units comparing statistics computed for the m values with predetermined threshold values respectively, and the received signal variation detection unit judges whether the received signal contains dynamic multipath interference or static multipath interference, based on comparison results of the m comparison units.

10. A waveform equalization method used by a waveform equalizer that includes:

a filter unit operable to perform waveform equalization on an input signal x(n) to generate an output signal y(n) in an nth iteration;

an error estimation unit operable to estimate a waveform equalization error e(n) in the output signal y(n), and output the waveform equalization error e(n);

an update amount calculation unit operable to calculate a coefficient update amount $\Delta C_i(n)$ for an ith tap in the filter unit according to an equation $$\Delta C_i(n) = \alpha_i(n) \times \mu \times e(n) \times x^*(n - i)$$

where μ is a constant, $x^*(n-i)$ is a complex conjugate of an input signal x(n−i), and $\alpha_i(n)$ is a function of $C_i(n-1)$;

a tap coefficient storage unit operable to calculate a new tap coefficient $C_i(n)$ of the ith tap using a tap coefficient $C_i(n-1)$ of the ith tap and the coefficient update amount $\Delta C_i(n)$, and store the new tap coefficient $C_i(n)$ therein; and at least one detection step out of;

a multipath interference detection step of judging, by a multipath interference detection unit, whether a received signal contains multipath interference; and a received signal variation detection step of judging, by a received signal variation detection unit, whether the received signal contains dynamic multipath interference or static multipath interference, wherein the constant μ is controlled according to a judgment result of the at least one detection step, the waveform equalizer further includes the multipath interference detection unit and the received signal variation detection unit.

11. The waveform equalization method of claim 10, wherein the multipath interference detection step includes:

a computation substep of performing, by a computation unit, a computation using at least one of first to Nth largest values out of absolute values of correlation values calculated from the received signal and a known signal inserted in a transmitted signal; and a comparison substep of comparing, by a comparison unit, a computation result of the computation substep with a threshold value, the multipath interference detection step judges whether the received signal contains multipath interference, based on a comparison result of the comparison substep, and the waveform equalizer further includes the computation unit and the comparison unit.

12. The waveform equalization method of claim 10, wherein the received signal variation detection step includes:

m statistic computation substeps of each computing a statistic for a different one of m values taken from first to Nth largest values out of absolute values of correlation values, the correlation values being calculated from the received signal and a known signal inserted in a transmitted signal, m being a natural number such that $m \leq N$; and m comparison substeps of comparing statistics computed for the m values with predetermined threshold values respectively, and the received signal variation detection step judges whether the received signal contains dynamic multipath interference or static multipath interference, based on comparison results of the m comparison substeps.

\* \* \* \* \*